United States Patent
Shih et al.

(10) Patent No.: US 11,109,399 B2
(45) Date of Patent: Aug. 31, 2021

(54) METHOD AND APPARATUS FOR MULTI-HOP INTEGRATED ACCESS AND BACKHAUL SYSTEMS

(71) Applicant: ASUSTek Computer Inc., Taipei (TW)

(72) Inventors: Tun-Huai Shih, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/433,133

(22) Filed: Jun. 6, 2019

(65) Prior Publication Data
US 2020/0008218 A1    Jan. 2, 2020

Related U.S. Application Data

(60) Provisional application No. 62/692,422, filed on Jun. 29, 2018, provisional application No. 62/693,958, filed on Jul. 4, 2018.

(51) Int. Cl.
*H04W 72/12* (2009.01)
*H04W 28/02* (2009.01)
*H04W 72/14* (2009.01)
*H04W 80/02* (2009.01)

(52) U.S. Cl.
CPC ... *H04W 72/1263* (2013.01); *H04W 28/0278* (2013.01); *H04W 72/1205* (2013.01); *H04W 72/14* (2013.01); *H04W 80/02* (2013.01)

(58) Field of Classification Search
CPC ..... H04W 72/12; H04W 28/02; H04W 72/14; H04W 80/02; H04W 72/1263; H04W 72/1205; H04W 28/0278
See application file for complete search history.

(56) References Cited

U.S. PATENT DOCUMENTS

| | | | |
|---|---|---|---|
| 2013/0003650 A1 | 1/2013 | Han | |
| 2014/0133447 A1* | 5/2014 | Moulsley | H04W 72/1278 370/329 |
| 2016/0088617 A1 | 3/2016 | Goldhamer | |
| 2017/0310433 A1 | 10/2017 | Dinan | |
| 2017/0331577 A1 | 11/2017 | Parkvall | |
| 2018/0093541 A1* | 4/2018 | Matsushita | B60G 7/008 |
| 2018/0132210 A1* | 5/2018 | Rico Alvarino | H04W 72/042 |
| 2018/0255474 A1 | 9/2018 | Toth et al. | |
| 2018/0332580 A1* | 11/2018 | Dinan | H04W 72/0446 |
| 2018/0352561 A1* | 12/2018 | Barabell | H04B 17/318 |
| 2018/0359773 A1* | 12/2018 | Tesanovic | H04W 72/1268 |
| 2019/0037555 A1 | 1/2019 | Kim et al. | |

(Continued)

FOREIGN PATENT DOCUMENTS

WO    2017131389 A1    8/2017

OTHER PUBLICATIONS

EP Search Report cited in EP Application No. 19178719.1 dated Oct. 29, 2019, 11 pgs.

(Continued)

*Primary Examiner* — Chi Ho A Lee
(74) *Attorney, Agent, or Firm* — Cooper Legal Group LLC

(57) ABSTRACT

A method and apparatus are disclosed. In an example, a first node may trigger a scheduling request (SR) based upon an expected transmission from a second node which is a child node of the first node. The first node may determine a first SR configuration for the SR from a plurality of SR configurations configured to the first node.

18 Claims, 29 Drawing Sheets

(56) References Cited

U.S. PATENT DOCUMENTS

| | | | | |
|---|---|---|---|---|
| 2019/0356365 A1* | 11/2019 | Strong | ................ | H04B 7/0456 |
| 2019/0357247 A1* | 11/2019 | Keskitalo | .............. | H04W 72/14 |
| 2019/0380153 A1* | 12/2019 | Damnjanovic | ... | H04W 72/1273 |
| 2019/0394801 A1* | 12/2019 | He | ........................ | H04L 1/0003 |
| 2020/0008091 A1* | 1/2020 | Wu | ....................... | H04L 5/0057 |
| 2020/0008218 A1* | 1/2020 | Shih | ................. | H04W 72/1205 |
| 2020/0092895 A1* | 3/2020 | Wang | ................ | H04W 72/1278 |
| 2020/0107342 A1* | 4/2020 | Kuang | .............. | H04W 72/1263 |

OTHER PUBLICATIONS

Corresponding European Patent Application No. 19178719.1, Office Action dated Jan. 13, 2021.

* cited by examiner

METHOD AND APPARATUS FOR MULTI-HOP INTEGRATED ACCESS AND BACKHAUL SYSTEMS

CROSS-REFERENCE TO RELATED APPLICATIONS

The present Application claims the benefit of U.S. Provisional Patent Application Ser. No. 62/692,422 filed on Jun. 29, 2018, the entire disclosure of which is incorporated herein in its entirety by reference. The present Application also claims the benefit of U.S. Provisional Patent Application Ser. No. 62/693,958 filed on Jul. 4, 2018, the entire disclosure of which is incorporated herein in its entirety by reference.

FIELD

This disclosure generally relates to wireless communication networks, and more particularly, to a method and apparatus for reducing uplink (UL) delay in multi-hop Integrated Access and Backhaul (IAB) in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is 5G new radio (NR). 5G NR system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example, a first node may trigger a scheduling request (SR) based upon an expected transmission from a second node which is a child node of the first node. The first node may determine a first SR configuration for the SR from a plurality of SR configurations configured to the first node.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: 3GPP TR 38.913 V14.1.0, Study on Scenarios and Requirements for Next Generation Access Technologies; 3GPP TS 38.321 V15.2.0, Medium Access Control (MAC) protocol specification; RP-172290, Study on Integrated Access and Backhaul for NR; 3GPP TR 38.874 V0.3.2, Study on Integrated Access and Backhaul. The standards and documents listed above are hereby expressly incorporated by reference in their entirety.

Figure 1:
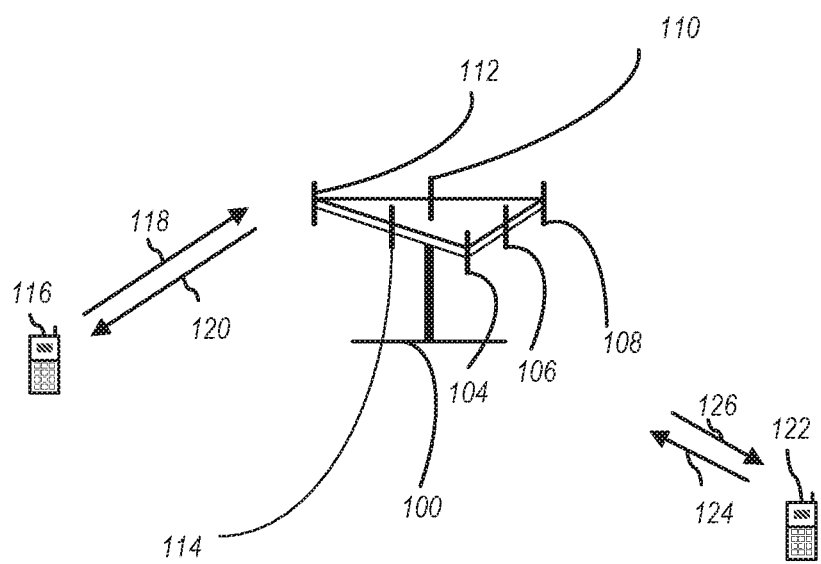
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, a gNB, or some other terminology. An access terminal (AT) may also be called user equipment (UE), a wireless communication device, terminal, or some other terminology.

Figure 2:
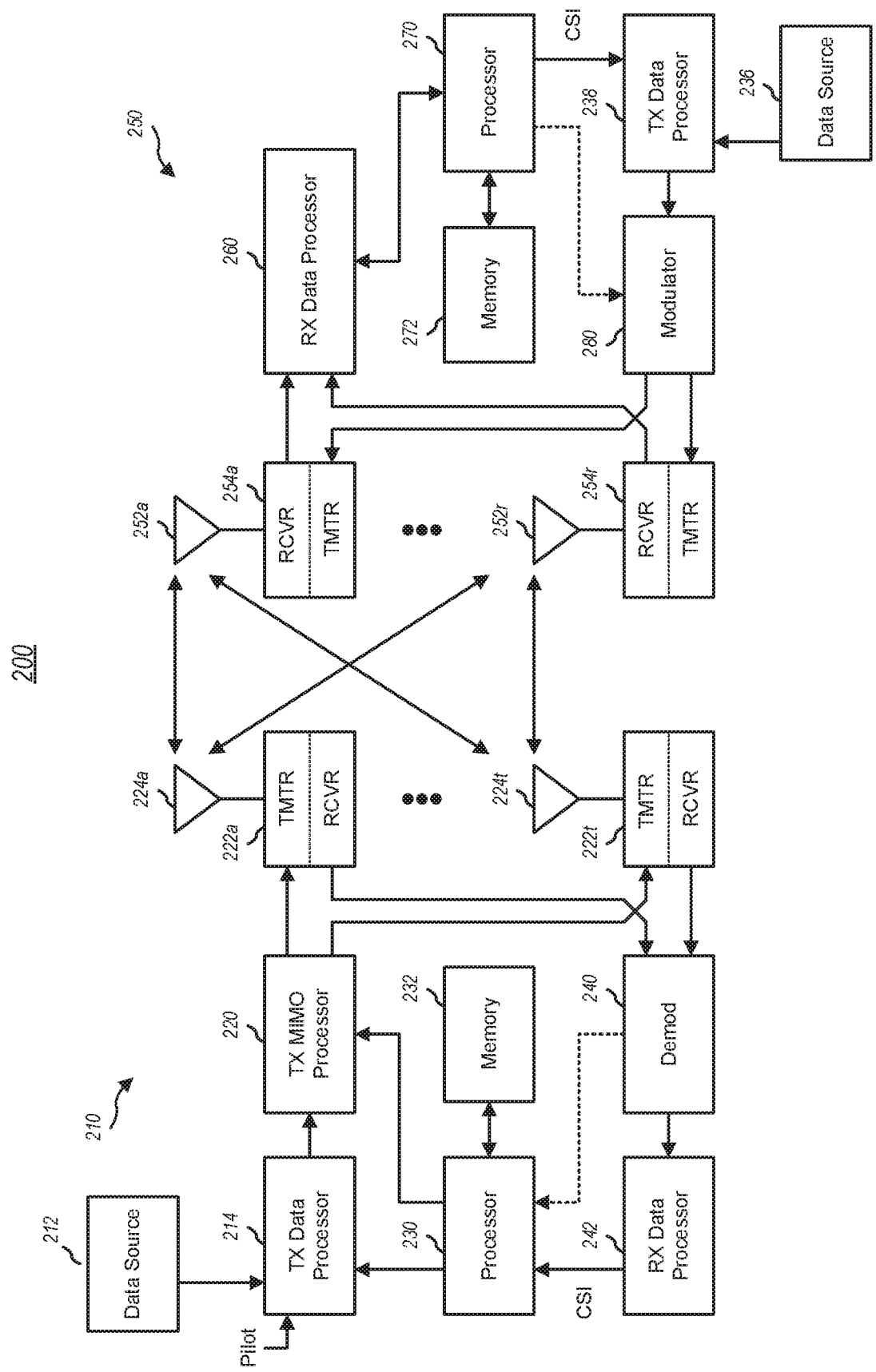
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further processes the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which pre-coding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
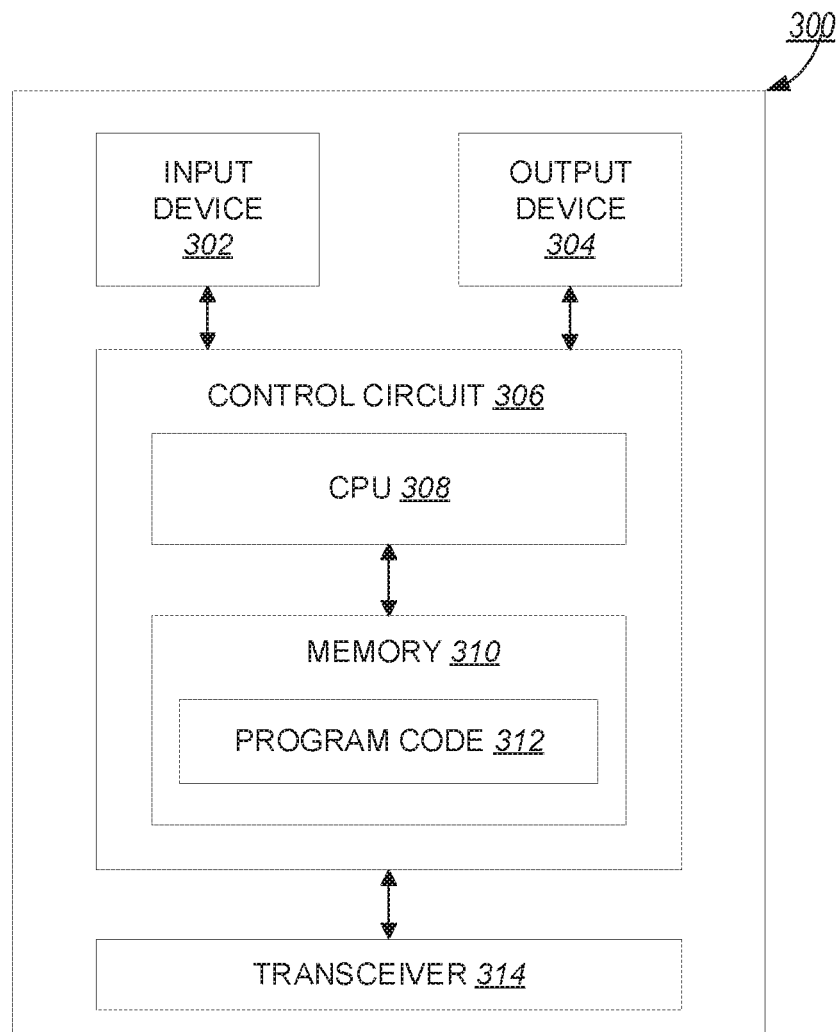
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
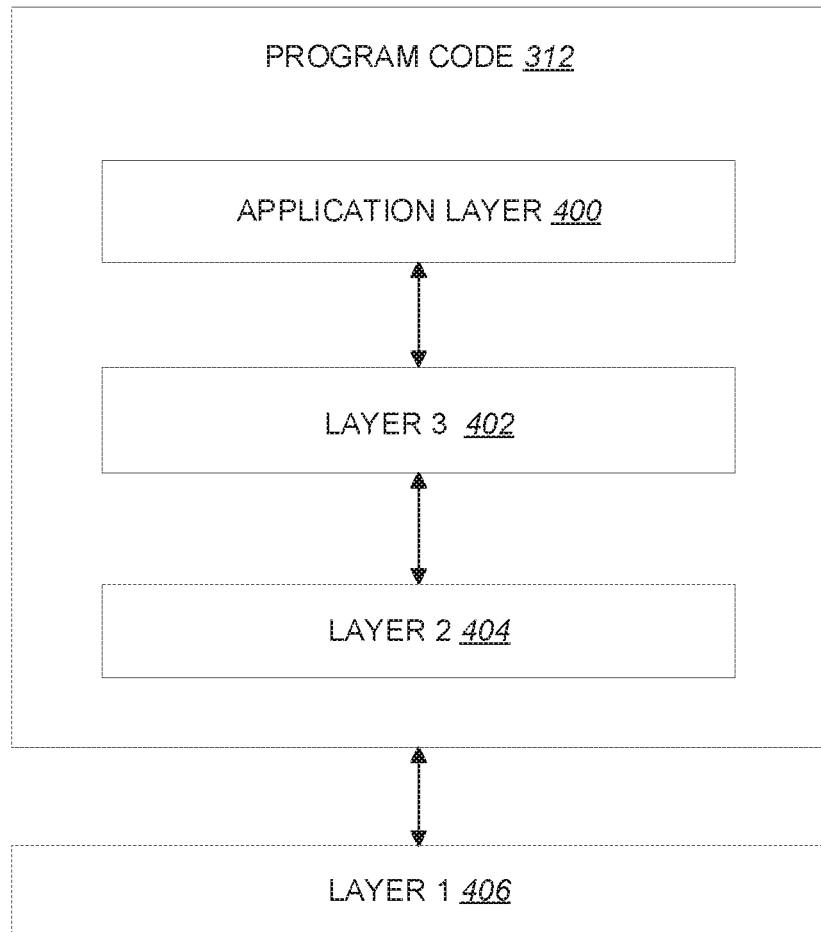
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

A Scheduling Request (SR) may be used for requesting one or more Uplink Shared Channel (UL-SCH) resources for a new transmission. A MAC entity may be configured with zero SR configurations. Alternatively and/or additionally, the MAC entity may be configured with one or more SR configurations. An SR configuration (of the one or more SR configurations) may comprise a set of Physical Uplink Control Channel (PUCCH) resources for an SR across one or more Bandwidth Parts (BWPs) and/or one or more cells.

In some examples, an SR configuration may correspond to one or more logical channels. A logical channel (of the one or more logical channels) may be mapped to zero SR configurations and/or one or more SR configurations (e.g., the logical channel and/or the one or more SR configurations may be configured via Radio Resource Control (RRC)). An SR configuration of a logical channel associated with triggering a Buffer Status Report (BSR) may be considered as a corresponding SR configuration for the BSR.

In some examples, if an SR associated with an SR configuration is triggered and/or there are no other SRs corresponding to the SR configuration that are pending, the MAC entity may set the SR_COUNTER variable of the SR configuration to 0. Alternatively and/or additionally, when an SR is triggered, the SR may be considered to be pending until the SR is canceled. Alternatively and/or additionally, one or more pending SRs that are triggered prior to a MAC Protocol Data Unit (PDU) assembly may be canceled and/or one or more sr-ProhibitTimer parameters associated with the one or more pending SRs may be stopped when a MAC PDU is transmitted. The MAC PDU may comprise a BSR MAC Control Element (MAC CE) and/or may comprise a buffer status associated with (and/or up to) a most recent event (e.g., a last event) that triggered a BSR prior to the MAC PDU assembly. One or more pending SRs may be canceled when one or more uplink (UL) grants can accommodate pending data (and/or all pending data) available for transmission.

In an example where one or more SRs are pending, the MAC entity may perform one or more operations for an SR of the one or more SRs (and/or for each SR of the one or more SRs). For example, if a first condition is met, a Random Access (RA) procedure may be initiated on a Special Cell (SpCell) and/or the SR may be canceled. The first condition may be met if the MAC entity does not have a valid PUCCH resource for the SR. Alternatively and/or additionally, if the first condition is not met, if a second condition is met and/or if a third condition is met, an SR_COUNTER parameter may be incremented by 1, a physical layer may be instructed to signal the SR on a valid PUCCH resource for SR and/or an sr-ProhibitTimer parameter may be started. The second condition may be met if the MAC entity has an SR transmission occasion on the valid PUCCH resource for SR, if an sr-ProhibitTimer parameter is not running during the SR transmission occasion, if the PUCCH resource for the SR transmission occasion does not overlap with a measurement gap and/or if the PUCCH resource for the SR transmission occasion does not overlap with a UL-SCH resource. Alternatively and/or additionally, the third condition may be met if the SR_COUNTER parameter is smaller than an sr-TransMax parameter. Alternatively and/or additionally, if the first condition is not met, if the second condition is met and/or if the third condition is not met, an RRC may be notified to release PUCCH for one or more serving cells, the RRC may be notified to release one or more Sounding Reference Signals (SRSs) for the one or more serving cells, one or more configured downlink assignments and/or one or more uplink grants may be cleared, an RA procedure may be initiated on the SPCell and/or the one or more SRs may be canceled. In some examples, UE implementation may be association with a selection of a (valid) PUCCH resource for SR to signal SR when the MAC entity has more than one overlapping valid PUCCH resource for an SR transmission occasion.

A buffer status reporting procedure may be used to provide a serving gNB (e.g., gNodeB) with information associated with UL data volume in the MAC entity. In some examples, a logical channel may be allocated to a logical channel group (LCG). A maximum number of LCGs may be 8 (and/or a different number).

The MAC entity may determine an amount of UL data available for a logical channel according to a data volume calculation procedure. A regular BSR (e.g., a BSR) may be triggered if the MAC entity has new UL data available for a logical channel which belongs to an LCG. Alternatively and/or additionally, the regular BSR may be triggered if the new UL data belongs to a logical channel with a higher priority than a priority of a logical channel containing available UL data which belongs an LCG and/or logical channels belonging to an LCG does not comprise available UL data. Alternatively and/or additionally, the regular BSR may be triggered if a retxBSR-Timer expires and/or one or more logical channels belonging to an LCG comprises UL data.

In some examples, for the regular BSR, if the regular BSR is triggered for a logical channel for which a logicalChannelSR-DelayTimerApplied parameter is configured by upper layers, a logicalChannelSR-DelayTimer may be started and/or restarted. Alternatively and/or additionally, for the regular BSR, if the regular BSR is not triggered for a logical channel for which the logicalChannelSR-DelayTimerApplied parameter is configured by upper layers, the logicalChannelSR-DelayTimer may be stopped if the logicalChannelSR-DelayTimer is running.

Alternatively and/or additionally, a padding BSR (e.g., a BSR) may be triggered if UL resources are allocated and/or a number of padding bits is greater than or equal to a size of a BSR MAC CE (with a subheader).

Alternatively and/or additionally, a periodic BSR (e.g., a BSR) may be triggered if a periodicBSR-Timer expires.

In some examples, for the regular BSR and/or the periodic BSR, if more than one LCG has data available for transmission when a MAC PDU comprising the regular BSR and/or the periodic BSR is to be built, a Long BSR may be reported for the more than one LCG having data available for transmission. Alternatively and/or additionally, for the regular BSR and/or the periodic BSR, if only one LCG has data available for transmission when the MAC PDU comprising the regular BSR and/or the periodic BSR is to be built, a Short BSR may be reported.

In some examples, a BSR (e.g., a regular BSR) may be triggered based upon an expiration of a retxBSR-Timer parameter. The MAC entity may consider that a logical channel associated with triggering the BSR is a highest priority logical channel having data available for transmission when the BSR is triggered. In some examples, if a buffer status reporting procedure determines that one or more BSRs are triggered and/or are not canceled and/or if one or more UL-SCH resources are available for new transmission, a multiplexing and assembly procedure may be instructed to generate one or more BSR MAC CEs, a periodicBSR-Timer parameter may be started and/or restarted unless one or more (and/or all) BSRs are long or short truncated BSRs, and/or retxBSR-Timer may be started and/or restarted. Alternatively and/or additionally, if a buffer status reporting procedure determines that one or more BSRs are triggered and/or are not canceled, if a regular BSR is triggered and/or a logicalChannelSR-DelayTimer parameter is not running, if the MAC entity is configured with one or more configured UL grants and/or the regular BSR is (and/or was) not triggered for a logical channel for which logical channel SR masking (e.g., a logicalChannelSR-Mask parameter) is setup by upper layers and/or if one or more UL-SCH resources available for a new transmission do not meet Logical Channel Prioritization (LCP) mapping restrictions configured for one or more logical channels associated with triggering one or more BSRs, an SR may be triggered.

In some examples, a MAC PDU associated with multiple events triggering a BSR, may comprise a single BSR MAC CE. Alternatively and/or additionally, a regular BSR and/or a periodic BSR may have precedence over a padding BSR. Alternatively and/or additionally, a MAC entity may restart retxBSR-Timer responsive to reception of a grant for transmission of new data on a UL-SCH. Alternatively and/or additionally, one or more triggered BSRs may be canceled when one or more UL grants can accommodate pending data (and/or all pending data) available for transmission and/or when the one or more UL grants are not sufficient to accommodate a BSR MAC CE with a subheader. In some examples, one or more BSRs (and/or all BSRs) triggered prior to a MAC PDU assembly may be canceled when a MAC PDU comprising a BSR MAC CE is transmitted.

In some examples, Integrated Access and Backhaul (IAB) may facilitate deployment of a (dense) network of self-backhauled New Radio Access Technology (NR) cells in an integrated manner by building upon many control channels and/or procedures and/or data channels and/or procedures defined for providing access to UEs.

Figure 5:
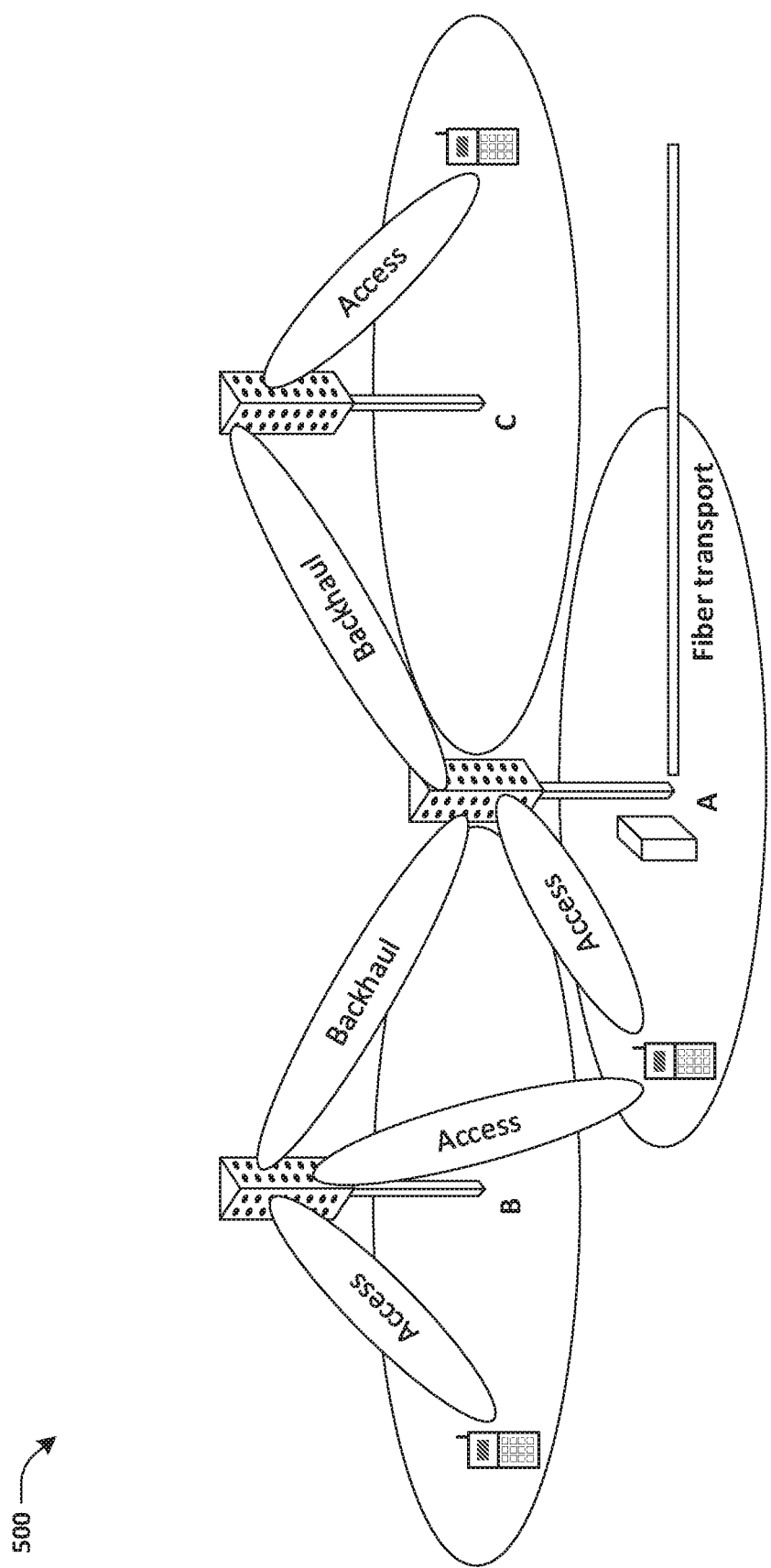
FIG. 5 illustrates an example of a network with Integrated Access and Backhaul (IAB) links.

FIG. 5 illustrates an example 500 of a network with IAB links. Relay nodes (e.g., Relay Transmission/Reception Points (rTRPs)) may multiplex access and/or backhaul links in time, frequency and/or space (e.g., beam-based operation). Operation of links may be associated with similar and/or different frequencies (e.g., the links may be associated with in-band and/or out-band relays). In-band operation may be associated with a tight interworking with access links operating on a similar frequency.

In some examples, Mobile-Termination (MT), gNB-Distributed Unit (gNB-DU), gNB-Central Unit (gNB-CU), User Plane Function (UPF), Access and Mobility Management Function (AMF) and/or Session Management Function (SMF) may be used in IAB functions and/or may be included in IAB architectures. Alternatively and/or additionally, one or more interfaces, such as NR Uu interface (associated with E-UTRA and/or UMTS Terrestrial Radio Access (UTRA)), F1 interface, NG interface, X2 interface and/or N4 interface may be used in IAB functions and/or may be included in IAB architectures. Alternatively and/or additionally, one or more functionalities such as multi-hop forwarding, may be used in IAB functions and/or may be included in IAB architectures. MT function may be a component of a Mobile Equipment. The MT function may be associated with and IAB-node terminating radio interface layers of a backhaul interface toward an IAB-donor and/or other IAB-nodes.

Figure 6A:
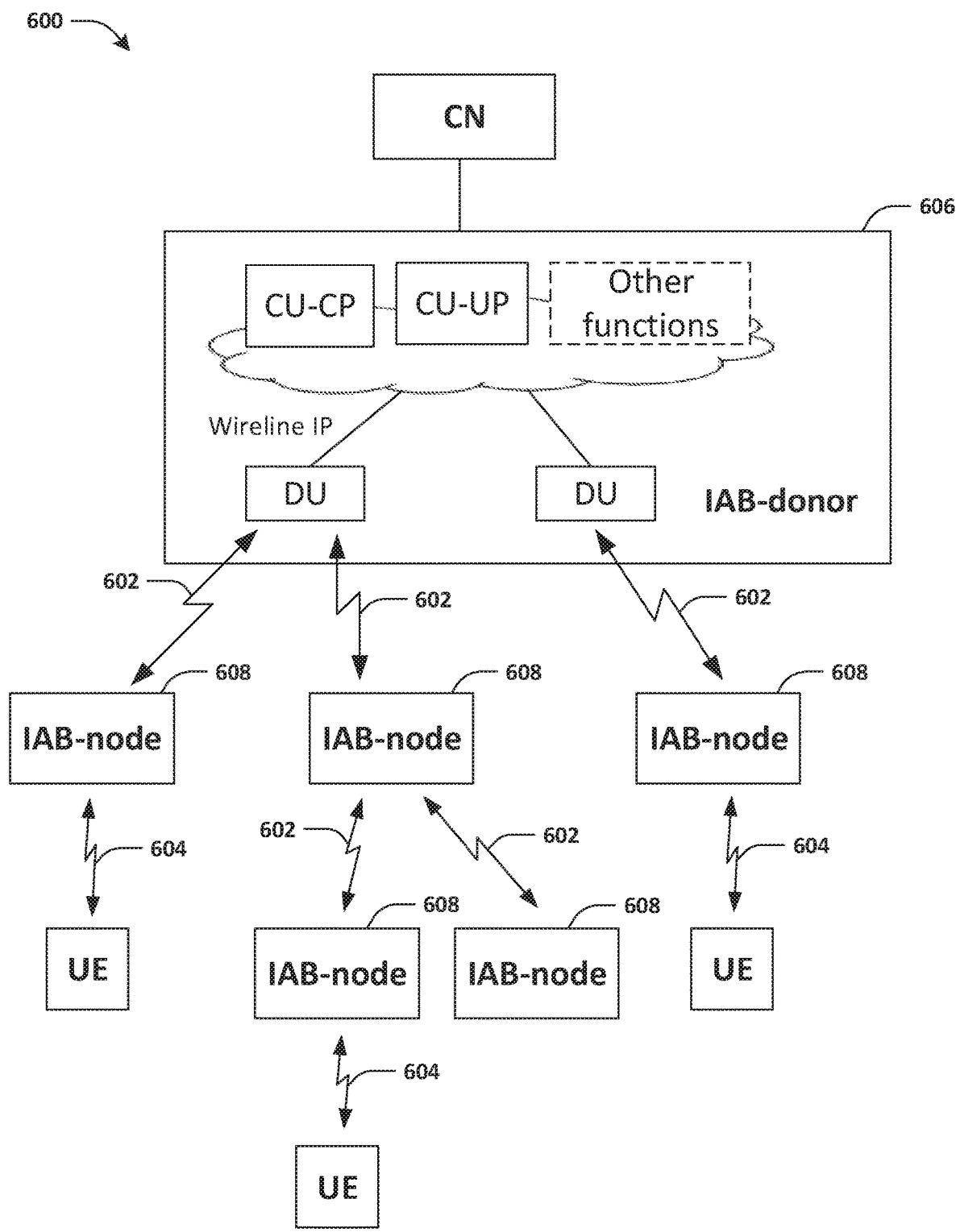
FIG. 6A illustrates an example architecture of a network in standalone mode.

FIG. 6A illustrates an example architecture 600 of a network in standalone mode. For example, the network may comprise an IAB-donor 606 and/or a plurality of IAB-nodes 608. The IAB-donor may be associated with a single logical node comprising one or more functions, such as gNB-DU, gNB-CU-Control Plane (gNB-CU-CP), gNB-CU-User Plane (gNB-CU-UP) and/or one or more other functions. In some examples, the IAB-donor 606 may be split based upon the one or more functions. The one or more functions may be collocated and/or non-collocated (in accordance with 3GPP Nextgen-RAN architecture). In some examples, IAB-nodes of the plurality of IAB-nodes 608 may be connected to the IAB-donor 606 via one or more wireless backhaul links of a plurality of wireless backhaul links 602. Alternatively and/or additionally, a first IAB-node of the plurality of IAB-nodes 608 may be connected to a second IAB-node of the plurality of IAB-nodes 608 via one or more wireless backhaul links of the plurality of wireless backhaul links 602. Alternatively and/or additionally, a UE may be connected to an IAB-node of the plurality of IAB-nodes 608 via a wireless access link of a plurality of wireless access links 604.

Figure 6B:
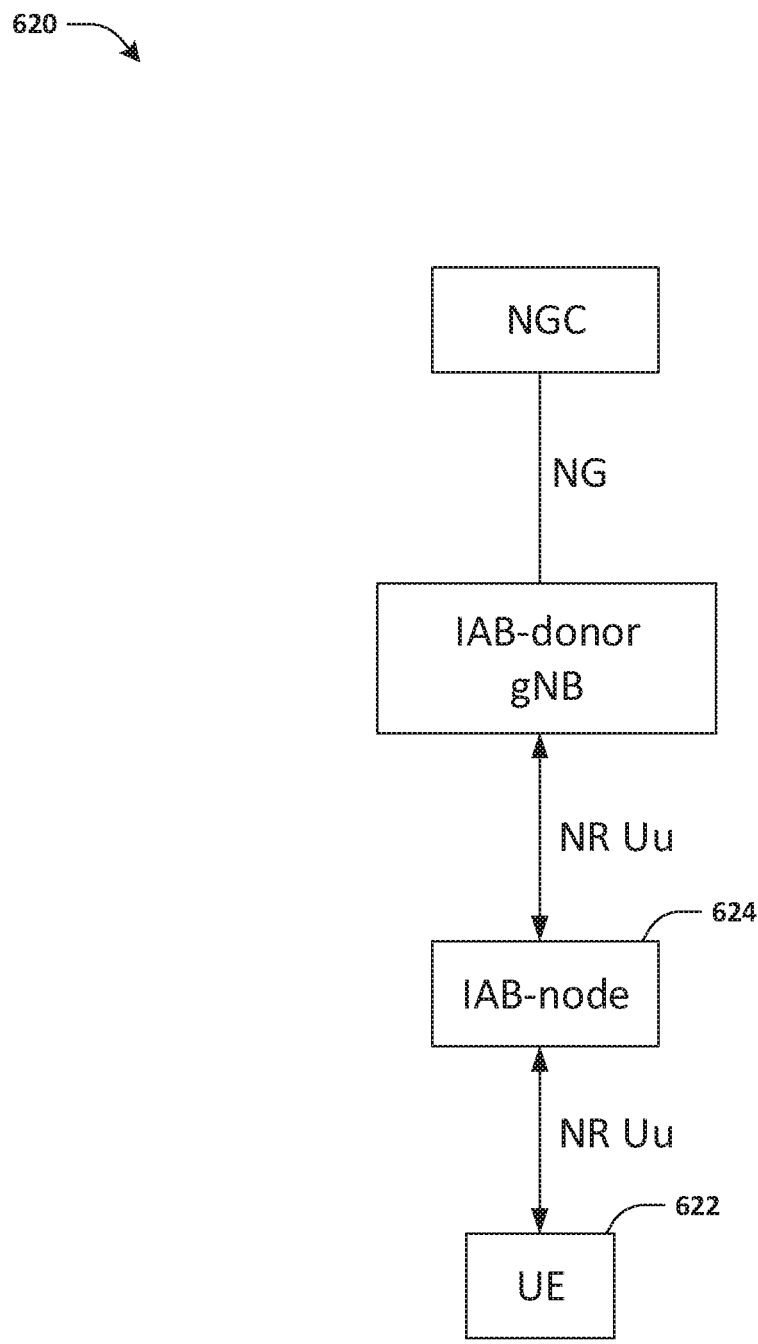
FIG. 6B illustrates an example architecture of a network associated with standalone mode operation.

FIG. 6B illustrates an example architecture 620 of a network associated with standalone mode operation. In some examples, a UE 622 of the network may operate in standalone mode with Next Generation Core (NGC). Alternatively and/or additionally, an IAB-node 624 of the network may operate in standalone mode with NGC. The UE 622 may be connected to the IAB-node 624.

Figure 6C:
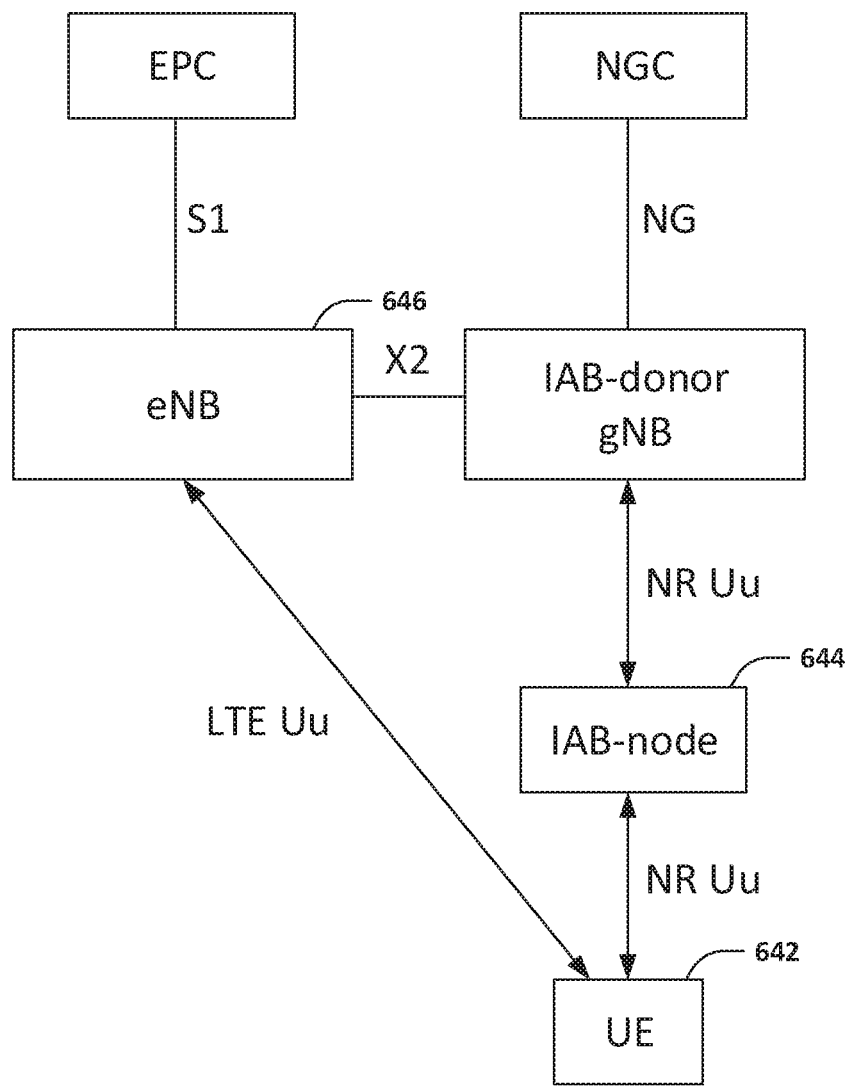
FIG. 6C illustrates an example architecture of a network, where a UE of the network may operate in non-standalone mode with Evolved Packet Core (EPC) and/or an IAB-node of the network may operate in standalone mode with Next Generation Core (NGC).

Alternatively and/or additionally, a UE may choose an operation mode (e.g., non-standalone mode), different than an operation mode of an IAB-node connected to the UE. FIG. 6C illustrates an example architecture 640 of a network, where a UE 642 of the network may operate in non-standalone mode with Evolved Packet Core (EPC) and/or an IAB-node 644 of the network may operate in standalone mode with NGC. The UE 642 may be connected to the IAB-node 644. Alternatively and/or additionally, the UE may be connected to an eNB 646 that is different than the IAB-node 644.

Figure 6D:
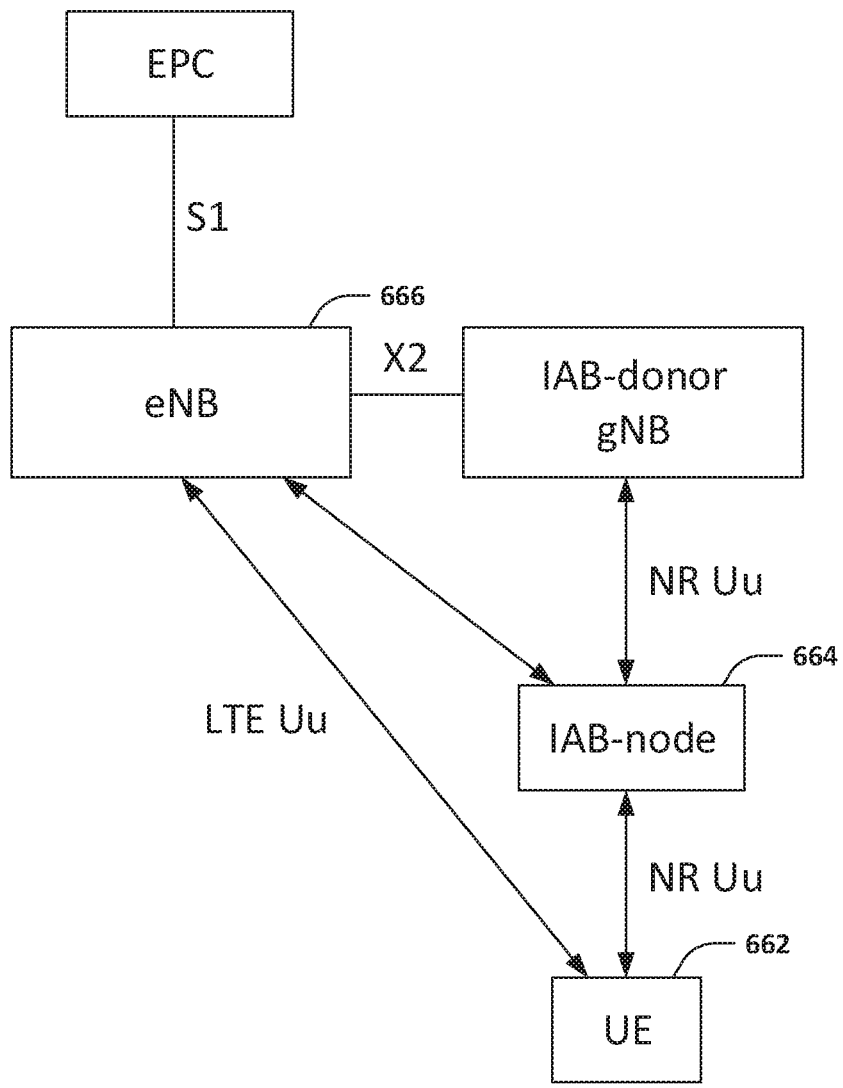
FIG. 6D illustrates an example architecture of a network, where a UE of the network may operate in non-standalone mode with EPC and/or an IAB-node of the network may operate in non-standalone mode with EPC.

FIG. 6D illustrates an example architecture 660 of a network, where a UE 662 of the network may operate in non-standalone mode with EPC and/or an IAB-node 664 of the network may operate in non-standalone mode with EPC. The UE 662 may be connected to the IAB-node 664. Alternatively and/or additionally, the UE may be connected to an eNB 666 that is different than the IAB-node 664.

Figure 7A:
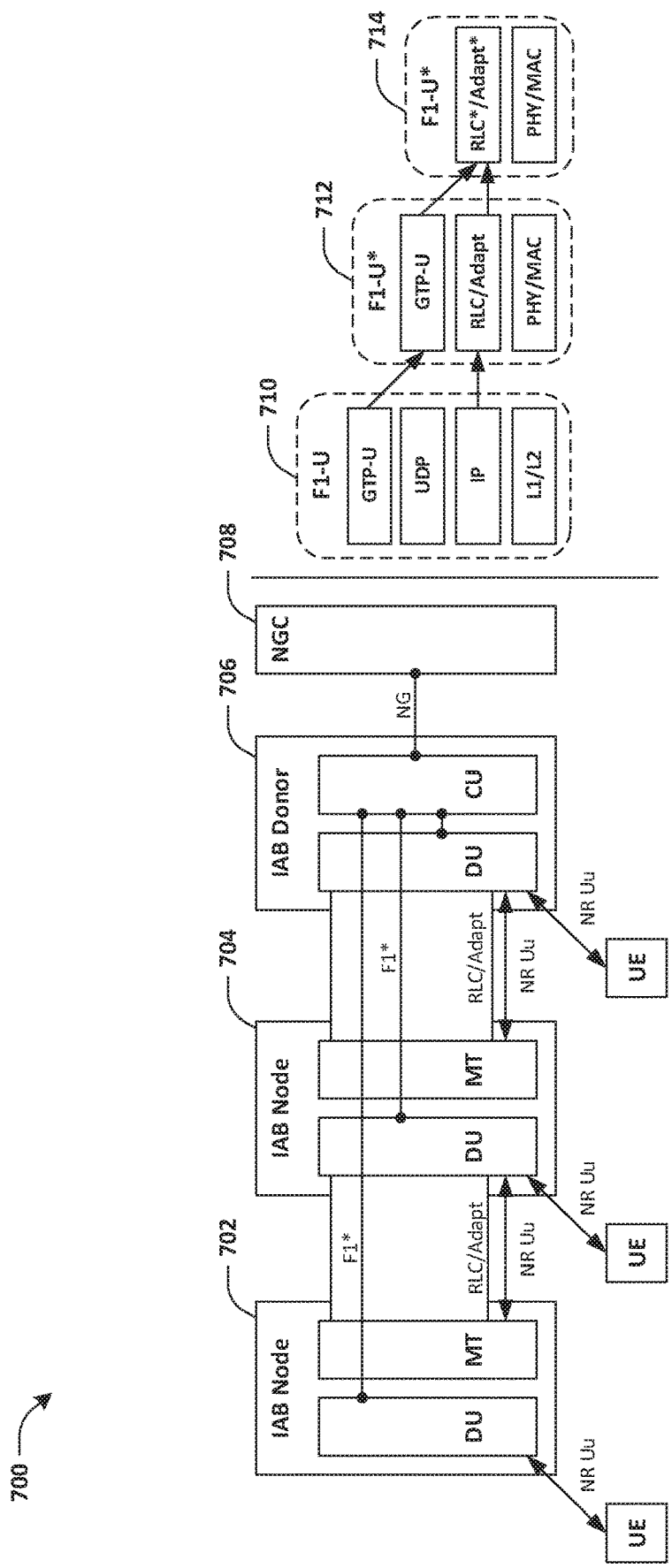
FIG. 7A illustrates a first IAB architecture of a network providing for multi-hop forwarding.

FIG. 7A illustrates a first IAB architecture 700 of a network providing for multi-hop forwarding. The first IAB architecture 700 may use Central Unit (CU) and/or Distributed Unit (DU) split architecture. The first IAB architecture 700 may be associated with backhauling of an F1 User Plane (F1-U) interface using an adaption layer. Alternatively and/or additionally, the first IAB architecture 700 may be associated with General Packet Radio Service tunneling protocol (GTP) and/or a GTP User Plane (GTP-U) interface with an adaption layer. Alternatively and/or additionally, the first IAB architecture 700 may be associated with hop-by-hop forwarding across intermediate nodes using an adaption layer for operation with NGC. Alternatively and/or additionally, the first IAB architecture 700 may be associated with Packet Data Network (PDN)-connection-layer routing for operation with EPC.

In some examples, the first IAB architecture 700 may be associated with a two-hop chain of IAB-nodes, comprising a first IAB-node 702 and/or a second IAB-node 704, and/or an IAB-donor 706. The first IAB-node 702, the second IAB-node 704 and/or one or more UEs may be connected (in standalone mode) to an NGC 708. The first IAB-node 702 may hold a first DU and/or a first MT. The second IAB-node 704 may hold a second DU and/or a second MT. The first IAB-node 702 may connect to an upstream IAB-node (e.g., the second IAB-node 704) using the first MT. Alternatively and/or additionally, the second IAB-node 704 may connect to the IAB-donor 706 via the second MT. Alternatively and/or additionally, the first IAB-node 702 may connect to and/or establish one or more first Radio Link Control (RLC) channels to one or more UEs and/or one or more downstream IAB-nodes via the first DU. Alternatively and/or additionally, the second IAB-node 704 may connect to and/or establish one or more second RLC-channels to one or more UEs and/or one or more downstream IAB-nodes (e.g., the first IAB-node 702) via the second DU. In some examples, the one or more first RLC channels and/or the one or more second RLC channels may be associated with a modified RLC (e.g., depicted as RLC* in FIG. 7A).

In some examples, the IAB-donor 706 holds a third DU to support one or more UEs and/or one or more MTs (e.g., the second MT) of one or more downstream IAB-nodes (e.g., the second IAB-node 704). The IAB-donor 706 may hold a CU to support DUs (e.g., the first DU and/or the second DU) of IAB-nodes and/or the third DU of the IAB-donor 706. The first DU of the first IAB-node 702 and/or the second DU of the second IAB-node 704 may be connected to the CU of the IAB-donor 706 using a modified F1-U 712 (e.g., depicted as F1-U* and/or F1* in FIG. 7A) and/or using a second modified F1-U 714 (e.g., depicted as F1-U* and/or F1* in FIG. 7A). The modified F1-U 712 and/or the second modified F1-U 714 may be configured based upon F1-U 710 (e.g., the F1-U interface).

The modified F1-U 712 and/or the second modified F1-U 714 runs over one or more RLC channels on a wireless backhaul between an MT of a serving IAB-node (e.g., the second MT of the second IAB-node 704) and the third DU of the IAB-donor 706. The modified F1-U 712 and/or the second modified F1-U 714 may comprise an adaption layer comprising routing information associated with hop-by-hop forwarding. The adaption layer of the modified F1-U 712 and/or the second modified F1-U 714 may replace IP functionality of the F1-U 710. The modified F1-U 712 and/or the second modified F1-U 714 may carry a GTP-U header for end-to-end association between the CU and one or more DUs (e.g., the first DU, the second DU, the third DU, etc.). Alternatively and/or additionally, the modified F1-U 712 may be further modified to configured the second modified F1-U 714 by including the GTP-U header in the adaption layer.

For non-standalone operation with EPC, an MT (e.g., the first MT and/or the second MT) may be dual-connected with a network using E-UTRAN New Radio-Dual Connectivity (EN-DC). The MT may sustain a PDN connection with the EPC.

Figure 7B:
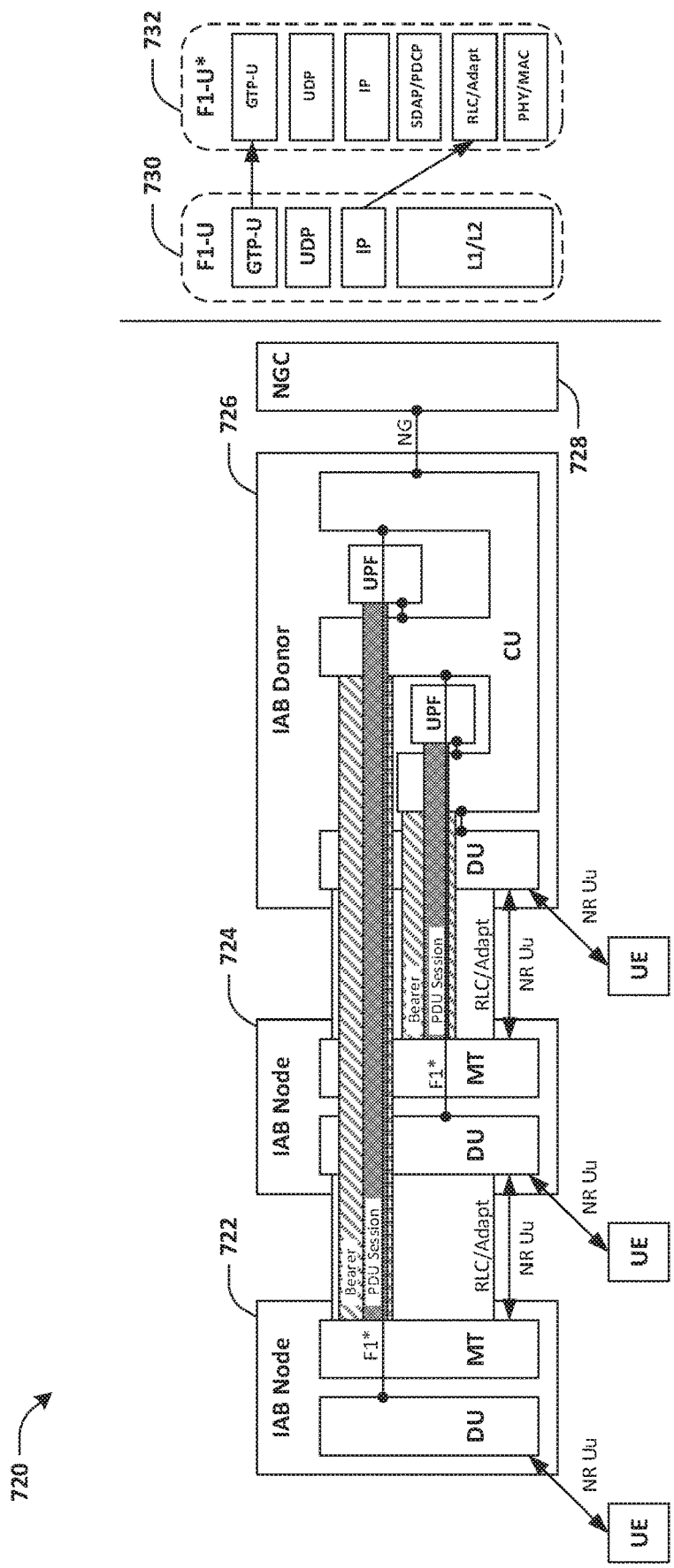
FIG. 7B illustrates a second IAB architecture of a network providing for multi-hop forwarding.

FIG. 7B illustrates a second IAB architecture 720 of a network providing for multi-hop forwarding. The second IAB architecture 720 may use CU and/or DU split architecture. The second IAB architecture 720 may be associated with backhauling of an F1-U interface on an access node using GTP-U interface, User Datagram Protocol (UDP) and/or Internet Protocol (IP). Alternatively and/or additionally, the second IAB architecture 720 may be associated with hop-by-hop forwarding across intermediate nodes using an adaption layer.

In some examples, the second IAB architecture 720 may be associated with a two-hop chain of IAB-nodes, comprising a first IAB-node 722 and/or a second IAB-node 724, and/or an IAB-donor 726. The first IAB-node 722, the second IAB-node 724 and/or one or more UEs may be connected (in standalone mode) to an NGC 728. The first IAB-node 722 may hold a first DU and/or a first MT. The second IAB-node 724 may hold a second DU and/or a second MT. The first IAB-node 722 may connect to an upstream IAB-node (e.g., the second IAB-node 724) using the first MT. Alternatively and/or additionally, the second IAB-node 724 may connect to the IAB-donor 726 via the second MT. Alternatively and/or additionally, the first IAB-node 722 may connect to and/or establish one or more first RLC channels to one or more UEs and/or one or more downstream IAB-nodes via the first DU. Alternatively and/or additionally, the second IAB-node 724 may connect to and/or establish one or more second RLC-channels to one or more UEs and/or one or more downstream IAB-nodes (e.g., the first IAB-node 722) via the second DU.

In some examples, the IAB-donor 726 holds a third DU to support one or more UEs and/or one or more MTs (e.g., the second MT) of one or more downstream IAB-nodes (e.g., the second IAB-node 724). The IAB-donor 726 may hold a CU to support DUs (e.g., the first DU and/or the second DU) of IAB-nodes and/or the third DU of the IAB-donor 726. The first DU of the first IAB-node 722 and/or the second DU of the second IAB-node 724 may be connected to the CU of the IAB-donor 726 using a modified F1-U 732 (e.g., depicted as F1-U* and/or F1* in FIG. 7B). The modified F1-U 732 may be configured based upon F1-U 730 (e.g., the F1-U interface).

In some examples, the first MT of the first IAB-node 722 may establish a PDU-session with a first UPF residing on the IAB-donor 726. The PDU-session may carry the modified F1-U 732 for the first (collocated) DU. For example, the PDU-session may provide a point to point link between the first DU and the CU.

Alternatively and/or additionally, the second MT of the second IAB-node 724 may establish a PDU-session with a second UPF residing on the IAB-donor 726. The PDU-session may carry the modified F1-U 732 for the second (collocated) DU. For example, the PDU-session may provide a point to point link between the second DU and the CU.

For non-standalone operation with EPC, an MT (e.g., the first MT and/or the second MT) may be dual-connected with a network using EN-DC. The MT may sustain a PDN connection with an L-GW residing on the IAB-donor 726.

In some examples, an IAB-node may correspond to an RAN node. The IAB-node may support wireless access to one or more UEs. Alternatively and/or additionally, the IAB-node may (wirelessly) backhaul access traffic (associated with the wireless access to the one or more UEs). In some examples, the IAB-node may correspond to an rTRP.

In some examples, an IAB-donor may provide an interface associated with a UE to a core network. The IAB-donor may provide wireless backhauling functionality to one or more IAB-nodes. In some examples, the IAB-donor may correspond to an anchor node.

In some examples, a parent node of a first IAB-node may be connected to the first IAB-node. For example, the first IAB-node may have a direct link to the parent node. In some examples, a direction from the first IAB-node to the parent node is associated with an uplink direction. For example, the first IAB-node may be served by the parent node. Alternatively and/or additionally, the first IAB-node may be scheduled by the parent node. In some examples, the parent node may correspond to an IAB-node (different than the first IAB-node and/or different than the child node). Alternatively and/or additionally, the parent node may correspond to an IAB-donor.

In some examples, a child node of the first IAB-node may be connected to the first IAB-node. For example, the first IAB-node may have a direct link to the child node. In some examples, a direction from the first IAB-node to the child node is associated with a downlink direction. For example, the first IAB-node may serve the child node. Alternatively and/or additionally, the first IAB-node may schedule the child node. In some examples, the child node may correspond to a UE. Alternatively and/or additionally, the child node may correspond to an IAB-node (different than the first IAB-node).

In some examples, the first IAB-node (and/or other IAB-nodes) may comprise an network (NW) part and/or an MT part. The NW part may have one or more functionalities associated with a network and/or a gNB-DU. The MT part may have one or more functionalities associated with a UE (e.g., a mobile phone and/or a different type of UE).

In some examples, the first IAB-node may perform network operations using the NW part to interact with the child node. For example, the network operations may be associated with and/or may be similar to operations performed by a network.

In some examples, the first IAB-node may perform UE operations using the MT part to interact with the parent node. For example, the UE operations may be associated with and/or may be similar to operations performed by a UE.

In some examples, the first IAB-node may perform the network operations and/or the UE operations concurrently (e.g., simultaneously).

Alternatively and/or additionally, the first IAB-node may perform the network operations and/or the UE operations separately (e.g., the network operations and/or the UE operations may be performed in a time-division manner). In some examples, the first IAB-node may acquire UL resources (from the parent node of the first IAB-node) by transmitting a signaling to the parent node of the first IAB-node. In some examples, the signaling may correspond to an SR. The SR may be transmitted (to the parent node) via a PUCCH. The PUCCH may correspond to a UL channel between the first IAB-node and the parent node. Alternatively and/or additionally, the signaling may correspond to an RA Preamble. The RA Preamble may be transmitted via a Physical Random Access Channel (PRACH). The PRACH may correspond to a UL channel between the first IAB-node and the parent node.

Responsive to receiving the signaling, the parent node may provide a UL grant to the first IAB-node (e.g., based upon a determination that the first IAB-node transmitted the signaling). The first IAB-node may perform UL data transmission on a Physical Uplink Shared Channel (PUSCH) based upon the UL grant. In some examples, the UL grant may correspond to a Downlink Control Information (DCI) received via a Physical Downlink Control Channel (PDCCH). The PUSCH may correspond to a UL channel between the first IAB-node and the parent node. The PDCCH may correspond to a DL channel between the first IAB-node and the parent node.

In some examples, a first UE may connect (e.g., directly connect) to the first IAB-node. The first IAB-node may correspond to a first access node of the first UE. A link between the first UE and the first IAB-node may correspond to an access link. Alternatively and/or additionally, one or more intermediate IAB-nodes may exist between (a connection of) the first IAB-node and an IAB-donor. Alternatively and/or additionally, the first IAB-node (e.g., the first access node) may correspond to an intermediate node (between the first UE and the IAB-donor). A link between the first IAB-node and a second IAB-node may correspond to a backhaul link. Alternatively and/or additionally, a link between the first IAB-node and the IAB-donor may correspond to a backhaul link. The first IAB-node may be associated with one or more child nodes (e.g., the first IAB-node may be connected to the one or more child nodes, such as one or more UEs and/or one or more IAB-nodes). Alternatively and/or additionally, the first IAB-node may be associated with one or more parent nodes (e.g., the first IAB-node may be connected to the one or more parent nodes, such as one or more IAB-donors and/or one or more IAB-nodes). In some examples, an IAB system may be associated with a multi-hop functionality.

Figure 8:
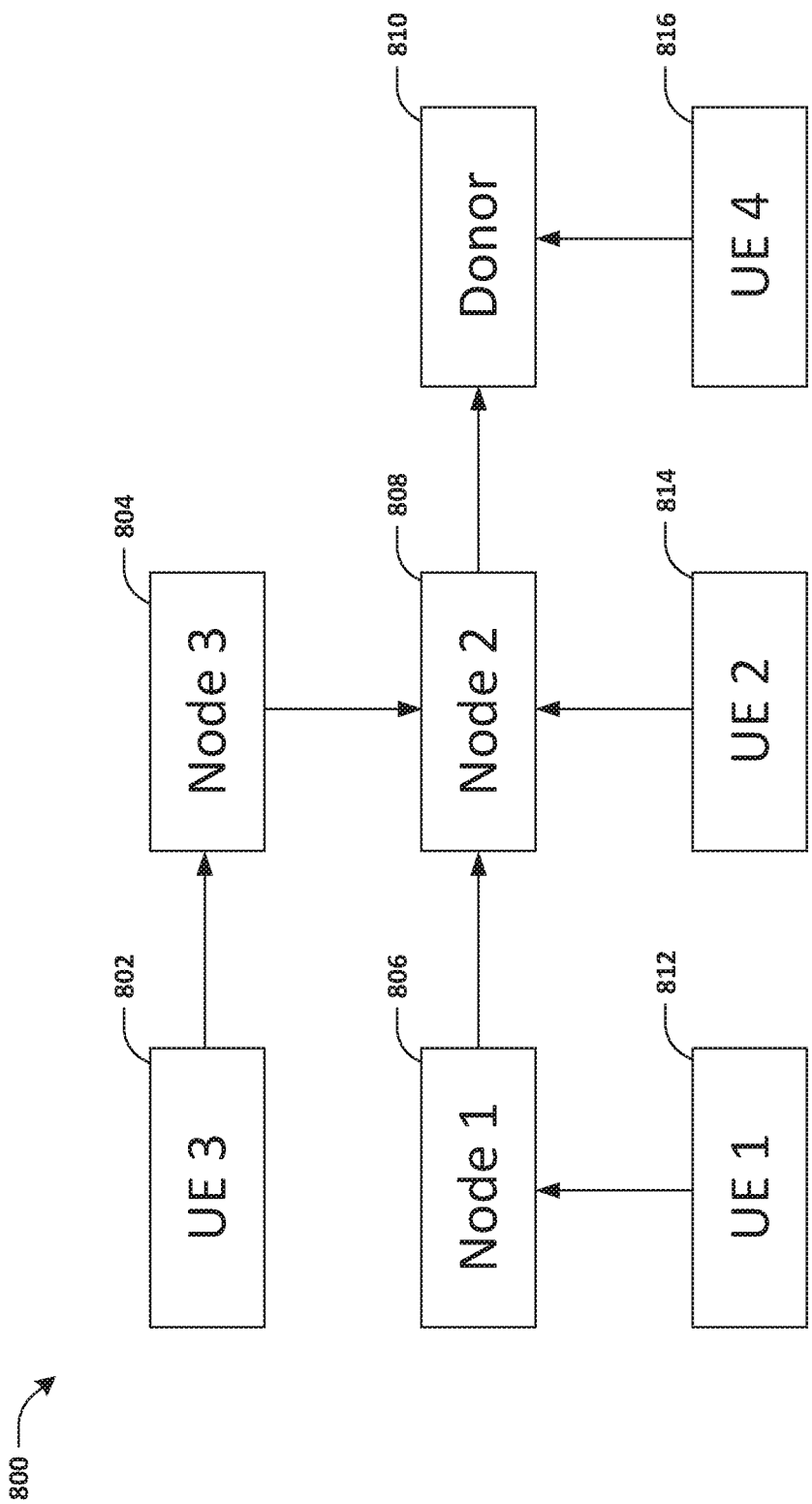
FIG. 8 illustrates an example of an IAB system.

FIG. 8 illustrates an example of an IAB system 800. The IAB system 800 may comprise a first UE 812 (UE 1), a second UE 814 (UE 2), a third UE 802 (UE 3) and/or a fourth UE 816 (UE 4). The IAB system 800 may comprise a first IAB-node 806 (Node 1), a second IAB-node 808 (Node 2) and/or a third IAB-node 804 (Node 3). The IAB system 800 may comprise a first IAB-donor 810.

The first UE 812 may be (directly) connected to the first IAB-node 806 (via an access link). The first IAB-node 806 may correspond to an access node of the first UE 812. The second IAB-node 808 may be between (a connection of) the first IAB-node 806 and the first IAB-donor 810. The second IAB-node 808 may correspond to an intermediate node of the first IAB-node 806 and the first IAB-donor 810 (e.g., the first IAB-node 806 may be connected to the second IAB-node 808 via a backhaul link and/or the second IAB-node 808 may be connected to the first IAB-donor 810 via a backhaul link).

The second UE 814 may be (directly) connected to the second IAB-node 808 (via an access link). The second IAB-node 808 may correspond to an access node of the second UE 814. The second IAB-node 808 may be (directly) connected to the first IAB-donor 810 (via a backhaul link).

The third UE 802 may be (directly) connected to the third IAB-node 802 (via an access link). The third IAB-node 802 may correspond to an access node of the third UE 802. The second IAB-node 808 may be between (a connection of) the third IAB-node 802 and the first IAB-donor 810. The second IAB-node 808 may correspond to an intermediate node of the third IAB-node 802 and the first IAB-donor 810 (e.g., the third IAB-node 802 may be connected to the second IAB-node 808 via a backhaul link and/or the second IAB-node 808 may be connected to the first IAB-donor 810 via a backhaul link).

The fourth UE 816 may be (directly) connected to the first IAB-donor 810.

In some examples, the first UE 812 may be associated with a first number of hops associated with backhauling. For example, the first number of hops may correspond to a first number of IAB-nodes between the first UE 812 and the first IAB-donor 812 (e.g., the first number of hops may be 2 based upon the first IAB-node 806 and/or the second IAB-node 808 between the first UE 812 and the first IAB-donor 812). Alternatively and/or additionally, the third UE 802 may be associated with the first number of hops (e.g., based upon the third IAB-node 802 and/or the second IAB-node 808 between the third UE 802 and the first IAB-donor 812). The first number of hops (e.g., 2) may be associated with multi-hop backhauling. For example, a number of hops may correspond to a number of (intermediate) IAB-nodes between a UE and an IAB-donor.

In some examples, the first UE 812 may be connected to the first IAB-node 806 via a first access link. Alternatively and/or additionally, the first IAB-node 806 may be connected to the second IAB-node 808 via a first backhaul link. Alternatively and/or additionally, the second IAB-node 808 may be connected to the first IAB-donor 810 via a second backhaul link. In some examples, the first backhaul link and/or the first access link may (partially and/or completely) overlap in frequency and/or the first backhaul link may be in-band with respect to the first access link. In some examples, in-band backhauling may be associated with (and/or may cause) half-duplexing and/or interference constraints. Alternatively and/or additionally, when performing operations associated with in-band backhauling, the first IAB-node 806 may not transmit and/or receive data on the first access link and the first backhaul link concurrently. Alternatively and/or additionally, the first backhaul link and/or the first access link may not overlap in frequency and/or the first backhaul link may be out-of-band with respect to the first access link.

In some examples, the first IAB-node 806 and/or the second IAB-node 808 may relay and/or forward first data received from the first UE 812 to the first IAB-donor 810. For example, the first IAB-node 806 may receive the first data from the first UE 812 via the first access link. The first data may be relayed and/or forwarded by the first IAB-node 806 to the second IAB-node 808 via the first backhaul link. In some examples, the first data may be relayed and/or forwarded by the first IAB-node 806 to the second IAB-node 808 by aggregating and/or combining data from other IAB-nodes with the first data into a first combined set of data (e.g., a transport block and/or a MAC PDU) (using one or more multiplexing techniques) and/or transmitting the first combined set of data to the second IAB-node 808. Alternatively and/or additionally, the first data may be relayed and/or forwarded by the second IAB-node 808 to the first IAB-donor 810 via the second backhaul link. In some examples, the first data may be relayed and/or forwarded by the second IAB-node 808 to the first IAB-donor 810 by aggregating and/or combining data from other IAB-nodes with the first data into a second combined set of data and/or transmitting the second combined set of data to the first IAB-donor 810. In some examples, the first data may correspond to UL data (with respect to the first UE 812).

Alternatively and/or additionally, the first IAB-node 806 and/or the second IAB-node 808 may relay and/or forward second data received from the first IAB-donor 810 to the first UE 812. For example, the second IAB-node 808 may receive the second data from the first IAB-donor 810. The second data may be relayed and/or forwarded by the second IAB-node 808 to the first IAB-node 806. In some examples, the second data may be relayed and/or forwarded by the second IAB-node 808 to the first IAB-node 806 by aggregating and/or combining data from other IAB-nodes with the second data into a third combined set of data and/or transmitting the third combined set of data to the first IAB-node 806. Alternatively and/or additionally, the second data may be relayed and/or forwarded by the first IAB-node 806 to the first UE 812. In some examples, the second data may correspond to DL data (with respect to the first UE 812).

In some examples, an IAB-node (e.g., the first IAB-node 806) may be physically fixed to a location. Alternatively, the IAB-node may be mobile (e.g., the IAB-node may be positioned on a bus, a train and/or a different moving object). In some examples, a relay of an IAB system may be L2-relay or L3-relay. Alternatively and/or additionally, resource coordination between IAB-nodes of the IAB system may be distributed or centralized.

UL data may arrive at a buffer of a UE. In some examples, a BSR may be triggered by the UE (e.g. responsive to the UL data arriving at the buffer of the UE). Alternatively and/or additionally, an SR may be triggered. The SR may be triggered responsive to an unavailability of UL resources for transmission of the UL data and/or the BSR. The UE may transmit the SR (e.g. via PUCCH) to an access node. The SR may be transmitted to the access node to acquire one or more UL resources (e.g., one or more transmission resources) (if PUCCH resources for the SR are configured for the UE). Responsive to receiving the SR, the access node (and/or an NW part of the access node) may perform one or more network operations. For example, the access node may transmit and/or provide a UL grant to the UE. The UE may transmit the UL data to the access node based upon the UL grant.

In an example where the access node is an IAB-node and/or is not an IAB-donor, the access node may forward and/or relay the UL data to a parent node associated with the access node (e.g., the access node may be connected to the parent node via a backhaul link). For example, the parent node may be an IAB-donor and/or an IAB-node. The access node may process the UL data (e.g., the access node may perform data processing on the UL data using one or more protocol stacks associated with the access node). Alternatively and/or additionally, the access node (and/or an MT part of the access node) may perform one or more UE operations. For example, the access node may trigger a second BSR and/or the access node may trigger a second SR. The access node may transmit the second SR to the parent node to acquire one or more second UL resources (if PUCCH resources for the second SR are configured for the access node).

Figure 9:
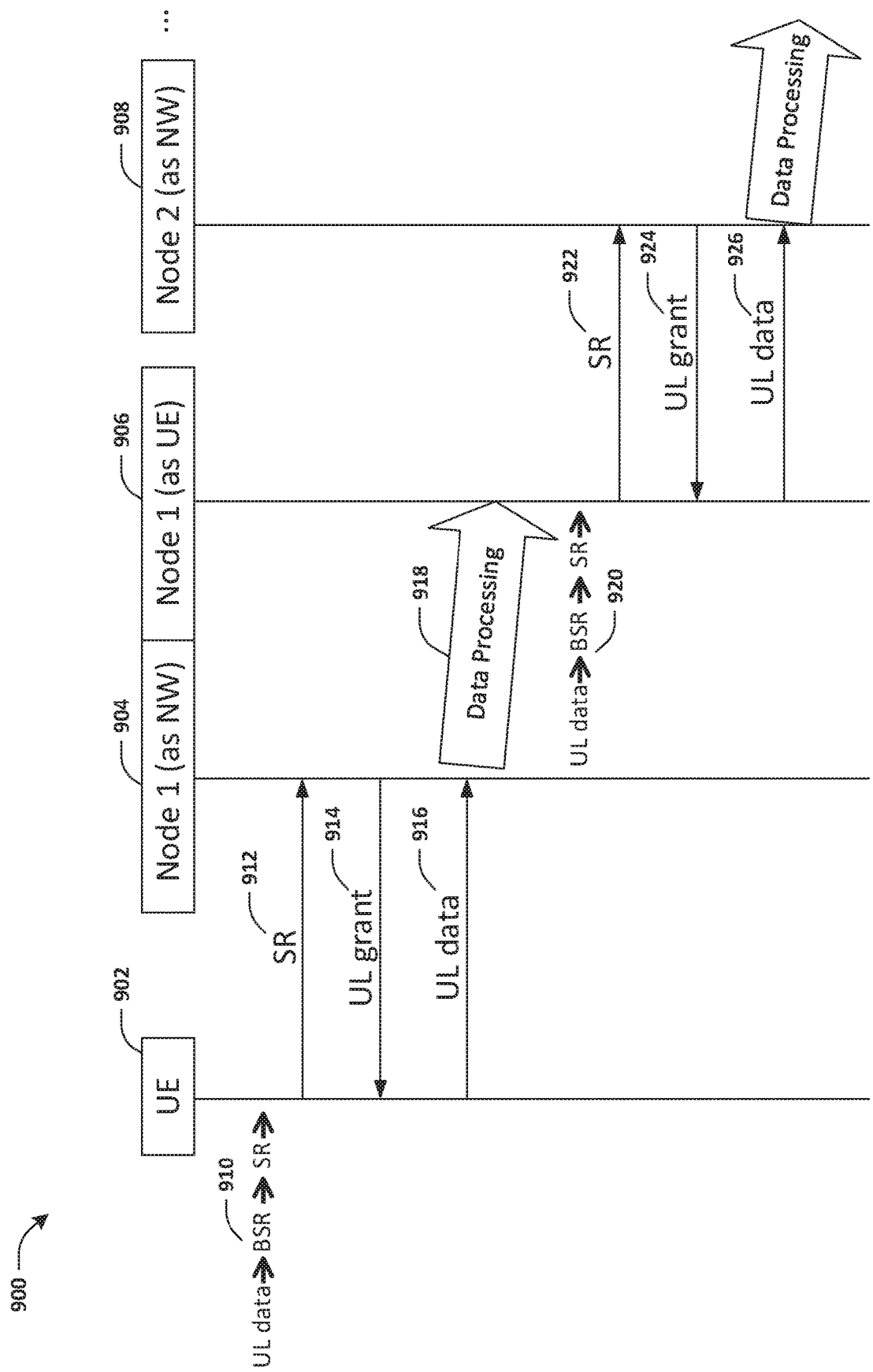
FIG. 9 illustrates an example scenario associated with an IAB system.

FIG. 9 illustrates an example scenario 900 associated with an IAB system. In the example scenario 900, a UE 902 may be connected to an access node (via an access link). The UE 902 may perform one or more first operations 910. The one or more first operations 910 may be associated with UL data arriving at a buffer of the UE 902, the UE 902 triggering a BSR and/or the UE 902 triggering an SR 912. For example, the UE 902 may transmit the SR 912 to the access node. A first part 904 of the access node may receive the SR 912. The first part 904 of the access node may correspond to an NW part of the access node. The first part 904 of the access node may be associated with performing one or more network operations. The first part 904 of the access node may transmit a UL grant 914 to the UE 902 (responsive to receiving the SR 912). The UE 902 may transmit UL data 916 to the access node based upon the UL grant 914. The access node may receive the UL data 916 from the UE 902.

In some examples, the access node may forward and/or relay the UL data 916 to a parent node associated with the access node (e.g., the access node may be connected to the parent node via a backhaul link). The access node may process the UL data (e.g., the access node may perform data processing 918 on the UL data using one or more protocol stacks associated with the access node). Alternatively and/or additionally, the access node may perform one or more second operations 920. For example, the one or more second operations 920 may be performed by a second part 906 of the access node. For example, the second part 906 of the access node may correspond to an MT part of the access node. Alternatively and/or additionally, the second part 906 of the access node may correspond to performing one or more UE operations. In some examples, the one or more second operations 920 may be associated with UL data arriving at a second buffer of the access node, the second part 906 of the access node triggering a second BSR and/or the second part 906 of the access node triggering a second SR 922. The access node (and/or the second part 906 of the access node) may transmit the second SR 922 to the parent node. Alternatively and/or additionally, the second SR 922 may be received by a third part 908 of the parent node, associated with performing one or more network operations. For example, the third part 908 of the parent node may transmit a second UL grant 924 to the access node (e.g., the second UL grant 924 may be received by the second part 906 of the access node). Alternatively and/or additionally, the access node (and/or the second part 906 of the access node) may transmit second UL data 926 to the parent node based upon the second UL grant 924.

In some examples, the second UL data 926 may comprise the UL data 916. Alternatively and/or additionally, transmission of the second UL data 926 to the parent node may be associated with a completion of the UL data 916 being forwarded to the parent node associated with the access node. In some examples, forwarding and/or relaying of the UL data 916 through IAB-nodes via backhaul links may be repeated until the UL data 916 is received by an IAB-donor. For example, for each instance that the UL data 916 is forwarded by an IAB-node to a different IAB-node, one or more steps are performed (e.g., the one or more steps may correspond to one or more of transmission of an SR, reception of a UL grant, transmission of the UL data 916, data processing, triggering of a BSR, triggering of an SR, etc.). Performance of each step of the one or more steps introduces a delay (e.g., a UL delay) corresponding to transmission of the UL data 916 from the UE to the IAB-donor. Alternatively and/or additionally, an increase in a number of hops (associated with a number of IAB-nodes that forward and/or relay the first UL data 916 via backhaul links) causes an increase in an end-to-end delay (e.g., end-to-end UL delay) of the transmission of the UL data 916 from the UE to the IAB-donor.

A first delay, of the end-to-end delay associated with transmission of the UL data 916 from the UE to the IAB-donor, is associated with a time between reception of the UL data 916 by the access node from the UE 902 and transmission of the second UL data 926 (comprising the UL data 916) to the parent node. For example, during the time between reception of the UL data 916 and reception of the second UL grant 924, the data processing 918 may be performed on the UL data 916, the second BSR may be triggered, the second SR 922 may be triggered, and/or the second SR 922 may be transmitted to the parent node.

To reduce the delay, e.g. the first delay, the end-to-end delay between the UE and IAB-donor, SR may be triggered by an IAB-node earlier. The IAB-node could trigger SR when it knows there will be data to be forwarded (or relayed) to its parent node. The IAB-node may trigger SR before receiving the data from its child node. The IAB-node may trigger SR when no data is available for transmission originated from the IAB-node. The IAB-node may trigger SR when no BSR is triggered. For example, the IAB-node could trigger SR when it receives SR from its child node. Alternatively or additionally, the IAB-node could trigger SR when it receives a random access preamble from its child node. Alternatively or additionally, the IAB-node could trigger SR when it allocates UL grant to a child node. The UL grant may be for a new transmission. The UL grant may be for a re-transmission.

In some examples, the second SR 922 may be triggered (earlier) prior to the access node (and/or the first part 904 of the access node) receiving the UL data 916. The second SR 922 may be triggered when the UL data 916 is not available to the access node and/or the first part 904 of the access node. Alternatively and/or additionally, the second SR 922 may be triggered prior to transmission of the UL grant 914 to the UE 902. Alternatively and/or additionally, the second SR 922 may be triggered prior to triggering the second BSR (and/or a different BSR). Alternatively and/or additionally, the second SR 922 may be triggered regardless of whether the second BSR (and/or a different BSR) is triggered. Alternatively and/or additionally, the second SR 922 may be triggered responsive to receiving the SR 912 from the UE 902 (and/or from a different child node of the access node). Alternatively and/or additionally, the second SR 922 may be triggered responsive to receiving an RA preamble from the UE 902 (and/or from a different child node of the access node). Alternatively and/or additionally, the second SR 922 may be triggered responsive to allocating (and/or providing) the UL grant 914 to the UE 902 (and/or to a different child node of the access node). For example, the UL grant 914 may associated with a new transmission (e.g., a new transmission of the UL data 916). Alternatively and/or additionally, the UL grant 914 may be associated with a re-transmission (e.g., a re-transmission of the UL data 916).

Alternatively and/or additionally, the second SR 922 may be triggered responsive to the second BSR (and/or a different BSR) being triggered. For example, the second BSR (and/or a different BSR) may be triggered when the UL data 916 is unavailable to the access node and/or the first part 904 of the access node. Alternatively and/or additionally, the second BSR (and/or a different BSR) may be triggered prior to transmission of the UL grant 914 to the UE 902. Alternatively and/or additionally, the second BSR (and/or a different BSR) may be triggered responsive to receiving the SR 912 from the UE 902 (and/or from a different child node of the access node). Alternatively and/or additionally, the second BSR (and/or a different BSR) may be triggered responsive to receiving an RA preamble from the UE 902 (and/or from a different child node of the access node).

Figure 10:
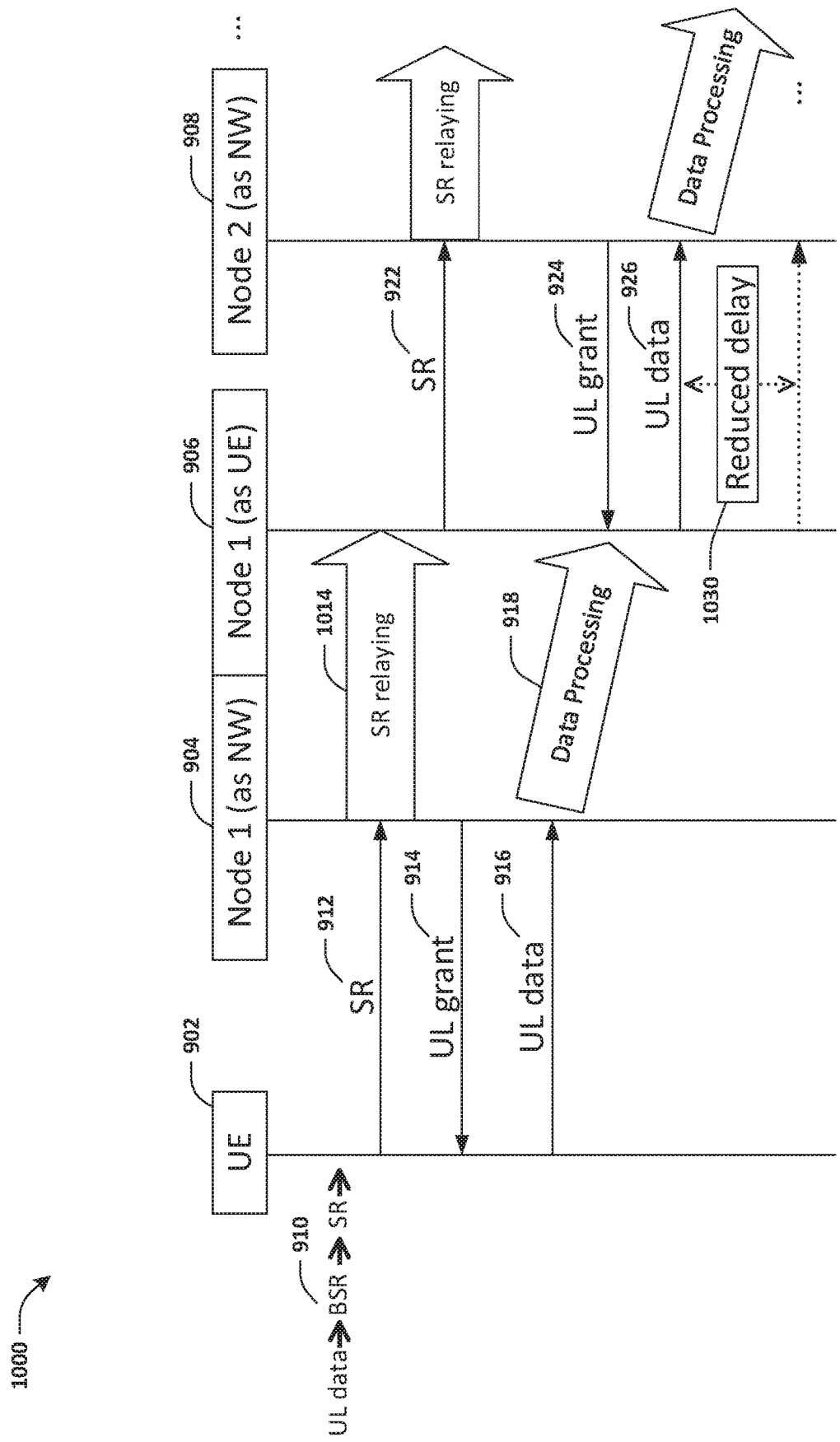
FIG. 10 illustrates an example scenario associated with an IAB system.

FIG. 10 illustrates an example scenario 1000 associated with the IAB system. Responsive to receiving the SR 912 from the UE 902 (and/or a different child node of the access node), the access node (e.g. the first part 904 of the access node) may trigger the second SR 922. For example, the access node (e.g. the first part 904 of the access node) may trigger the second SR 922 upon reception of the SR 912. For example, one or more SR relaying operations 1014 may be performed responsive to receiving the SR 912 from the UE 902 (and/or a different child node of the access node). The one or more SR relaying operations 1014 may comprise triggering the second SR 922. Alternatively and/or additionally, the second SR 922 may be transmitted to the parent node (e.g. the third part 908 of the parent node). The second UL grant 924 may be received from the parent node (e.g. the third part 908 of the parent node) while performing the data processing 918. Alternatively and/or additionally, the second UL grant 924 may be received from the parent node (and/or the third part 908 of the parent node) prior to performing the data processing 918. Alternatively and/or additionally, the second UL grant 924 may be received from the parent node (e.g. the third part 908 of the parent node) after performing the data processing 918. Alternatively and/or additionally, the second UL data 926 (which may comprise the UL data 916) may be transmitted to the parent node (e.g. the third part 908 of the parent node) based upon the second UL grant 924.

By relaying and/or forwarding the UL data 916 in accordance with the example scenario 1000 (rather than the example scenario 900), the first delay (associated with the time between reception of the UL data 916 by the access node from the UE 902 and transmission of the second UL data 926 (comprising the UL data 916) to the parent node) may be reduced by a duration of time 1030. For example, the second UL grant 924 may be received and/or acquired more quickly in the example scenario 1000 as compared with the example scenario 900. Alternatively and/or additionally, the parent node, the IAB-donor and/or one or more intermediate IAB nodes may more quickly receive an SR and/or become aware of the UL data 916 being forwarded to the IAB-donor. For example, each instance an IAB-node of the parent node and/or the one or more intermediate nodes receives an SR, one or more SR relaying operations may be performed and/or an SR may be transmitted by the IAB-node to an exemplary parent node of the IAB-node. Thus, the end-to-end delay (associated with transmission of the UL data 916 to the IAB-donor) may be reduced.

In some systems (e.g., NR systems), there may be a (single) SR configuration configured for a UE. Alternatively, there may be a plurality of SR configurations configured for the UE. In some examples, a first SR configuration of the plurality of SR configurations may be associated with a first service type (e.g., one or more of enhanced Mobile Broadband (eMBB), massive Machine Type Communications (mMTC), Ultra-Reliable and Low Latency Communications (URLLC), etc.). In some examples, the first SR configuration may correspond to one or more first logical channels of a plurality of logical channels. Alternatively and/or additionally, a second SR configuration of the plurality of SR configurations may be associated with a second service type (e.g., one or more of eMBB, mMTC, URLLC, etc.). In some examples, the second SR configuration may correspond to one or more second logical channels of the plurality of logical channels. The one or more second logical channels may be different than the one or more first logical channels associated with the first SR configuration.

A logical channel (of the plurality of logical channels) may be mapped to an SR configuration. For example, a first logical channel may be mapped to the first SR configuration (e.g., the one or more first logical channels may comprise the first logical channel). A second logical channel may be mapped to the second SR configuration (e.g., the one or more second logical channels may comprise the second logical channel). A third logical channel may be mapped to a third SR configuration. A fourth logical channel may not be mapped to an SR configuration. The first/second/third/ fourth logical channels and/or the first/second/third/fourth SR configurations may be configured by RRC.

A first SR associated with the first service type may be received by a network (e.g., an IAB-node, a base station, etc.) from the UE. Responsive to a determination that the first SR is associated with the first service type, one or more first UL resources may be allocated to the UE based upon one or more first service requirements associated with the first service type. Alternatively and/or additionally, a second SR associated with the second service type may be received by the network from the UE. Responsive to a determination that the second SR is associated with the second service type, one or more second UL resources may be allocated to the UE based upon one or more second service requirements associated with the second service type.

In some examples, an IAB-node may be configured with the plurality of SR configurations. For example, the plurality of SR configurations may be used by the IAB-node to trigger an SR. Alternatively and/or additionally, the plurality of SR configurations may be used by the IAB-node to transmit an SR. Alternatively and/or additionally, the plurality of SR configurations may be used by an MT part of the IAB-node.

In some examples, a BSR may be triggered by a logical channel of the plurality of logical channels. Alternatively and/or additionally, an SR may be triggered based upon the BSR and/or the logical channel. For example, an SR configuration of the SR may be associated with the logical channel. In an example, a first BSR may be triggered by the first logical channel associated with the first SR configuration. The first SR associated with the first SR configuration may be triggered based upon the first logical channel (and/or based upon the first logical channel being associated with the first SR configuration).

Alternatively and/or additionally, a BSR may not be triggered prior to triggering an SR. For example, the SR may not be triggered based upon a triggered BSR and/or based upon a logical channel that triggered a BSR. Accordingly, an SR configuration of a triggered SR may not be determined based upon a BSR and/or a logical channel that triggered a BSR. In an example, an IAB-node may receive a first SR from a child node (e.g., a UE and/or a different IAB-node). An SR configuration of a second SR (associated with the first SR) may not be determined based upon a BSR and/or a logical channel that triggered a BSR.

In a first embodiment, one or more second SR configurations of one or more second SRs may be determined by an IAB-node based upon one or more first SR configurations of one or more first SRs received from a child node. For example, there may be a mapping (e.g., an implicit mapping) from the one or more first SR configurations of the child node to the one or more second SR configurations of the IAB-node. In some examples, the mapping may be fixed (e.g., the mapping may be based upon an SR configuration index). Alternatively and/or additionally, the mapping may be based upon one or more pre-defined rules. In some examples, the mapping may correspond to one-to-one (e.g., a single SR configuration to a single SR configuration), many-to-one (e.g., a plurality of SR configurations to a single SR configuration), one-to-many (e.g., a single SR configuration to a plurality of SR configurations) and/or many-to-many (e.g., a plurality of SR configurations to a plurality of SR configurations). Responsive to receiving the one or more first SRs from the child node, the one or more first SR configurations of the one or more first SRs may be determined. Alternatively and/or additionally, responsive to receiving the one or more first SRs from the child node, the one or more second SR configurations for triggering and/or generating the one or more second SRs may be determined. For example, a first SR configuration of the one or more first SR configurations may be mapped to a second SR configuration of the one or more second SR configurations based upon the SR configuration index. For example, the first SR configuration of the one or more first SR configurations may be mapped to the second SR configuration of the one or more second SR configurations based upon a first index of the first SR configuration and/or a second index of the second SR configuration (e.g., the SR configuration index may comprise the first index and/or the second index and/or the first index and/or the second index may be determined based upon the SR configuration index). For example, the first index of the first SR configuration may match and/or correspond to the second index of the second SR configuration. Alternatively and/or additionally, each SR configuration of the one or more first SR configurations may be mapped to an SR configuration of the one or more second SR configurations based upon the SR configuration index.

Figure 11:
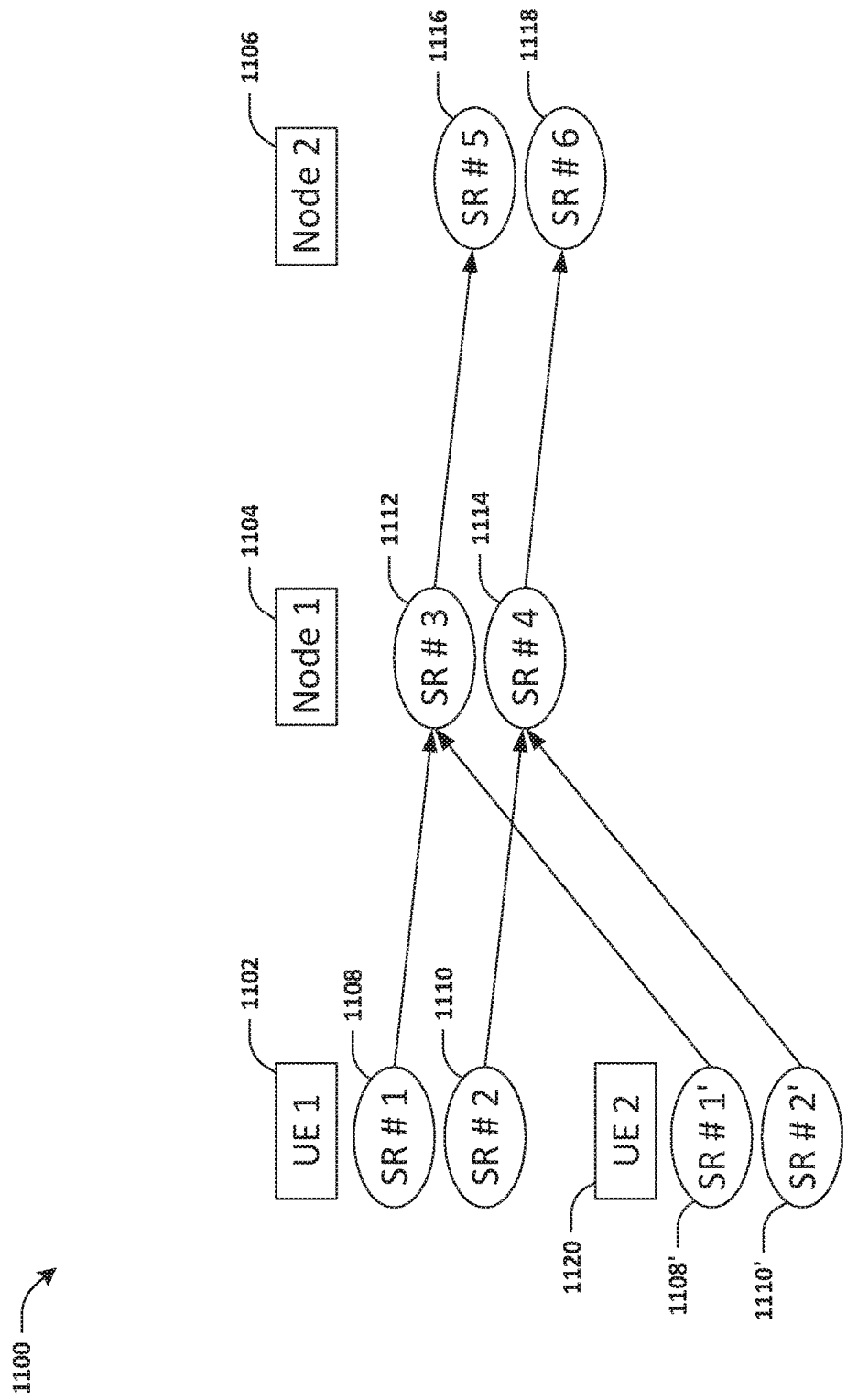
FIG. 11 illustrates an example scenario associated with an IAB system.

FIG. 11 illustrates an example scenario 1100 associated with an IAB system operating in accordance with the first embodiment. For example, one or more first SRs associated with one or more first SR configurations may be triggered by a first child node 1102 (e.g., a UE "UE 1"). Alternatively and/or additionally, one or more second SRs associated with one or more second SR configurations may be triggered by a second child node 1120 (e.g., a UE "UE 2"). In some examples, the one or more first SR configurations may comprise a first SR configuration 1108 (SR #1 in FIG. 11) and/or a second SR configuration 1110 (SR #2 in FIG. 11). Alternatively and/or additionally, the one or more second SR configurations may comprise the first SR configuration 1108' (SR #1' in FIG. 11) and/or the second SR configuration 1110' (SR #2' in FIG. 11).

In some examples, the first SR configuration 1108 of the first child node 1102 and/or the first SR configuration 1108' of the second child node 1120 may be mapped to a third SR configuration 1112 (SR #3 in FIG. 11) of an IAB-node 1104 (Node 1). For example, a first SR associated with the first SR configuration 1108 may be transmitted by the first child node 1102 to the IAB-node 1104. The first SR configuration 1108 associated with the first SR may be mapped to the third SR configuration 1112 based upon a first SR configuration index of the IAB-node 1104. Alternatively and/or additionally, a second SR, associated with the first SR, may be triggered by the IAB-node 1104. The second SR may be associated with the third SR configuration 1112.

Alternatively and/or additionally, a third SR associated with the first SR configuration 1108' may be transmitted by the second child node 1120 to the IAB-node 1104. The first SR configuration 1108' associated with the third SR may be mapped to the third SR configuration 1112 based upon the first SR configuration index of the IAB-node 1104. Alternatively and/or additionally, a fourth SR, associated with the third SR, may be triggered by the IAB-node 1104. The fourth SR may be associated with the third SR configuration 1112.

Alternatively and/or additionally, the second SR configuration 1110 of the first child node 1102 and/or the second SR configuration 1110' of the second child node 1120 may be mapped to a fourth SR configuration 1114 (SR #4 in FIG. 11) of the IAB-node 1104. For example, a fifth SR associated with the second SR configuration 1110 may be transmitted by the first child node 1102 to the IAB-node 1104. The second SR configuration 1110 associated with the fifth SR may be mapped to the fourth SR configuration 1114 based upon the first SR configuration index of the IAB-node 1104. Alternatively and/or additionally, a sixth SR, associated with the fifth SR, may be triggered by the IAB-node 1104. The sixth SR may be associated with the fourth SR configuration 1114.

Alternatively and/or additionally, a seventh SR associated with the second SR configuration 1110' may be transmitted by the second child node 1120 to the IAB-node 1104. The second SR configuration 1110' associated with the seventh SR may be mapped to the fourth SR configuration 1114 based upon the first SR configuration index of the IAB-node 1104. Alternatively and/or additionally, an eighth SR, associated with the seventh SR, may be triggered by the IAB-node 1104. The eighth SR may be associated with the fourth SR configuration 1114.

Alternatively and/or additionally, the third SR configuration 1112 of the first IAB-node 1104 may be mapped to a fifth SR configuration 1116 (SR #5 in FIG. 11) of a parent node 1106 (Node 2) based upon a second SR configuration index of the parent node 1106.

Alternatively and/or additionally, the fourth SR configuration 1114 of the first IAB-node 1104 may be mapped to a sixth SR configuration 1118 (SR #6 in FIG. 11) of the parent node 1106 based upon the second SR configuration index of the parent node 1106.

In some examples, a second number of SR configurations of a first plurality of SR configurations associated with the first child node 1102 may be configured such that each SR configuration of the first plurality of SR configurations may be mapped to an SR configuration of a second plurality of SR configurations of the IAB-node 1104. Alternatively and/or additionally, a second number of SR configurations of a second plurality of SR configurations associated with the first IAB-node 1104 may be configured such that each SR configuration of the second plurality of SR configurations may be mapped to an SR configuration of a third plurality of SR configurations of the parent node 1106. Alternatively and/or additionally, the second number of SR configurations and/or the second plurality of SR configurations may be configured such that each SR configuration of the first plurality of SR configurations may be mapped to an SR configuration of the second plurality of SR configurations of the IAB-node 1104.

In a second embodiment, one or more SR configurations of one or more SRs may be determined by an IAB-node based upon a configuration (e.g., an explicit configuration). For example, one or more second SR configurations of one or more second SRs may be determined by an IAB-node based upon the configuration and/or based upon one or more first SR configurations of one or more first SRs received from one or more child nodes. For example, the configuration may be a mapping table that may be used to map the one or more first SR configurations to the one or more second SR configurations. In some examples, the configuration may be generated by an IAB-donor associated with the IAB-node.

Alternatively and/or additionally, the IAB-donor may provide the IAB-node with the configuration (and/or the IAB-donor may transmit the configuration to the IAB-node). Alternatively and/or additionally, the configuration may be generated by a parent node (e.g., a second IAB-node) associated with the IAB-node. Alternatively and/or additionally, the parent node may provide the IAB-node with the configuration (and/or the parent node may transmit the configuration to the IAB-node).

In some examples, the mapping table may correspond to one-to-one (e.g., a single SR configuration to a single SR configuration), many-to-one (e.g., a plurality of SR configurations to a single SR configuration), one-to-many (e.g., a single SR configuration to a plurality of SR configurations) and/or many-to-many (e.g., a plurality of SR configurations to a plurality of SR configurations). Responsive to receiving the one or more first SRs from the child node, the one or more first SR configurations of the one or more first SRs may be determined. Alternatively and/or additionally, responsive to receiving the one or more first SRs from the one or more child nodes, the one or more second SR configurations for triggering and/or generating the one or more second SRs may be determined. For example, a first SR configuration of the one or more first SR configurations may be mapped to a second SR configuration of the one or more second SR configurations based upon the configuration (and/or the mapping table).

Alternatively and/or additionally, the configuration may comprise a plurality of mapping tables associated with a plurality of child nodes. For example, a first mapping table of the plurality of mapping tables may correspond to a first child node of the plurality of child nodes. Alternatively and/or additionally, a second mapping table of the plurality of mapping tables may correspond to a second child node of the plurality of child nodes. For example, responsive to receiving a third SR from the first child node, a third SR configuration of the third SR and/or the first child node may be mapped to a fourth SR configuration based upon the first mapping table. Alternatively and/or additionally, responsive to receiving a fifth SR from the second child node, a fifth SR configuration of the fifth SR and/or the second child node may be mapped to a sixth SR configuration based upon the second mapping table. Alternatively and/or additionally, the configuration may comprise a (single) mapping table that may be applied to SR configurations of child nodes associated with the IAB-node.

Figure 12:
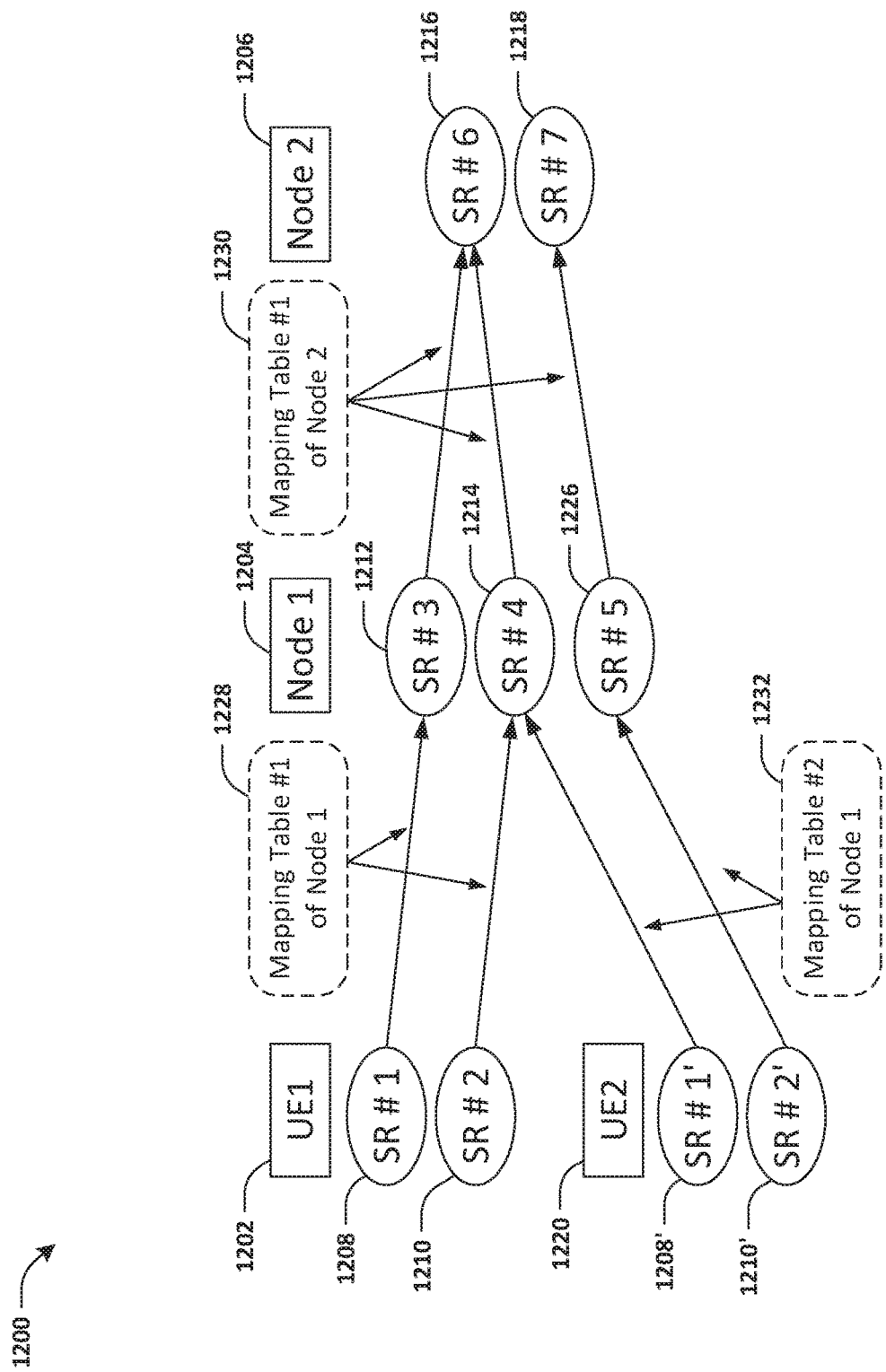
FIG. 12 illustrates an example scenario associated with an IAB system.

FIG. 12 illustrates an example scenario 1200 associated with an IAB system operating in accordance with the second embodiment. For example, one or more first SRs associated with one or more first SR configurations may be triggered by a first child node 1202 (e.g., a UE "UE 1"). Alternatively and/or additionally, one or more second SRs associated with one or more second SR configurations may be triggered by a second child node 1220 (e.g., a UE "UE 2"). In some examples, the one or more first SR configurations may comprise a first SR configuration 1208 (SR #1 in FIG. 12) and/or a second SR configuration 1210 (SR #2 in FIG. 12). Alternatively and/or additionally, the one or more second SR configurations may comprise the first SR configuration 1208' (SR #1' in FIG. 12) and/or the second SR configuration 1210' (SR #2' in FIG. 12). For simplicity, notations of SR configurations in FIG. 11 are numbered from 1 to 6 (e.g., SR #1, SR #2, SR #3, SR #4, SR #5, SR #6) while notations of SR configurations in FIG. 12 are numbered from 1 to 7 (e.g., SR #1, SR #2, SR #3, SR #4, SR #5, SR #6, SR #7). As a result, some notations of SR configurations in FIG. 12 are similar to some of notations of SR configurations in FIG. 11. However, a person having ordinary skill in the art may understand that the numbering of the notations (e.g. SR #1, SR #2, etc.) is merely for distinguishing different SR configurations of a single UE (e.g., the different SR configurations are associated with an SR index of the single UE). Accordingly, an SR configuration in FIG. 11 may not be the same as an SR configuration having the same notation (e.g., SR #1) in FIG. 12.

In some examples, the first SR configuration 1208 of the first child node 1202 may be mapped to a third SR configuration 1212 (SR #3 in FIG. 12) of an IAB-node 1204 (Node 1). For example, a first SR associated with the first SR configuration 1208 may be transmitted by the first child node 1202 to the IAB-node 1204. The first SR configuration 1208 associated with the first SR may be mapped to the third SR configuration 1212 based upon a configuration of the IAB-node 1204. For example, the configuration may be provided to the IAB-node 1204 by a parent node 1206 (Node 2). Alternatively and/or additionally, the configuration may be provided to the IAB-node 1204 by an IAB-donor associated with the IAB-node 1204. In some examples, the configuration may comprise a (single) mapping table. For example, the first SR configuration 1208 associated with the first SR may be mapped to the third SR configuration 1212 based upon the mapping table. Alternatively and/or additionally, the configuration may comprise a plurality of mapping tables associated with a plurality of child nodes. A first mapping table 1228 of the plurality of mapping tables may be associated with the first child node 1202. For example, the first SR configuration 1208 associated with the first SR may be mapped to the third SR configuration 1212 based upon the first mapping table 1228. Alternatively and/or additionally, a second SR, associated with the first SR, may be triggered by the IAB-node 1204. The second SR may be associated with the third SR configuration 1212.

In some examples, the second SR configuration 1210 of the first child node 1202 may be mapped to a fourth SR configuration 1214 (SR #4 in FIG. 12) of the IAB-node 1204. For example, a third SR associated with the second SR configuration 1210 may be transmitted by the first child node 1202 to the IAB-node 1204. The second SR configuration 1210 associated with the third SR may be mapped to the fourth SR configuration 1214 based upon the configuration of the IAB-node 1204. For example, the second SR configuration 1210 associated with the third SR may be mapped to the fourth SR configuration 1214 based upon the mapping table. Alternatively and/or additionally, the second SR configuration 1210 associated with the third SR may be mapped to the fourth SR configuration 1214 based upon the first mapping table 1228. Alternatively and/or additionally, a fourth SR, associated with the third SR, may be triggered by the IAB-node 1204. The fourth SR may be associated with the fourth SR configuration 1214.

In some examples, the first SR configuration 1208' of the second child node 1220 may be mapped to the third SR configuration 1212 and/or to the fourth SR configuration 1214 of the IAB-node 1204. For example, a fifth SR associated with the first SR configuration 1208' may be transmitted by the second child node 1220 to the IAB-node 1204. The first SR configuration 1208' associated with the fifth SR may be mapped to the third SR configuration 1212 and/or to the fourth SR configuration 1214 based upon the configuration of the IAB-node 1204. For example, the first SR configuration 1208' associated with the fifth SR may be mapped to the third SR configuration 1212 based upon the mapping table. Alternatively and/or additionally, a second mapping table 1232 of the plurality of mapping tables may be associated with the second child node 1220. Alternatively and/or additionally, the first SR configuration 1208' associated with the fifth SR may be mapped to the fourth SR configuration 1214 based upon the second mapping table 1232. Alternatively and/or additionally, a sixth SR, associated with the fifth SR, may be triggered by the IAB-node 1204. The sixth SR may be associated with the fourth SR configuration 1214.

In some examples, the second SR configuration 1210' of the second child node 1220 may be mapped to a fifth SR configuration 1226 (SR #5 in FIG. 12) of the IAB-node 1204 and/or to the fourth SR configuration 1214 of the IAB-node 1204. For example, a seventh SR associated with the second SR configuration 1210' may be transmitted by the second child node 1220 to the IAB-node 1204. The second SR configuration 1210' associated with the seventh SR may be mapped to the fifth SR configuration 1226 and/or to the fourth SR configuration 1214 based upon the configuration of the IAB-node 1204. For example, the second SR configuration 1210' associated with the seventh SR may be mapped to the fourth SR configuration 1214 based upon the mapping table. Alternatively and/or additionally, the second SR configuration 1210' associated with the seventh SR may be mapped to the fifth SR configuration 1226 based upon the second mapping table 1232 associated with the second child node 1220. Alternatively and/or additionally, an eighth SR, associated with the seventh SR, may be triggered by the IAB-node 1204. The eighth SR may be associated with the fifth SR configuration 1226.

Alternatively and/or additionally, the third SR configuration 1212 of the first IAB-node 1204 may be mapped to a sixth SR configuration 1216 (SR #6 in FIG. 12) of the parent node 1206 based upon a second configuration of the parent node 1206. For example, the second configuration may be provided to the parent node 1206 by a second parent node of the parent node 1206. Alternatively and/or additionally, the second configuration may be provided to the parent node 1206 by the IAB-donor. In some examples, the third SR configuration 1212 of the first IAB-node 1204 may be mapped to the sixth SR configuration 1216 of the parent node 1206 based upon a third mapping table 1230 of the second configuration. For example, the second configuration may (merely) comprise the third mapping table 1230 that may be applied to SR configurations of child nodes (comprising the IAB-node 1204) associated with the parent node 1206. Alternatively and/or additionally, the second configuration may comprise a second plurality of mapping tables. The third mapping table 1230 of the second plurality of mapping tables may be associated with the IAB-node 1204.

Alternatively and/or additionally, the fourth SR configuration 1214 of the first IAB-node 1204 may be mapped to the sixth SR configuration 1216 of the parent node 1206 based upon the third mapping table 1230. Alternatively and/or additionally, the fifth SR configuration 1226 of the first IAB-node 1204 may be mapped to a seventh SR configuration 1218 (SR #7 in FIG. 12) of the parent node 1206 based upon the third mapping table 1230.

In a third embodiment, a specific SR configuration may be used for triggering and/or generating one or more SRs. The specific SR configuration may be a defined SR configuration. In some examples, the specific SR configuration may be used for triggering and/or generating an SR if the SR is not triggered based upon a (triggered) BSR. Alternatively and/or additionally, the specific SR configuration may be used for triggering and/or generating the SR if the SR is not triggered based upon data of (and/or from) a logical channel becoming available for transmission. Alternatively and/or additionally, the specific SR configuration may be used for triggering and/or generating the SR if the SR is triggered based upon reception of a different SR.

In an example, a first SR may be received by an IAB-node (e.g., the first SR may be received from a child node of the IAB-node). A second SR may be triggered and/or generated (by the IAB-node) responsive to receiving the first SR. The second SR may be triggered and/or generated based upon the specific SR configuration. For example, the second SR may be associated with the specific SR configuration (e.g., an SR configuration of the second SR may correspond to the specific SR configuration). In some examples, the second SR may be triggered and/or generated based upon the specific SR configuration of the IAB-node (and/or the specific SR configuration of the IAB-node may be triggered) responsive to receiving the first SR, regardless of an SR configuration of the first SR (e.g., the SR configuration of the first SR may correspond to the specific SR configuration of the child node and/or the SR configuration of the first SR may be different than the specific SR configuration of the child node). Alternatively and/or additionally, the IAB-node may be an access node of a UE. The access node may receive the first SR form the UE. The second SR may be triggered and/or generated based upon the specific SR configuration of the IAB-node (and/or the specific SR configuration of the IAB-node may be triggered) responsive to receiving the first SR, regardless of an SR configuration of the first SR (e.g., the SR configuration of the first SR may correspond to the specific SR configuration of the child node and/or the SR configuration of the first SR may be different than the specific SR configuration of the child node).

In some examples, the specific SR configuration of the IAB-node (and/or the second SR) may be associated with one or more logical channels of the IAB-node. Alternatively and/or additionally, the specific SR configuration of the IAB-node (and/or the second SR) may not be associated with one or more logical channels of the IAB-node. In some examples, the specific SR configuration of the IAB-node and/or the second SR may be canceled responsive to the IAB-node transmitting the second SR to a parent node of the IAB-node.

Alternatively and/or additionally, the second SR and/or the specific SR configuration of the IAB-node may be indicative of a request for one or more transmission resources for a future transmission. For example, the second SR and/or the specific SR configuration of the IAB-node may be used to indicate to the parent node of the IAB-node that the one or more transmission resources are requested for the future transmission. For example, the one or more transmission resources may correspond to one or more resources for transmission of data to the parent node. The future transmission may correspond to a data transmission (to the parent node) of data that is not available to the IAB-node (e.g., the IAB-node has not yet received the data (e.g., UL data) from a child node). The second SR and/or the specific SR configuration of the IAB-node may be a (special) signaling. In some examples, the specific SR configuration of the IAB-node may be associated with an SR configuration of the IAB-node (e.g., a plurality of SR configurations of the IAB-node may comprise the specific SR configuration). Alternatively and/or additionally, the specific SR configuration of the IAB-node may not be associated with an SR configuration of the IAB-node (e.g., the plurality of SR configurations of the IAB-node may not comprise the specific SR configuration). Alternatively and/or additionally, the second SR and/or the specific SR configuration of the IAB-node may be transmitted (to the parent node) on an uplink control channel (e.g., PUCCH). Alternatively and/or additionally, the second SR and/or the specific SR configuration of the IAB-node may not be transmitted (to the parent node) on an uplink control channel. Alternatively and/or additionally, the second SR and/or the specific SR configuration of the IAB-node may apply a counter (e.g., SR_COUNTER and/or a different counter) and/or a timer (e.g., SR prohibit timer and/or a different timer). Alternatively and/or additionally, the second SR and/or the specific SR configuration of the IAB-node may not apply a counter and/or a timer.

In some examples, each of the first embodiment, the second embodiment and the third embodiment may be implemented independently and/or separately. Alternatively and/or additionally, a combination of one or more of the first embodiment, the second embodiment and/or the third embodiment may be implemented.

In some examples, a first BSR may be received by an IAB-node from a child node of the IAB-node (e.g., the child node may be a second IAB-node associated with the IAB-node and/or the child node may be a UE that the IAB-node serves). The IAB-node may trigger and/or generate a second BSR responsive to receiving the first BSR. The first BSR may be indicative of a rough buffer status (e.g., one or more buffer statuses of one or more logical channel groups) associated with the child node.

Responsive to triggering the second BSR (and/or when the second BSR is triggered), the IAB-node may trigger an SR. For example, the SR may be associated with a request for one or more UL resources from a parent node of the IAB-node (e.g., the SR may be triggered to request the one or more UL resources from the parent node). In some examples, the SR may be triggered and/or generated based upon an unavailability of UL-SCH resources for a new transmission (e.g., there is no UL-SCH resource available for the new transmission). Alternatively and/or additionally, the SR may be triggered and/or generated responsive to identifying an uplink grant (e.g., a configured uplink grant) and/or the second BSR (e.g., a Regular BSR) is triggered for a logical channel for which a logicalChannelSR-Mask parameter is set to false. Alternatively and/or additionally, the SR may be triggered and/or generated responsive to one or more UL-SCH resources being available and/or the one or more UL-SCH resources not meeting one or more LCP mapping restrictions configured for a logical channel that triggered the second BSR. Alternatively and/or additionally, an SR configuration associated with the logical channel that triggered the second BSR may be associated with the SR (e.g., the SR may have the SR configuration).

In some examples, the first BSR may be indicative of one or more logical channel groups (associated with the child node), one or more priorities associated with the one or more logical channel groups and/or one or more buffer statuses associated with the one or more logical channel groups. Each logical channel group of the one or more logical channel groups may be associated with and/or may comprise one or more logical channels with one or more priorities. It may be difficult for the IAB-node to determine a logical channel of the child node that triggered the first BSR. Alternatively and/or additionally, the one or more logical channel associated with the child node may be mapped to one or more second logical channels associated with the IAB-node. It may be difficult for the IAB-node to determine one or more logical channels of the IAB-node will have data arrival before UL data is received from the child node.

In a fourth embodiment, an SR configuration for an SR triggered based upon a BSR may be determined based upon a different SR received from a child node. For example, an IAB-node may receive a first BSR from a child node of the IAB-node (e.g., the child node may be a second IAB-node associated with the IAB-node and/or the child node may be a UE that the IAT-node serves). The IAB-node may trigger and/or generate a second BSR responsive to receiving the first BSR. The first BSR may be indicative of a rough buffer status (e.g., one or more buffer statuses of one or more logical channel groups) associated with the child node.

Responsive to triggering the second BSR (and/or when the second BSR is triggered), the IAB-node may trigger a first SR and/or a first SR configuration associated with the first SR. In some examples, prior to receiving the first BSR from the child node, the IAB-node may receive a second SR associated with a second SR configuration from the child node. For example, the second SR and/or the second SR configuration may be indicative of a request for the IAB-node to allocate a UL grant to the child node for transmission of the first BSR to the IAB-node. The first SR and/or the first SR configuration may be triggered and/or generated based upon the second SR and/or the second SR configuration. For example, in accordance with the first embodiment presented herein, a mapping (e.g., an implicit mapping) may be used to trigger and/or determine the first SR and/or the first SR configuration based upon the second SR and/or the second SR configuration (e.g., the second SR and/or the second SR configuration may be mapped to the first SR and/or the first SR configuration based upon an SR configuration index). Alternatively and/or additionally, in accordance with the second embodiment presented herein, a mapping table and/or a configuration (e.g., an explicit configuration) may be used to trigger and/or determine the first SR and/or the first SR configuration based upon the second SR and/or the second SR configuration (e.g., the second SR and/or the second SR configuration may be mapped to the first SR and/or the first SR configuration based upon the mapping table that may be received from a parent node of the IAB-node and/or from an IAB-donor associated with the IAB-node).

In some examples, the IAB-node may not receive an SR from the child node prior to receiving the first BSR from the child node (and/or the IAB-node may not identify an SR received from the child node prior to receiving the first BSR from the child node).

In a fifth embodiment, the first SR and/or the first SR configuration may be determined and/or triggered based upon the first BSR (received from the child node of the IAB-node). In some examples, the first BSR may be indicative of one or more logical channel groups (associated with the child node), one or more priorities associated with the one or more logical channel groups and/or one or more buffer statuses associated with the one or more logical channel groups. Each logical channel group of the one or more logical channel groups may be associated with and/or may comprise one or more logical channels with one or more priorities. In some examples, a first logical channel having a highest priority amongst logical channels of the one or more logical channel groups may be identified. It may be determined (and/or assumed) that the first logical channel triggered the first BSR (in the child node) based upon a determination that the first logical channel has the highest priority amongst the logical channels of the one or more logical channel groups.

In an example, the one or more logical channel groups may comprise a first logical channel group and/or a second logical channel group. The first logical channel group may comprise a logical channel A and/or a logical channel B. The second logical channel group may comprise a logical channel C and/or a logical channel D. Responsive to a determination that the logical channel A has a highest priority (compared with the logical channel B, the logical channel C, and/or the logical channel D), it may be determined and/or assumed by the IAB-node that the first BSR is triggered by the logical channel A (even if the first BSR is triggered by a different logical channel, such as the logical channel B).

Responsive to determining (and/or assuming) that the first logical channel triggered the first BSR and/or responsive to determining that the first logical channel has the highest priority amongst the logical channels of the one or more logical channel groups, the IAB-node may map the first logical channel to a second logical channel of the IAB-node. The first SR and/or the first SR configuration may be determined, generated and/or triggered based upon the second logical channel. Alternatively and/or additionally, a second SR and/or a second SR configuration associated with the first logical channel may be identified. The first SR and/or the first SR configuration may be triggered and/or generated based upon the second SR and/or the second SR configuration. For example, in accordance with the first embodiment presented herein, a mapping (e.g., an implicit mapping) may be used to trigger and/or determine the first SR and/or the first SR configuration based upon the second SR and/or the second SR configuration (e.g., the second SR and/or the second SR configuration may be mapped to the first SR and/or the first SR configuration based upon an SR configuration index). Alternatively and/or additionally, in accordance with the second embodiment presented herein, a mapping table and/or a configuration (e.g., an explicit configuration) may be used to trigger and/or determine the first SR and/or the first SR configuration based upon the second SR and/or the second SR configuration (e.g., the second SR and/or the second SR configuration may be mapped to the first SR and/or the first SR configuration based upon the mapping table that may be received from a parent node of the IAB-node and/or from an IAB-donor associated with the IAB-node).

In a sixth embodiment, the first SR and/or the first SR configuration may be determined and/or triggered based upon a specific SR configuration (e.g., the first SR may be associated with the specific SR configuration and/or the first SR configuration of the first SR may correspond to the specific SR configuration) (responsive to a determination that the first SR and/or the first SR configuration is triggered based upon the second BSR triggered by the IAB-node). The specific SR configuration may be a defined SR configuration. In some examples, the specific SR configuration (and/or the second SR) may be associated with one or more logical channels of the IAB-node. Alternatively and/or additionally, the specific SR configuration (and/or the second SR) may not be associated with one or more logical channels of the IAB-node.

In some examples, each of the fourth embodiment, the fifth embodiment and the sixth embodiment may be implemented independently and/or separately. Alternatively and/or additionally, a combination of one or more of the fourth embodiment, the fifth embodiment and/or the sixth embodiment may be implemented.

In some examples, an SR that is triggered by an IAB-node prior to the IAB-node receiving UL data from a child node may be canceled (e.g., with respect to FIG. 10, the second SR 922 triggered prior to the access node receiving the UL data 916 may be canceled). For example, one or more pending SRs may be canceled based upon a first condition and/or a second condition. For example, in the first condition, the one or more pending SRs may be canceled if the one or more pending SRs are triggered prior to a MAC PDU assembly, if (and/or when) the MAC PDU is transmitted and/or if a MAC PDU (associated with the MAC PDU assembly) comprises a BSR MAC CE comprising a buffer status associated with (and/or up to) a most recent event (e.g., a last event) that triggered a BSR prior to the MAC PDU assembly. Alternatively and/or additionally, in the second condition, the one or more pending SRs may be canceled if (and/or when) one or more UL grants may accommodate pending data (and/or all pending data) available for transmission. In some examples, an SR may be canceled based upon the first condition and/or the second condition if the SR is triggered based upon a received BSR and/or a triggered BSR (triggered based upon the received BSR and/or a received SR). For example, the one or more pending SRs may be triggered based upon a received BSR and/or a triggered BSR (triggered based upon the received BSR and/or a received SR).

Alternatively and/or additionally, an SR may not be canceled based upon the first condition and/or the second condition if the SR is triggered based upon a second SR received from a child node. Alternatively and/or additionally, an SR may be canceled based upon the first condition and/or the second condition if the SR is triggered based upon a second SR received from a child node. Alternatively and/or additionally, an SR may not be canceled based upon the first condition and/or the second condition if the SR is not triggered based upon a received BSR and/or a triggered BSR (triggered based upon the received BSR and/or a received SR). Alternatively and/or additionally, an SR may be canceled based upon the first condition and/or the second condition if the SR is not triggered based upon a received BSR and/or a triggered BSR (triggered based upon the received BSR and/or a received SR).

In some examples, an SR prohibit timer may be used in one or more IAB systems. For example, the SR prohibit timer may be used to limit a frequency of SR transmission due to a (short) SR periodicity (e.g., 1 millisecond). In some examples, when an SR prohibit timer associated with an SR configuration is running, a UE (and/or an IAB-node) may not transmit an SR using the SR configuration. Alternatively and/or additionally, when an SR prohibit timer associated with an IAB-node is running, an SR may be triggered based upon one or more occurrences different than a BSR being triggered (by the IAB-node) and/or different than data being available for transmission. For example, an SR may be triggered by the IAB-node based upon reception of a second SR from a child node of the IAB-node (e.g., the SR may be triggered while the SR prohibit timer is running). In some examples, the SR prohibit timer may run for a prohibit time interval (e.g., 4 milliseconds). Alternatively and/or additionally, the SR prohibit timer may be independent of (and/or may not be based upon) whether UL data retransmission of the child node is required.

In some examples, the IAB-node may determine whether the UL data retransmission of the child node is required by receiving and/or decoding data transmitted by the child node. For example, responsive to receiving data transmitted by the child node, the IAB-node may determine that the UL data retransmission of the child node is not required. Alternatively and/or additionally, responsive to not receiving data from the child node, the IAB-node may determine that the UL data retransmission of the child node is required. The UL data transmission could be regarded as an indication of whether retransmission of the UL data is required or not.

In some examples, an IAB-node may receive a first SR from a child node (e.g., a UE and/or a different IAB-node). For example, a second SR may be triggered by the IAB-node based upon the first SR (e.g., such as illustrated in FIG. 10) and/or responsive to receiving the first SR. Alternatively and/or additionally, the IAB-node may receive an RA preamble from the child node. For example, the second SR may be triggered by the IAB-node based upon the RA preamble and/or responsive to receiving the RA preamble. Alternatively and/or additionally, the second SR may be triggered responsive to allocating a UL grant to the child node (e.g., the UL grant may be associated with the first SR and/or the RA preamble). The second SR may be transmitted to a parent node of the IAB-node corresponding to a request for one or more UL resources for transmission of UL data associated with the child node and/or associated with the first SR received from the child node (e.g., the UL data may not be available and/or may not be received by the IAB-node when the second SR is transmitted to the parent node). The parent node may transmit a UL grant to the IAB-node based upon the second SR. The IAB-node may receive the UL grant prior to (successfully) receiving the UL data from the child node. Alternatively and/or additionally, the IAB-node may receive the UL grant prior to processing of the UL data is completed by the IAB-node. In some examples, the IAB-node may transmit second UL data that is available for transmission based upon the UL grant (to the parent node). For example, the second UL data may be different than and/or may not comprise the UL data. Alternatively and/or additionally, the second UL data may be associated with a second child node, different than the child node (e.g., the second UL data may be received from the second child node). Alternatively and/or additionally, the IAB-node may transmit padding data to the parent node based upon the UL grant. Alternatively and/or additionally, the IAB-node may not transmit data to the parent node based upon the UL grant (e.g., the UL grant may be skipped if data for transmission to the parent node is not available). Alternatively and/or additionally, the second SR may be canceled. Alternatively and/or additionally, a third SR may be triggered responsive to receiving the UL data from the child node and/or responsive to completing processing (e.g., data processing) of the UL data. Thus, the first delay (e.g., described with respect to FIG. 9 and/or FIG. 10) may not be reduced.

Figure 13:
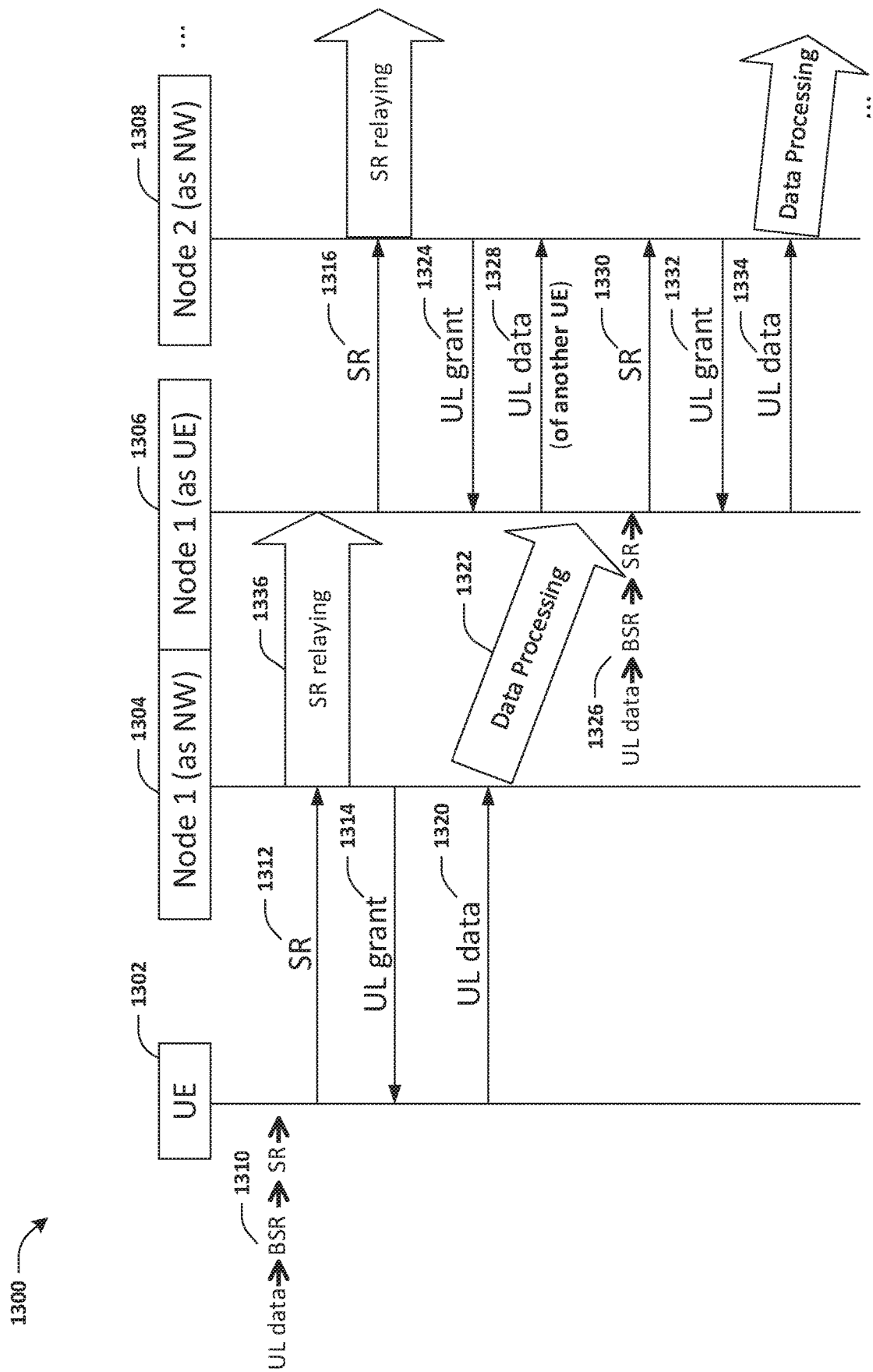
FIG. 13 illustrates an example scenario associated with an IAB system.

FIG. 13 illustrates an example scenario 1300 associated with an IAB system. In the example scenario 1300, a UE 1302 may be connected to an access node (via an access link). The UE 1302 may perform one or more first operations 1310. The one or more first operations 1310 may be associated with UL data arriving at a buffer of the UE 1302, the UE 1302 triggering a BSR and/or the UE 1302 triggering an SR 1312. For example, the UE 1302 may transmit the SR 1312 to the access node. Alternatively and/or additionally, a first part 1304 of the access node may receive the SR 1312. For example, the first part 1304 of the access node may correspond to an NW part of the access node. Alternatively and/or additionally, the first part 1304 of the access node may be associated with performing one or more network operations.

In some examples, responsive to receiving the SR 1312 from the UE 1302, the access node (and/or the first part 1304 of the access node) may trigger a second SR 1316. For example, one or more SR relaying operations 1336 may be performed responsive to receiving the SR 1312 from the UE 1302. The one or more SR relaying operations 1336 may comprise triggering the second SR 1316. Alternatively and/or additionally, the second SR 1316 may be transmitted by the access node (and/or by a second part 1306 of the access node) to a parent node of the access node (and/or to a third part 1308 of the parent node). Alternatively and/or additionally, the first part 1304 of the access node may transmit a UL grant 1314 to the UE 1302 (responsive to receiving the SR 1312). Alternatively and/or additionally, the UE 1302 may transmit UL data 1320 to the access node based upon the UL grant 1314. For example, the access node may receive the UL data 1320 from the UE 1302.

In some examples, a second UL grant 1324 may be received by the access node from the parent node. The second UL grant 1324 may be received by the access node prior to receiving the UL data 1320 and/or completing data processing 1322 of the UL data 1320. In some examples, the access node may transmit second UL data 1328 to the parent node based upon the UL grant. The second UL data 1328 may be different than the UL data 1320 and/or may not comprise the UL data 1320. For example, the second UL data 1328 may be associated with a second child node, different than the UE (e.g., the second UL data 1328 may be received from the second child node). Alternatively and/or additionally, the second UL data may comprise padding data. Alternatively and/or additionally, the second SR 1316 may be canceled (e.g., the second SR 1316 may be canceled responsive to transmitting the second UL data 1328 to the parent node).

Alternatively and/or additionally, a third SR 1330 may be triggered responsive to receiving the UL data 1320 from the child node and/or responsive to completing the data processing 1322 of the UL data 1320. For example, one or more second operations 1326 may be performed by the access node responsive to receiving the UL data 1320 from the child node and/or responsive to completing the data processing 1322 of the UL data 1320. In some examples, the one or more second operations 1326 may be associated with UL data arriving at a buffer of the access node, the access node triggering a second BSR and/or the access node triggering the third SR 1330. The third SR 1330 may be transmitted to the parent node (and/or to the third part 1308 of the access node). Alternatively and/or additionally, the parent node may transmit a third UL grant 1332 to the access node based upon the third SR 1330. Alternatively and/or additionally, the access node may transmit third UL data 1334, comprising the UL data 1320, to the parent node based upon the third UL grant 1332. In some examples, the UL data 1320 may be received by the access node after the second UL grant 1324 is received by the access node and/or after the data processing 1322 is completed due to the UL data 1320 being unsuccessfully transmitted to the access node and/or being retransmitted to the access node (using one or more data retransmission techniques such as Hybrid Automatic Repeat Request (HARQ)).

In a seventh embodiment, a pending SR that is an early triggered SR may not be canceled when (and/or responsive to) a second BSR is transmitted and/or the BSR comprises a buffer status up to (and/or indicative of) a most recent event (e.g., a last event) that triggered a BSR prior to a MAC PDU assembly. An early triggered SR may correspond to an SR that is triggered, based upon an SR received from a child node, prior to an IAB-node receiving UL data from the child node. Alternatively and/or additionally, an early triggered SR may correspond to an SR that is triggered based upon a received BSR and/or a triggered BSR, prior to the IAB-node receiving the UL data from the child node. Alternatively and/or additionally, an early triggered SR may correspond to an SR that is triggered based upon a received SR received from the child node, prior to the IAB-node transmitting a UL grant to the child node. Alternatively and/or additionally, an early triggered SR may correspond to an SR that is triggered based upon a received BSR and/or a triggered BSR, prior to the IAB-node transmitting the UL grant to the child node. For example, an early triggered SR may be triggered for (later) transmission of the UL data associated with the child node to a parent node of the IAB-node.

Alternatively and/or additionally, an SR that is pending that is an early triggered SR may not be canceled when (and/or responsive to) one or more UL grants (received from the parent node) can accommodate pending data (and/or all pending data) available for transmission (from the IAB-node to the parent node). Alternatively and/or additionally, the SR that is pending may not be canceled and/or may remain pending when (and/or responsive to) performing UL data transmission of data to the parent node, and/or the data does not comprise the UL data associated with the child node. Alternatively and/or additionally, the SR that is pending may not be canceled and/or may remain pending when (and/or responsive to) transmission of the UL data associated with the child node to the parent node is not performed and/or completed. In some examples, the SR that is pending may not be canceled and/or remain pending if a MAC PDU (associated with the MAC PDU assembly) comprises a BSR MAC CE. Alternatively and/or additionally, the SR that is pending may not be canceled and/or remain pending if the MAC PDU does not comprise a BSR MAC CE. For example, the SR that is pending may not be canceled if the SR is used for requesting one or more transmission resources for transmission of the UL data of the child node (that is not yet available for transmission) to the parent node, if the UL data of the child node is not transmitted to the parent node and/or if a BSR indicative of a buffer status of the child node is not transmitted to the parent node.

In some examples, while the SR is pending, the IAB-node may acquire UL resources (e.g., transmission resources). Alternatively and/or additionally, the SR may not be canceled when (and/or responsive to) a MAC PDU is assembled and/or the MAC PDU does not comprise the UL data from the child node (and/or the MAC PDU does not comprise a BSR reflecting the buffer status of the child node). In some examples, a second BSR transmitted by the IAB-node to the parent node may be indicative of the buffer status of the child node (e.g., the buffer status may be determined based upon the BSR received from the child node). For example, the second BSR may be indicative of an amount of data (associated with the UL data that the IAB-node has not yet received from the child node and/or has not yet processed) indicated by the BSR received from the child node.

In some examples, the UL data may become available to the IAB-node (e.g., the UL data may be received by the IAB-node from the child node and/or the UL data may be processed by the IAB-node using data processing). In some examples, the SR (e.g., the early triggered SR) may be canceled when (and/or responsive to) the UL data (associated with the child node) is transmitted to the parent node by the IAB-node. Alternatively and/or additionally, the SR may be canceled when (and/or responsive to) the IAB-node performs data transmission of data (e.g., a MAC PDU) to the parent node, and/or the data comprises the UL data associated with the child node (and/or comprises a BSR indicative of the buffer status of the child node). In some examples, the SR may be canceled if the data (and/or the MAC PDU) transmitted to the parent node comprises a MAC CE. Alternatively and/or additionally, the SR may be canceled if the data (and/or the MAC PDU) transmitted to the parent node does not comprise a MAC CE. Alternatively and/or additionally, the SR may be canceled responsive to receiving a first indication from the child node (e.g., the first indication may be indicative of retransmission of the UL data to the IAB-node not being required). Alternatively and/or additionally, the SR may not be canceled responsive to receiving a second indication from the child node (e.g., the second indication may be indicative of retransmission of the UL data to the IAB-node being required). In some examples, the first indication and/or the second indication may comprise the UL data transmission.

Figure 14:
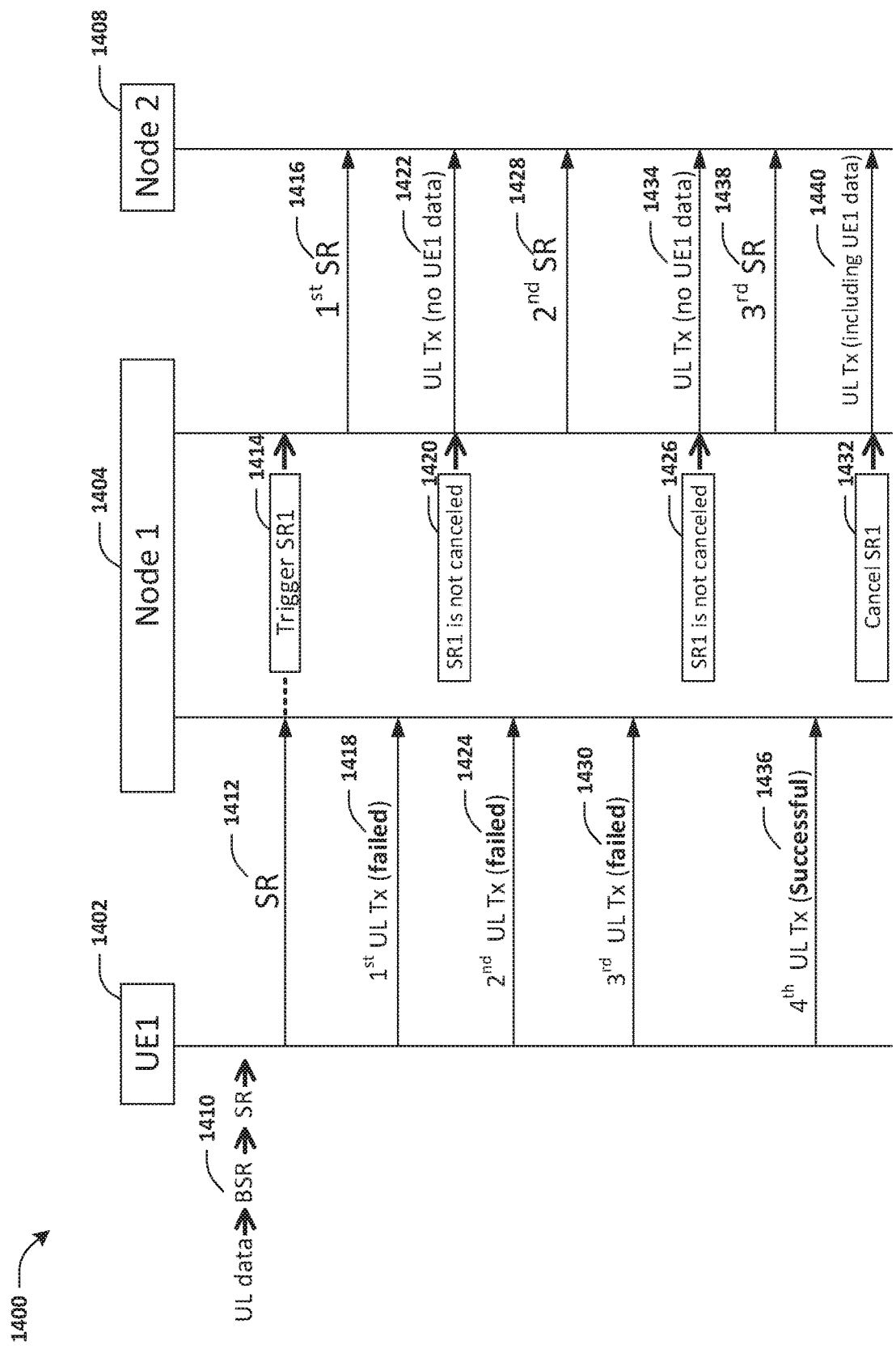
FIG. 14 illustrates an example scenario associated with an IAB system.

FIG. 14 illustrates an example scenario 1400 associated with an IAB system operating in accordance with the seventh embodiment. In some examples, a UE 1402 may be connected to an access node 1404 (via an access link). The UE 1402 may perform one or more first operations 1410. The one or more first operations 1410 may be associated with UL data arriving at a buffer of the UE 1402, the UE 1402 triggering a BSR and/or the UE 1402 triggering an SR 1412. For example, the UE 1402 may transmit the SR 1412 to the access node 1404. Alternatively and/or additionally, the access node 1404 may receive the SR 1412. At 1414, a second SR may be triggered responsive to receiving the SR 1412 from the UE 1402. In some examples, an SR 1416 "1st SR", associated with the second SR and/or an SR configuration associated with the second SR, may be transmitted to a parent node 1408 of the access node 1404 (e.g., the SR 1416 "1st SR" may comprise the second SR).

Alternatively and/or additionally, the access node 1404 may transmit a first UL grant to the UE 1402. In some examples, a first transmission 1418 of the UL data may be unsuccessful (and/or may fail). For example, the UL data may not be received by the access node 1404 responsive to the first transmission 1418. Alternatively and/or additionally, the access node 1404 may receive a second UL grant from the parent node 1408. For example, the second UL grant may be transmitted to the access node 1404 based upon the SR 1416 "1st SR". In some examples, second UL data 1422 may be transmitted to the parent node 1408 based upon the second UL grant. The second UL data 1422 may not comprise the UL data associated with the UE 1402. Alternatively and/or additionally, at 1420, the second SR may not be canceled (e.g., the second SR may not be canceled based upon the second UL data 1422 not comprising the UL data associated with the UE 1402).

In some examples, an SR 1428 "2nd SR", associated with the second SR and/or the SR configuration associated with the second SR, may be transmitted to the parent node 1408. Alternatively and/or additionally, a second transmission 1424 of the UL data and/or a third transmission 1430 of the UL data may be unsuccessful (and/or may fail). For example, the UL data may not be received by the access node 1404 responsive to the second transmission 1424 and/or the third transmission 1430. Alternatively and/or additionally, the access node 1404 may receive a third UL grant from the parent node 1408. For example, the third UL grant may be transmitted to the access node 1404 based upon the SR 1428 "2nd SR". In some examples, third UL data 1434 may be transmitted to the parent node 1408 based upon the third UL grant. The third UL data 1434 may not comprise the UL data associated with the UE 1402. Alternatively and/or additionally, at 1426, the second SR may not be canceled (e.g., the second SR may not be canceled based upon the third UL data 1434 not comprising the UL data associated with the UE 1402).

In some examples, an SR 1438 "3rd SR", associated with the second SR and/or the SR configuration associated with the second SR, may be transmitted to the parent node 1408.

Alternatively and/or additionally, a fourth transmission 1436 of the UL data may be successful. For example, the UL data may be received by the access node 1404 responsive to the fourth transmission 1436. Alternatively and/or additionally, the access node 1404 may receive a fourth UL grant from the parent node 1408. For example, the fourth UL grant may be transmitted to the access node 1404 based upon the SR 1438 "3rd SR". In some examples, fourth UL data 1440 may be transmitted to the parent node 1408 based upon the fourth UL grant. The fourth UL data 1440 may comprise the UL data associated with the UE 1402. Alternatively and/or additionally, at 1432, the second SR may be canceled (e.g., the second SR may be canceled based upon the fourth UL data 1440 comprising the UL data associated with the UE 1402).

In an eighth embodiment, an SR that is an early triggered SR may be triggered one or more instances based upon one or more indications received from a child node. For example, an IAB-node may trigger the SR responsive to receiving a second SR from the child node. The SR may be triggered prior to the IAB-node receiving UL data from the child node. Alternatively and/or additionally, the IAB-node may trigger the SR based upon a received BSR and/or a triggered BSR, prior to the IAB-node receiving the UL data from the child node.

In some examples, the SR may be canceled responsive to the IAB-node transmitting the SR to a parent node of the IAB-node. Alternatively and/or additionally, the SR may not be canceled responsive to the IAB-node transmitting the SR to the parent node. Alternatively and/or additionally, the SR may be canceled responsive to the IAB-node performing UL data transmission of data (e.g., a MAC PDU) to the parent node and/or the data comprises the UL data (of the child node) (and/or the data comprises a BSR indicative of a buffer status of the child node). Alternatively and/or additionally, the SR may be canceled responsive to a MAC PDU being assembled, where the MAC PDU comprises the UL data from the child node (and/or the MAC PDU comprises a BSR reflecting the buffer status of the child node). Alternatively and/or additionally, the SR may be canceled based upon one or more SR cancellation conditions (such as the first condition and/or the second condition presented herein).

In some examples, a second BSR transmitted by the IAB-node to the parent node may be indicative of the buffer status of the child node (e.g., the buffer status may be determined based upon the BSR received from the child node). For example, the second BSR may be indicative of an amount of data (associated with the UL data that the IAB-node has not yet received from the child node and/or has not yet processed) indicated by the BSR received from the child node.

In some examples, the IAB-node may receive a first indication from the child node. In some examples, the first indication may be indicative of retransmission of the UL data to the IAB-node not being required. Alternatively and/or additionally, the first indication may be indicative of retransmission of the UL data to the IAB-node being required. In some examples, the first indication may correspond to a UL data transmission of the UL data. For example, the first indication may comprise the UL data. In some examples, responsive to receiving the first indication and/or determining (based upon the first indication) that retransmission of the UL data to the IAB-node is required, the IAB-node may trigger (e.g., re-trigger) the SR. Alternatively and/or additionally, responsive to receiving the first indication and/or determining (based upon the first indication) that retransmission of the UL data to the IAB-node is not required, the IAB-node may not trigger the SR. Alternatively and/or additionally, the IAB-node may trigger (e.g., re-trigger) the SR at a time that the first indication is expected to be received (and/or responsive to a determination that the first indication is not received at the time). Alternatively and/or additionally, the SR may be triggered (e.g., re-triggered) responsive to (and/or when) transmitting a PDCCH, indicative of a UL grant for retransmission, to the child node. Alternatively and/or additionally, the SR may be triggered (e.g., re-triggered) during a period of time between receiving the first indication from the child node and/or transmitting the PDCCH, indicative of the UL grant for retransmission, to the child node. Alternatively and/or additionally, the SR may be triggered (e.g., re-triggered) during a period of time between the time that the first indication is expected to be received and transmitting the PDCCH, indicative of the UL grant for retransmission, to the child node.

Alternatively and/or additionally, a second SR may be triggered based upon a BSR. For example, the BSR may be triggered responsive to the UL data being (successfully) received from the child node. Alternatively and/or additionally, the second SR may be triggered responsive to the BSR being triggered.

It may be appreciated that by triggering the SR in accordance with the eighth embodiment, a number of times that the IAB-node transmits the SR may be reduced and/or may result in less data transmission from the IAB-node to the parent node.

Figure 15:
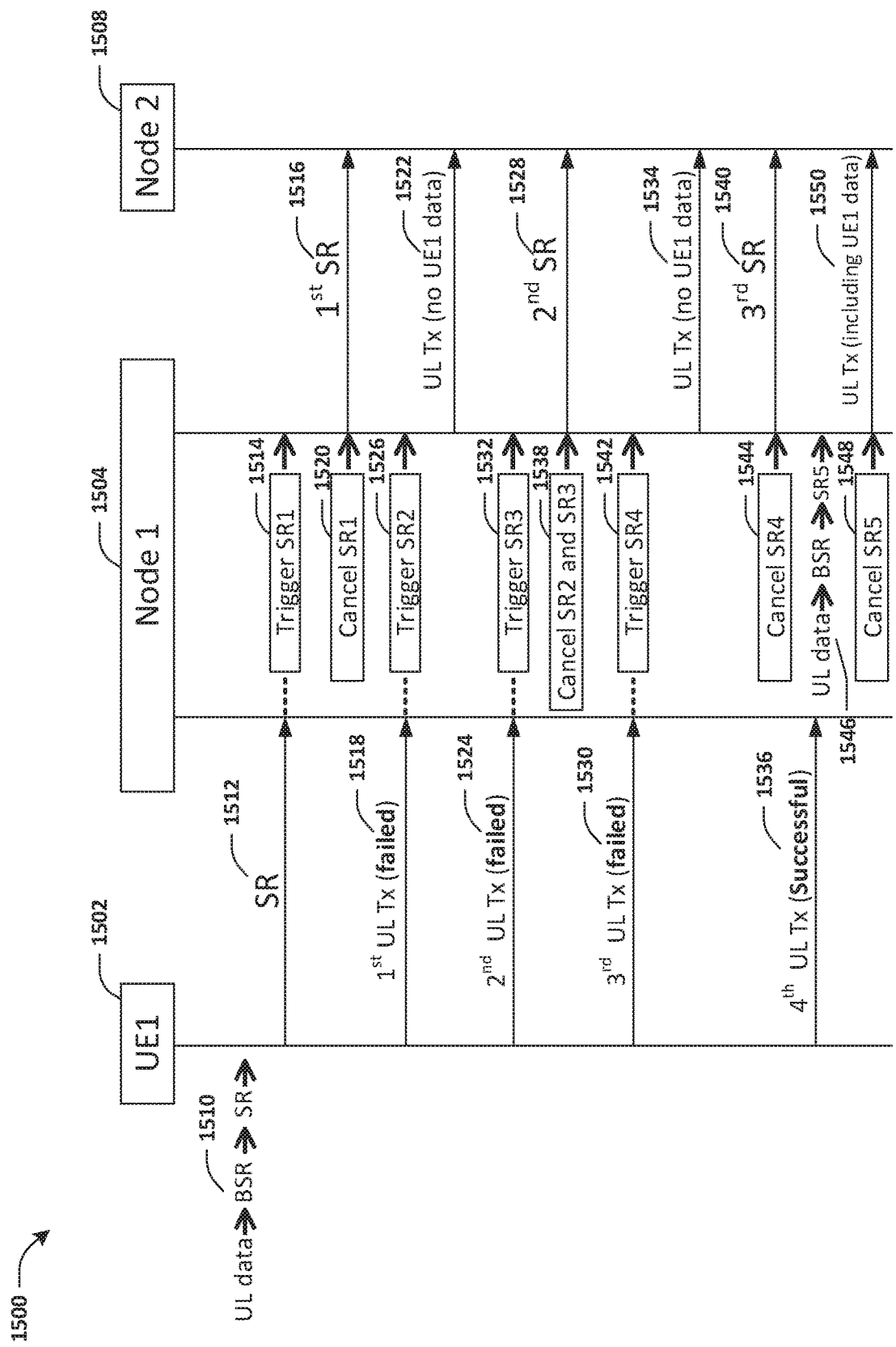
FIG. 15 illustrates an example scenario associated with an IAB system.

FIG. 15 illustrates an example scenario 1500 associated with an IAB system operating in accordance with the eighth embodiment. In some examples, a UE 1502 may be connected to an access node 1504 (via an access link). The UE 1502 may perform one or more first operations 1510. The one or more first operations 1510 may be associated with UL data arriving at a buffer of the UE 1502, the UE 1502 triggering a BSR and/or the UE 1502 triggering an SR 1512. For example, the UE 1502 may transmit the SR 1512 to the access node 1504. Alternatively and/or additionally, the access node 1504 may receive the SR 1512. At 1514, a second SR (e.g., SR1) may be triggered responsive to receiving the SR 1512 from the UE 1502. In some examples, an SR 1516 "1st SR", associated with the second SR and/or an SR configuration associated with the second SR, may be transmitted to a parent node 1508 of the access node 1504 (e.g., the SR 1516 "1st SR" may comprise the second SR). Alternatively and/or additionally, at 1520, the second SR may be canceled responsive to transmission of the SR 1516 "1st SR" to the parent node 1508 (and/or the second SR may be canceled when the SR 1516 "1st SR" is transmitted to the parent node 1508).

Alternatively and/or additionally, the access node 1504 may transmit a first UL grant to the UE 1502. In some examples, a first transmission 1518 of the UL data may be unsuccessful (and/or may fail). For example, the UL data may not be received by the access node 1504 responsive to the first transmission 1518. Alternatively and/or additionally, at 1526, an SR2 (e.g., an SR) associated with the second SR and/or the SR configuration may be triggered. In some examples, the SR2 may be triggered at 1526 responsive to the first transmission 1518 that is unsuccessful. Alternatively and/or additionally, the SR2 may be triggered at 1526 responsive to receiving a first indication from the UE 1502 via the first transmission 1518 and/or determining (based upon the first indication) that retransmission of the UL data of the UE 1502 to the access node 1504 is required.

Alternatively and/or additionally, the access node 1504 may receive a second UL grant from the parent node 1508. For example, the second UL grant may be transmitted to the access node 1504 based upon the SR 1516 "1st SR". In some examples, second UL data 1522 may be transmitted to the parent node 1508 based upon the second UL grant. The second UL data 1522 may not comprise the UL data associated with the UE 1502.

Alternatively and/or additionally, a second transmission 1524 of the UL data may be unsuccessful (and/or may fail). For example, the UL data may not be received by the access node 1504 responsive to the second transmission 1524. Alternatively and/or additionally, at 1532, an SR3 (e.g., an SR) associated with the second SR and/or the SR configuration may be triggered. In some examples, the SR3 may be triggered at 1532 responsive to the second transmission 1524 that is unsuccessful. Alternatively and/or additionally, the SR3 may be triggered at 1532 responsive to receiving a second indication from the UE 1502 via the second transmission 1524 and/or determining (based upon the second indication) that retransmission of the UL data of the UE 1502 to the access node 1504 is required. Alternatively and/or additionally, the access node 1504 may transmit an SR 1528 "2nd SR" associated with the second SR and/or the SR configuration to the parent node 1508. Alternatively and/or additionally, at 1538, the SR2 and/or the SR3 may be canceled responsive to transmission of the SR 1528 "2nd SR" to the parent node 1508 (and/or the SR2 and/or the SR3 may be canceled when the SR 1528 "2nd SR" is transmitted to the parent node 1508).

Alternatively and/or additionally, a third transmission 1530 of the UL data may be unsuccessful (and/or may fail). For example, the UL data may not be received by the access node 1504 responsive to the third transmission 1530. Alternatively and/or additionally, at 1542, an SR4 (e.g., an SR) associated with the second SR and/or the SR configuration may be triggered. In some examples, the SR4 may be triggered at 1542 responsive to the third transmission 1530 that is unsuccessful. Alternatively and/or additionally, the SR4 may be triggered at 1542 responsive to receiving a third indication from the UE 1502 via the third transmission 1530 and/or determining (based upon the third indication) that retransmission of the UL data of the UE 1502 to the access node 1504 is required.

Alternatively and/or additionally, the access node 1504 may receive a third UL grant from the parent node 1508. For example, the third UL grant may be transmitted to the access node 1504 based upon the SR 1528 "2nd SR". In some examples, third UL data 1534 may be transmitted to the parent node 1508 based upon the third UL grant. The third UL data 1534 may not comprise the UL data associated with the UE 1502. Alternatively and/or additionally, the access node 1504 may transmit an SR 1540 "3rd SR" associated with the second SR and/or the SR configuration to the parent node 1508. Alternatively and/or additionally, at 1544, the SR4 may be canceled responsive to transmission of the SR 1540 "3rd SR" to the parent node 1508 (and/or the SR4 may be canceled when the SR 1540 "3rd SR" is transmitted to the parent node 1508).

Alternatively and/or additionally, a fourth transmission 1536 of the UL data may be successful. For example, the UL data may be received by the access node 1504 responsive to the fourth transmission 1536. In some examples, one or more second operations 1546 may be performed by the access node 1504 responsive to the fourth transmission 1536. Alternatively and/or additionally, the one or more second operations 1546 may be performed by the access node 1504 responsive to receiving a fourth indication from the UE 1502 via the fourth transmission 1536 and/or determining (based upon the fourth indication) that retransmission of the UL data of the UE 1502 to the access node 1504 is not required.

For example, the one or more second operations 1504 may be associated with the UL data arriving at a buffer of the access node 1504, the access node 1504 triggering a BSR and/or the access node 1504 triggering an SR5 (e.g., an SR) associated with the second SR and/or the SR configuration. Alternatively and/or additionally, the access node 1504 may receive a fourth UL grant from the parent node 1508. For example, the fourth UL grant may be transmitted to the access node 1504 based upon the SR 1540 "3rd SR". In some examples, fourth UL data 1550 may be transmitted to the parent node 1508 based upon the fourth UL grant. The fourth UL data 1550 may comprise the UL data associated with the UE 1502. Alternatively and/or additionally, at 1548, the SR5 may be canceled (e.g., the second SR and/or the SR5 may be canceled based upon transmission of the fourth UL data 1550 comprising the UL data associated with the UE 1502).

Figure 16:
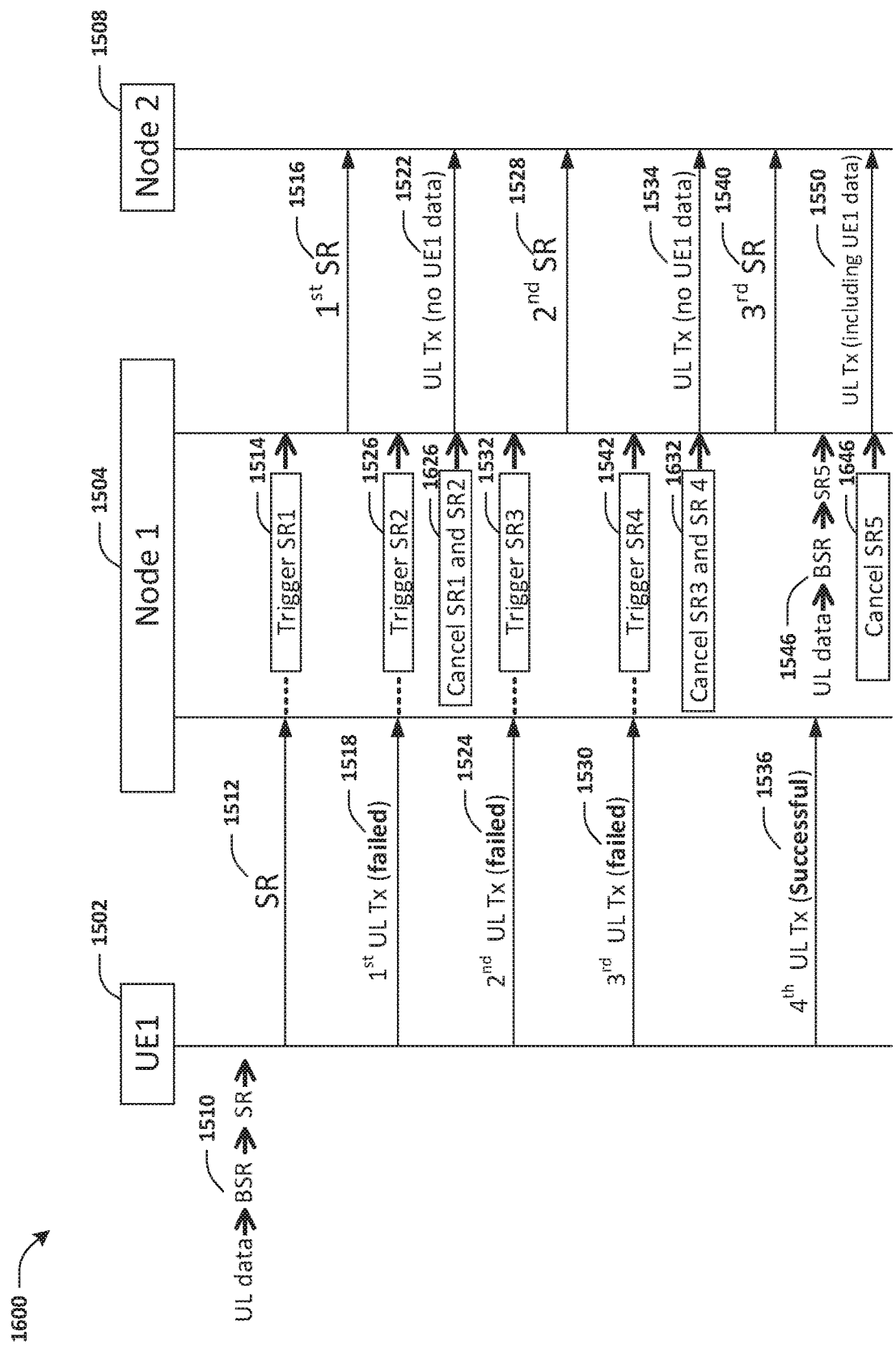
FIG. 16 illustrates an example scenario associated with an IAB system.

FIG. 16 illustrates an example scenario 1600 associated with the IAB system operating in accordance with the eighth embodiment. In some examples, the access node 1504 may receive the SR 1512 from the UE 1502. The second SR may not be canceled responsive to transmission of the SR 1516 "1st SR" to the parent node 1508. Alternatively and/or additionally, at 1626, the second SR (e.g., SR1) and/or the SR2 may be canceled responsive to transmission of the second UL data 1522, that does not comprise the UL data associated with the UE 1502, to the parent node 1508 (and/or the second SR (e.g., SR1) and/or the SR2 may be canceled when the second UL data 1522 is transmitted to the parent node 1508). Alternatively and/or additionally, at 1632, the SR3 and/or the SR4 may be canceled responsive to transmission of the third UL data 1534, that does not comprise the UL data associated with the UE 1502, to the parent node 1508 (and/or the SR3 and/or the SR4 may be canceled when the third UL data 1534 is transmitted to the parent node 1508). Alternatively and/or additionally, at 1646, the SR5 may be canceled (e.g., the second SR and/or the SR5 may be canceled based upon the fourth UL data 1550 comprising the UL data associated with the UE 1502). In some examples, the SR5 (and/or the second SR) may be canceled based upon one or more SR cancellation conditions (such as the first condition and/or the second condition presented herein).

In a ninth embodiment, an SR prohibit timer, associated with an SR that is an early triggered SR, may be stopped based upon one or more indications received from a child node. For example, an IAB-node may trigger the SR responsive to receiving a second SR from the child node. The SR may be triggered prior to the IAB-node receiving UL data from the child node. Alternatively and/or additionally, the IAB-node may trigger the SR based upon a received BSR and/or a triggered BSR, prior to the IAB-node receiving the UL data from the child node.

In some examples, the IAB-node may start the SR prohibit timer (if the SR prohibit timer associated with the SR is configured) responsive to the IAB-node transmitting the SR to a parent node of the IAB-node. Alternatively and/or additionally, the IAB-node may receive a first indication from the child node. In some examples, the first indication may be indicative of retransmission of the UL data to the IAB-node not being required. Alternatively and/or additionally, the first indication may be indicative of retransmission of the UL data to the IAB-node being required. In some examples, the first indication may correspond to a UL data transmission of the UL data. For example, the first indication may comprise the UL data.

In some examples, responsive to receiving the first indication and/or determining (based upon the first indication) that retransmission of the UL data to the IAB-node is required, the IAB-node may stop the SR prohibit timer (if the SR prohibit timer is running). For example, the IAB-node may stop the SR prohibit timer to acquire one or more UL resources sooner than if the IAB-node were not to stop the SR prohibit timer. Alternatively and/or additionally, responsive to receiving the first indication and/or determining (based upon the first indication) that retransmission of the UL data to the IAB-node is not required, the IAB-node may not stop the SR prohibit timer (if the SR prohibit timer is running). For example, by not stopping the SR prohibit timer, a number of times that the IAB-node transmits the SR may be reduced and/or may result in less data transmission from the IAB-node to the parent node.

Alternatively and/or additionally, the IAB-node may stop the SR prohibit timer at a time that the first indication is expected to be received (and/or responsive to a determination that the first indication is not received at the time). Alternatively and/or additionally, the SR prohibit timer may be stopped responsive to (and/or when) transmitting a PDCCH, indicative of a UL grant for retransmission, to the child node. Alternatively and/or additionally, the SR prohibit timer may be stopped during a period of time between receiving the first indication from the child node and/or transmitting the PDCCH, indicative of the UL grant for retransmission, to the child node. Alternatively and/or additionally, the SR prohibit timer may be stopped during a period of time between the time that the first indication is expected to be received and transmitting the PDCCH, indicative of the UL grant for retransmission, to the child node.

Alternatively and/or additionally, the SR may be canceled responsive to the IAB-node performing UL data transmission of data (e.g., a MAC PDU) to the parent node and/or the data comprises the UL data (of the child node) (and/or the data comprises a BSR indicative of a buffer status of the child node). Alternatively and/or additionally, the SR may be canceled responsive to a MAC PDU being assembled, where the MAC PDU comprises the UL data from the child node (and/or the MAC PDU comprises a BSR reflecting the buffer status of the child node). Alternatively and/or additionally, the SR may be canceled based upon one or more SR cancellation conditions (such as the first condition and/or the second condition presented herein). Alternatively and/or additionally, responsive to receiving the first indication and/or determining (based upon the first indication) that retransmission of the UL data to the IAB-node is required, the IAB-node may not cancel the SR. Alternatively and/or additionally, responsive to receiving the first indication and/or determining (based upon the first indication) that retransmission of the UL data to the IAB-node is not required, the IAB-node may cancel the SR.

In some examples, a BSR transmitted by the IAB-node to the parent node may be indicative of the buffer status of the child node (e.g., the buffer status may be determined based upon a second BSR received from the child node). For example, the BSR may be indicative of an amount of data (associated with the UL data that the IAB-node has not yet received from the child node and/or has not yet processed) indicated by the second BSR received from the child node.

Figure 17:
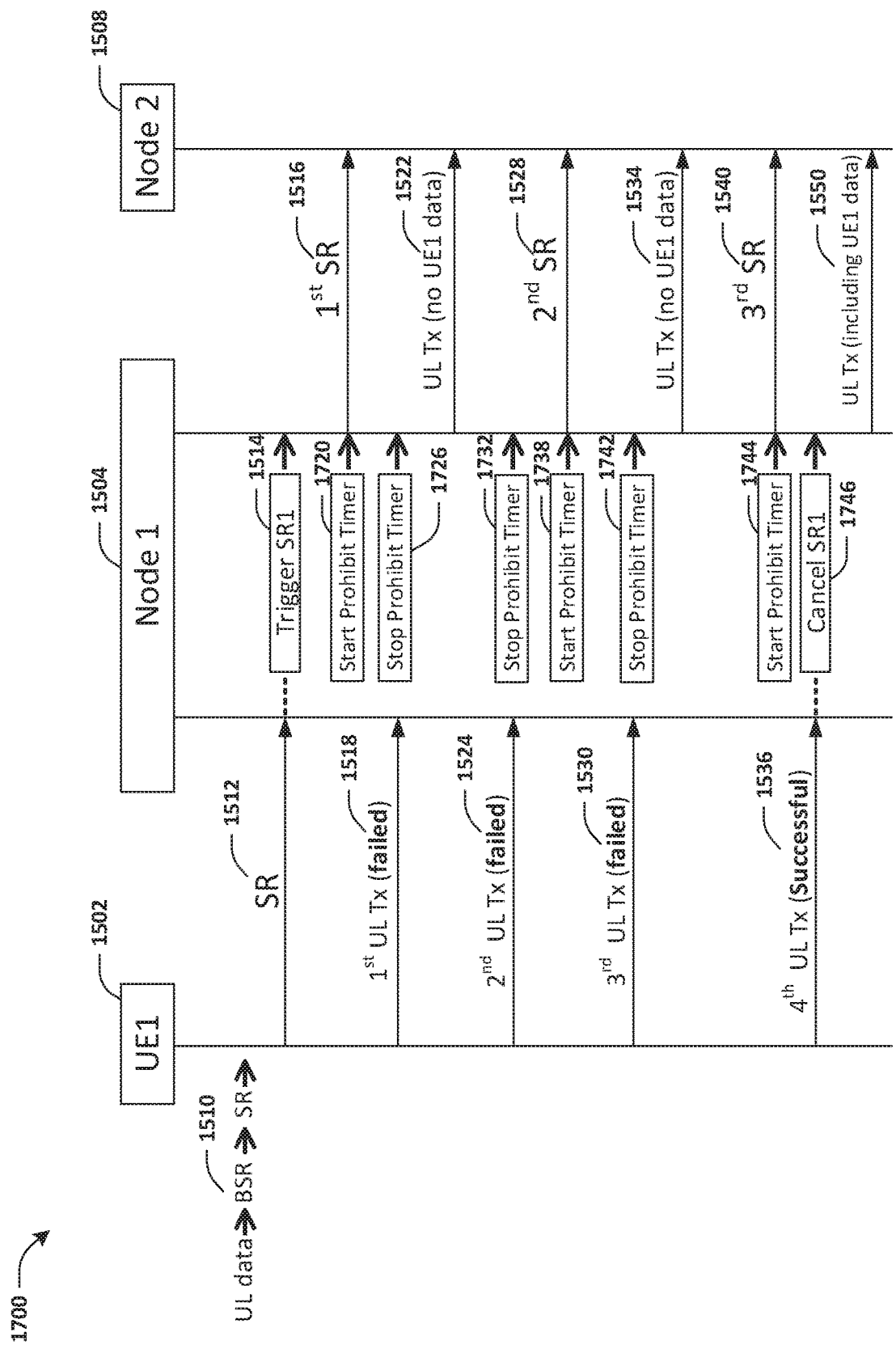
FIG. 17 illustrates an example scenario associated with an IAB system.

FIG. 17 illustrates an example scenario 1700 associated with the IAB system operating in accordance with the ninth embodiment. In some examples, the access node 1504 may receive the SR 1512 from the UE 1502. In some examples, at 1514, the second SR (e.g., SR1) may be triggered responsive to receiving the SR 1512 from the UE 1502. In some examples, at 1720, an SR prohibit timer associated with the second SR may be started responsive to transmission of the SR 1516 "1st SR" to the parent node 1508. Alternatively and/or additionally, at 1726, the SR prohibit timer may be stopped (if the SR prohibit timer is running) responsive to the first transmission 1518 of the UL data that is unsuccessful. Alternatively and/or additionally, the SR prohibit timer may be stopped at 1726 (if the SR prohibit timer is running) responsive to receiving the first indication from the UE 1502 via the first transmission 1518 and/or determining (based upon the first indication) that retransmission of the UL data of the UE 1502 to the access node 1504 is required.

Alternatively and/or additionally, at 1732, the SR prohibit timer may be stopped (if the SR prohibit timer is running) responsive to the second transmission 1524 of the UL data that is unsuccessful. Alternatively and/or additionally, the SR prohibit timer may be stopped at 1732 (if the SR prohibit timer is running) responsive to receiving the second indication from the UE 1502 via the second transmission 1524 and/or determining (based upon the second indication) that retransmission of the UL data of the UE 1502 to the access node 1504 is required.

In some examples, at 1738, the SR prohibit timer may be started responsive to transmission of the SR 1528 "2nd SR" to the parent node 1508. Alternatively and/or additionally, at 1742, the SR prohibit timer may be stopped (if the SR prohibit timer is running) responsive to the third transmission 1530 of the UL data that is unsuccessful. Alternatively and/or additionally, the SR prohibit timer may be stopped at 1742 (if the SR prohibit timer is running) responsive to receiving the third indication from the UE 1502 via the third transmission 1530 and/or determining (based upon the third indication) that retransmission of the UL data of the UE 1502 to the access node 1504 is required.

In some examples, at 1744, the SR prohibit timer may be started responsive to transmission of the SR 1540 "3rd SR" to the parent node 1508. Alternatively and/or additionally, at 1746 the second SR (e.g., SR1) may be canceled responsive to the fourth transmission 1536 of the UL data that is successful. Alternatively and/or additionally, the second SR may be canceled at 1746 responsive to receiving the fourth indication from the UE 1502 via the fourth transmission 1536 and/or determining (based upon the fourth indication) that retransmission of the UL data of the UE 1502 to the access node 1504 is not required.

In some examples, each of the first embodiment, the second embodiment, the third embodiment, the fourth embodiment, the fifth embodiment, the sixth embodiment, the seventh embodiment, the eighth embodiment and the ninth embodiment may be implemented independently and/or separately. Alternatively and/or additionally, a combination of one or more of the first embodiment, the second embodiment, the third embodiment, the fourth embodiment, the fifth embodiment, the sixth embodiment, the seventh embodiment, the eighth embodiment and/or the ninth embodiment may be implemented.

Figure 18:
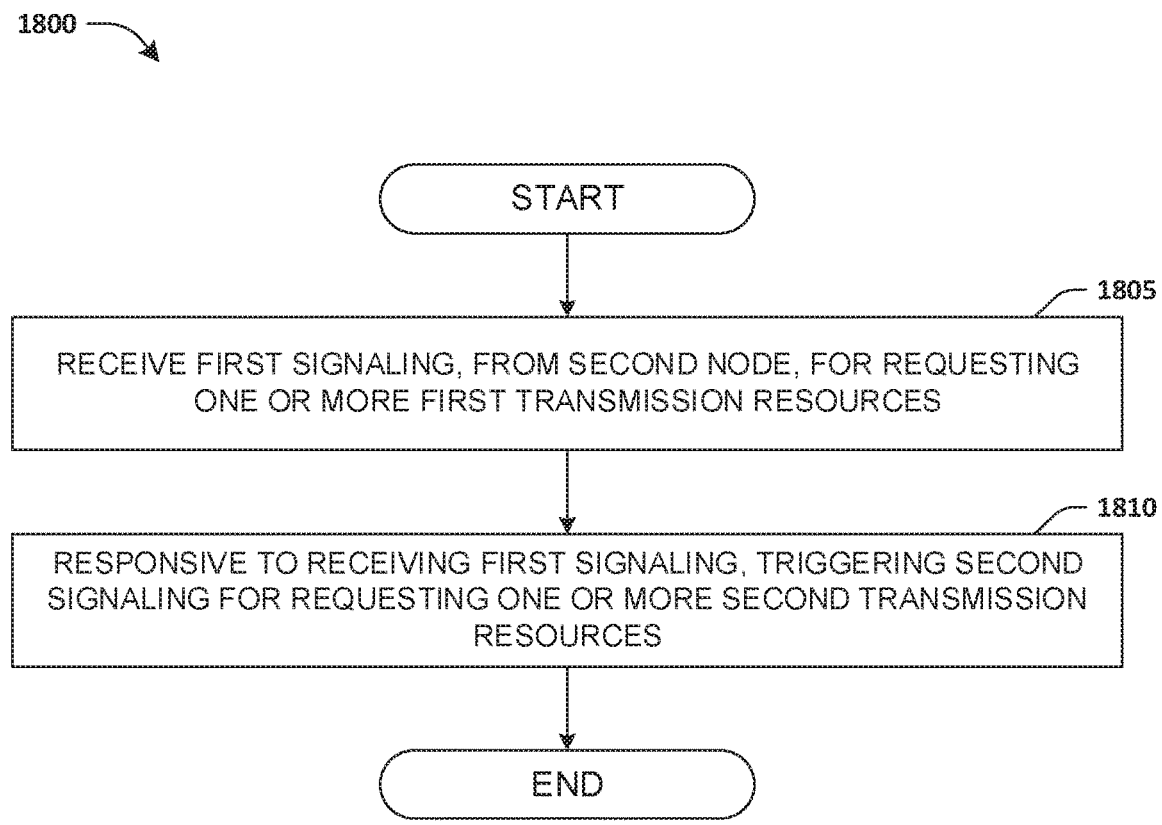
FIG. 18 is a flow chart according to one exemplary embodiment.

FIG. 18 is a flow chart 1800 according to one exemplary embodiment from the perspective of a first node. In step 1805, a first signaling may be received, from a second node, for requesting one or more first transmission resources (e.g., the first signaling may be a request for the one or more first transmission resources). In step 1810, responsive to receiving the first signaling, a second signaling for requesting one or more second transmission resources may be triggered (e.g., the second signaling may be a second request for the one or more second transmission resources).

Figure 19:
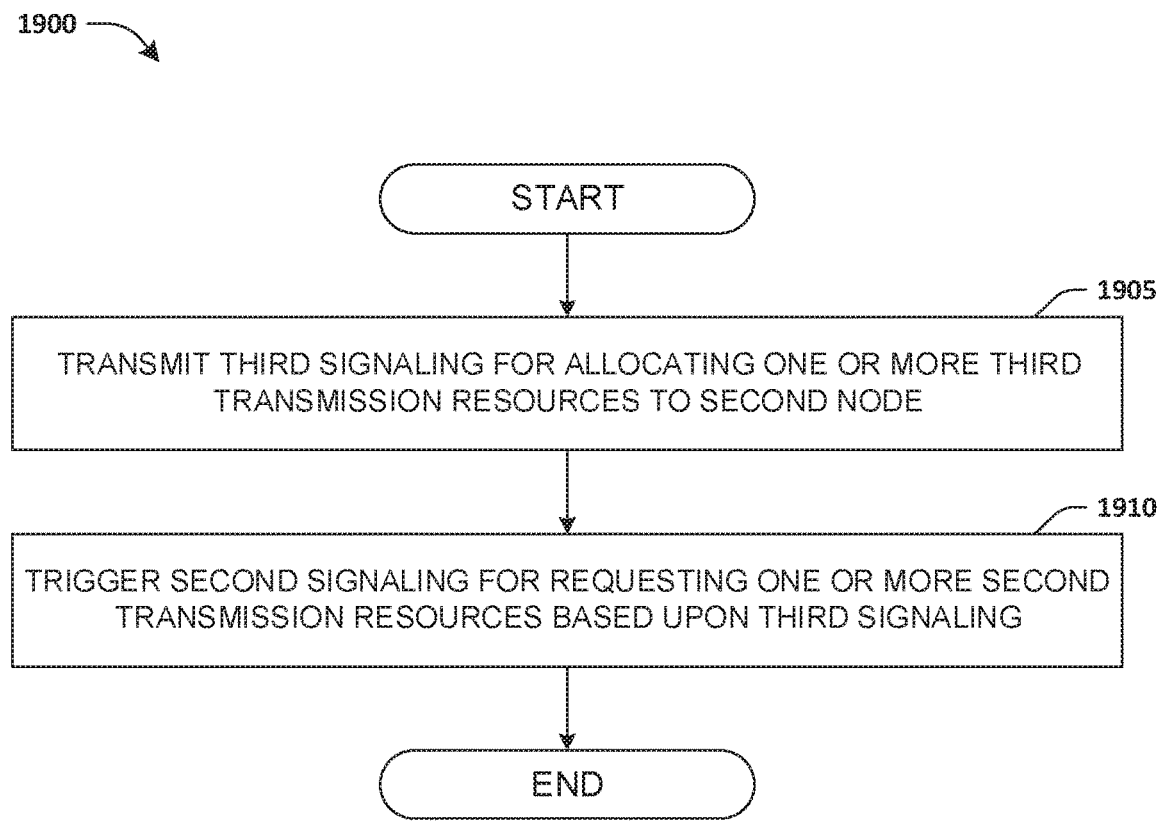
FIG. 19 is a flow chart according to one exemplary embodiment.

FIG. 19 is a flow chart 1900 according to one exemplary embodiment from the perspective of a first node. In step 1905, a third signaling for allocating one or more third transmission resources may be transmitted to a second node. In step 1910, a second signaling for requesting one or more second transmission resources may be triggered based upon the third signaling.

In the context of one or more of the embodiment illustrated in FIG. 18 and/or the embodiment illustrated in FIG. 19 and discussed above, the first node may transmit the second signaling to a third node after (and/or responsive to) triggering the second signaling.

In the context of the embodiment illustrated in FIG. 19 and discussed above, the first node may transmit the third signaling responsive to receiving a first signaling for requesting one or more first transmission resources. Alternatively and/or additionally, the first node may trigger the second signaling responsive to transmission of the third signaling to the second node.

Figure 20:
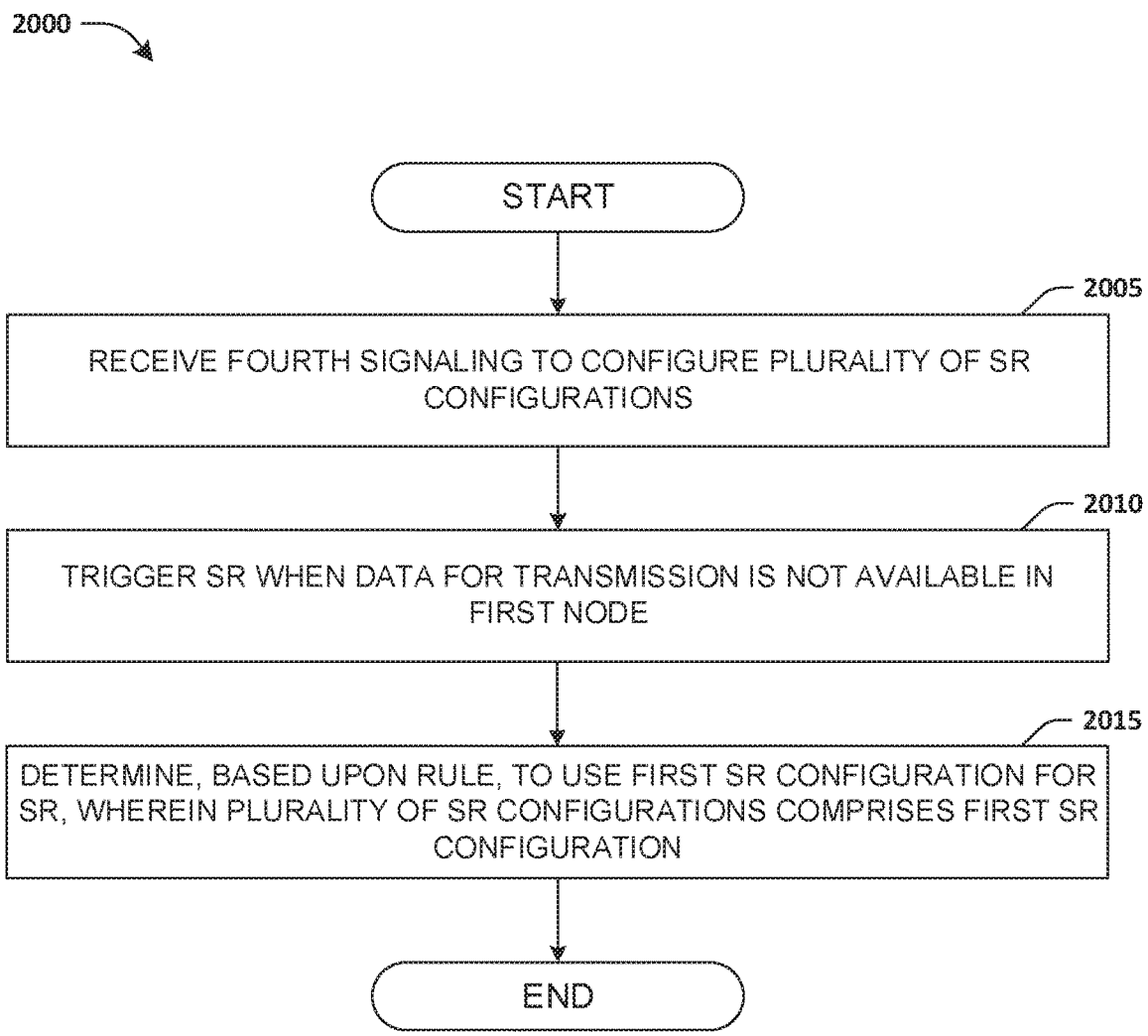
FIG. 20 is a flow chart according to one exemplary embodiment.

FIG. 20 is a flow chart 2000 according to one exemplary embodiment from the perspective of a first node. In step 2005, a fourth signaling to configure a plurality of SR configurations may be received. In step 2010, an SR may be triggered when data for transmission is not available in the first node (e.g., the SR may be triggered when no data is available in the first node). In step 2015, the first node may determine, based upon a rule, to use a first SR configuration for the SR, wherein the plurality of SR configurations comprises the first SR configuration.

In the context of the embodiment illustrated in FIG. 20 and discussed above, the fourth signaling may comprise an RRC message. Alternatively and/or additionally, the first node may trigger the SR responsive to receiving a fifth signaling, from a second node, for requesting one or more transmission resources. Alternatively and/or additionally, the fifth signaling may comprise a second SR associated with the second node. Alternatively and/or additionally, the second SR may be associated with a second SR configuration configured to the second node.

Alternatively and/or additionally, the rule may be associated with a mapping (e.g., an implicit mapping). Alternatively and/or additionally, the first node may map the second SR configuration to the first SR configuration based upon a first index of the first SR configuration and/or a second index of the second SR configuration.

Alternatively and/or additionally, the rule may be associated with a mapping (e.g., an explicit mapping). Alternatively and/or additionally, the first node may map the second SR configuration to the first SR configuration based upon a mapping table configured to the first node. Alternatively and/or additionally, the mapping table may map the second SR configuration (associated with the second node) to the first SR configuration (associated with the first node).

Alternatively and/or additionally, the rule may be associated with a defined SR configuration, of the plurality of SR configurations, for the SR (e.g., the first SR configuration may correspond to the defined SR configuration based upon the rule). The defined SR configuration may be pre-defined. Alternatively and/or additionally, the defined SR configuration may be configurable (and/or changed).

In some examples, the mapping (e.g., the implicit mapping and/or the explicit mapping) may correspond to one-to-one (e.g., a single SR configuration to a single SR configuration). Alternatively and/or additionally, the mapping may correspond to many-to-one (e.g., a plurality of SR configurations to a single SR configuration). Alternatively and/or additionally, the mapping may correspond to one-to-many (e.g., a single SR configuration to a plurality of SR configurations). Alternatively and/or additionally, the mapping may correspond to many-to-many (e.g., a plurality of SR configurations to a plurality of SR configurations).

In the context of one or more of the embodiment illustrated in FIG. 18, the embodiment illustrated in FIG. 19 and/or the embodiment illustrated in FIG. 20 and discussed above, the third signaling may be a downlink control information (DCI) transmitted via a PDCCH. Alternatively and/or additionally, the DCI may comprise an uplink grant. Alternatively and/or additionally, the uplink grant may be associated with a new transmission.

Figure 21:
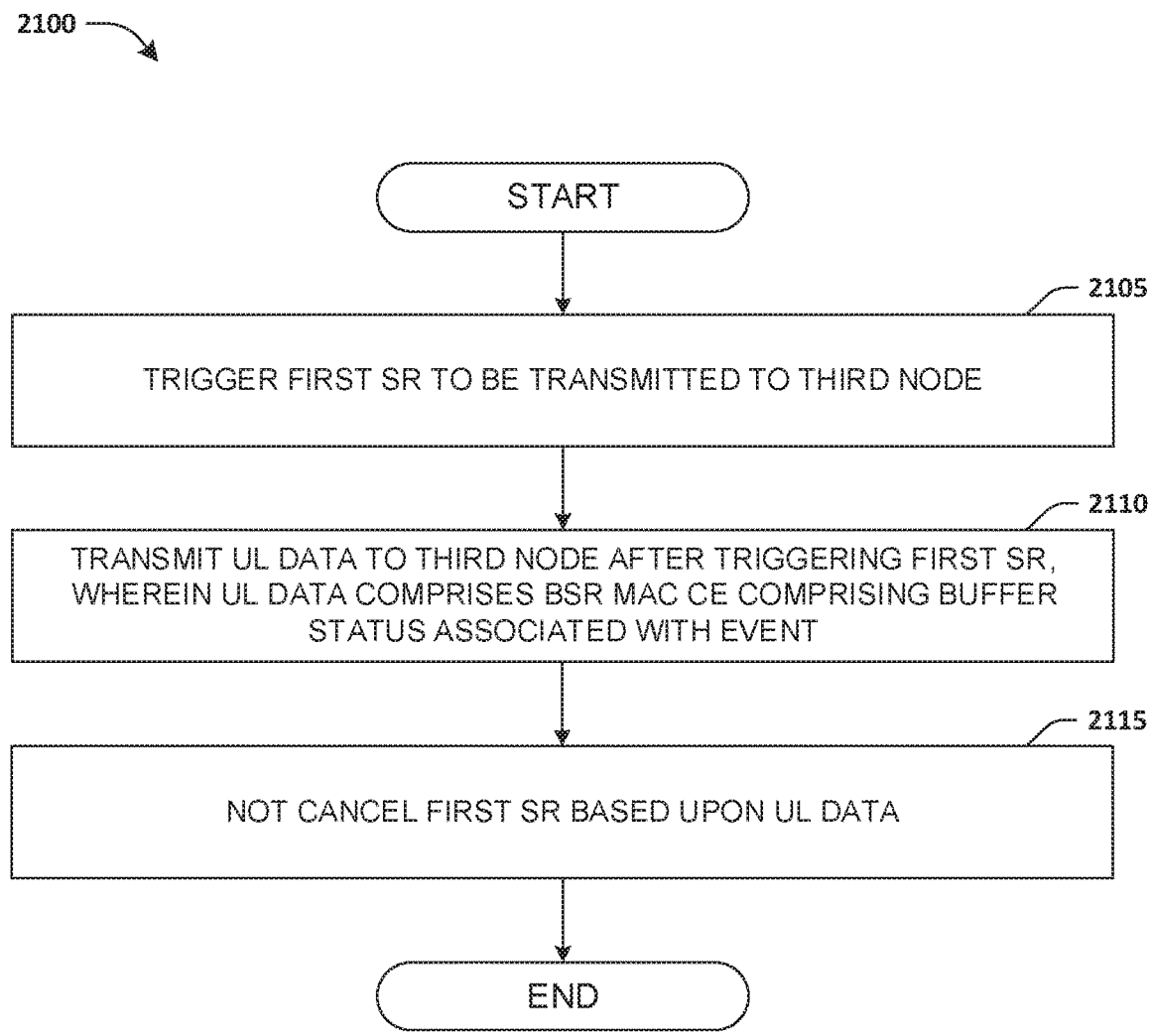
FIG. 21 is a flow chart according to one exemplary embodiment.

FIG. 21 is a flow chart 2100 according to one exemplary embodiment from the perspective of a first node. In step 2105, a first SR may be triggered to be transmitted to a third node. In step 2110, UL data may be transmitted to the third node after triggering the first SR, wherein the UL data may comprise a BSR MAC CE comprising a buffer status associated with an event. The event may be associated with a BSR being triggered in the first node (e.g., the event may be a most recent event associated with the BSR being triggered). In step 2115, the first SR may not be canceled. The first SR may not be canceled based upon the UL data and/or based upon transmission of the UL data to the third node.

In the context of the embodiment illustrated in FIG. 21 and discussed above, the first node may cancel the first SR if the UL data comprises second UL data received from a second node. Alternatively and/or additionally, the first node may cancel the first SR if the UL data comprises a second BSR indicative of a second buffer status of the second node. Alternatively and/or additionally, the first node may cancel the first SR responsive to a determination that data retransmission from the second node to the first node is not required.

Alternatively and/or additionally, the first node may trigger a second SR to be transmitted to the third node before transmitting the UL data to the third node. Alternatively and/or additionally, the first node may cancel the second SR based upon (and/or responsive to) transmission of the UL data to the third node.

Alternatively and/or additionally, the first SR may be an early triggered SR that is not triggered by a BSR. Alternatively and/or additionally, the second SR may be triggered responsive to a BSR being triggered.

Alternatively and/or additionally, the UL data may not comprise the second UL data (and/or third UL data) associated with the second node. Alternatively and/or additionally, the UL data may not comprise a BSR indicative of a buffer status of the second node.

Figure 22:
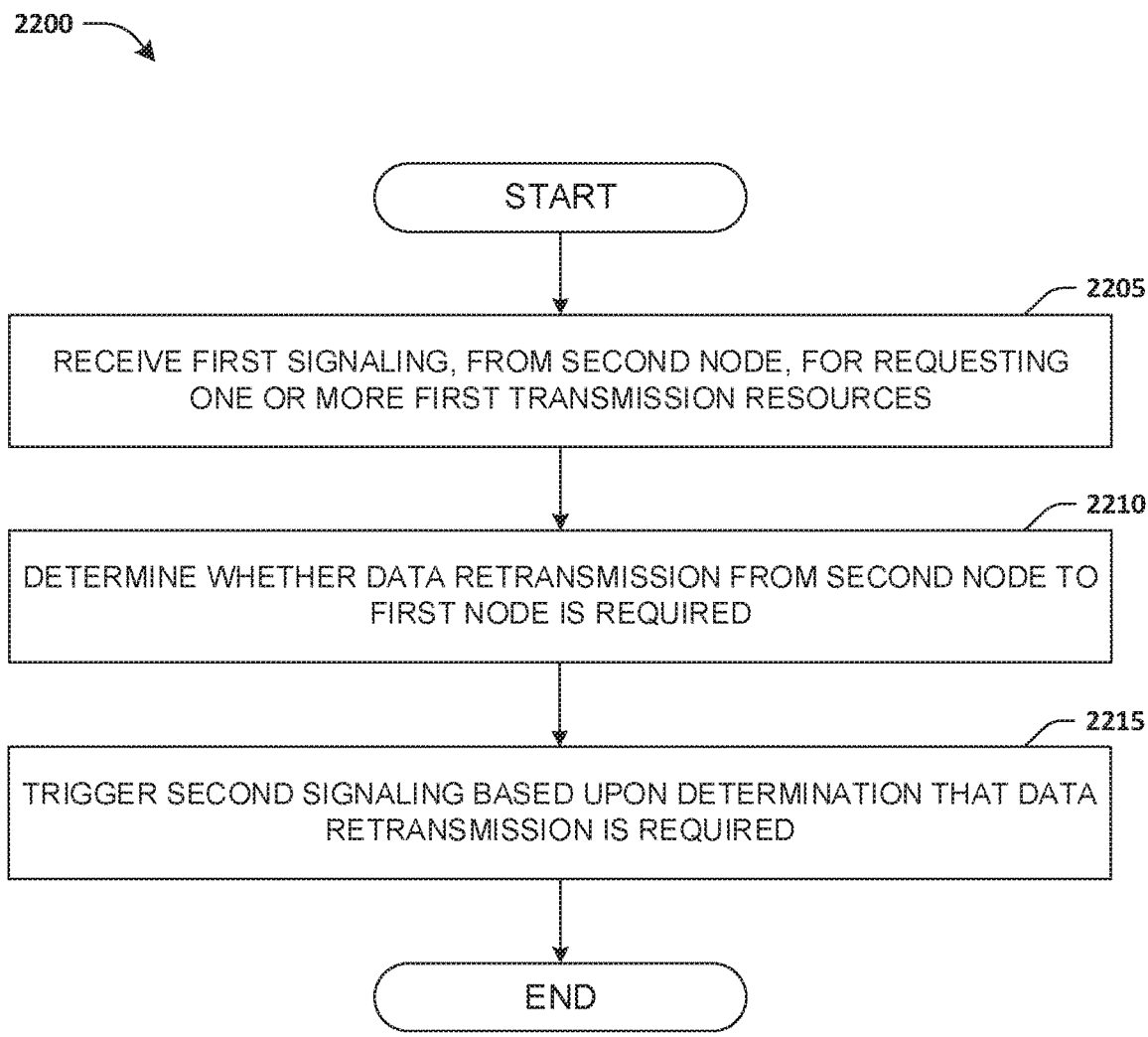
FIG. 22 is a flow chart according to one exemplary embodiment.

FIG. 22 is a flow chart 2200 according to one exemplary embodiment from the perspective of a first node. In step 2205, a first signaling may be received, from a second node, for requesting one or more first transmission resources (e.g., the first signaling may be a request for the one or more first transmission resources). In step 2210, the first node may determine whether data retransmission from the second node to the first node is required. In step 2215, a second signaling may be triggered (and/or retriggered) based upon a determination that the data retransmission is required.

In the context of the embodiment illustrated in FIG. 22 and discussed above, the first node may trigger the second signaling for requesting one or more second transmission resources responsive to receiving the first signaling (e.g., the second signaling may be a request for the one or more second transmission resources). Alternatively and/or additionally, the first node may transmit the second signaling to a third node after triggering the second signaling. Alternatively and/or additionally, the first node may cancel the second signaling based upon and/or responsive to transmission of the second signaling to the third node.

Alternatively and/or additionally, the first node may transmit UL data to the third node after triggering the second signaling. Alternatively and/or additionally, the first node may cancel the second signaling if the UL data comprises a BSR MAC CE comprising a buffer status associated with an event (e.g., a most recent event) that triggered a BSR in the first node.

Alternatively and/or additionally, the determination that the data retransmission is required may be based upon a transmission of second UL data from the second node.

Alternatively and/or additionally, the second signaling may not be triggered (and/or may not be retriggered) responsive to a determination that the data retransmission is not required.

Figure 23:
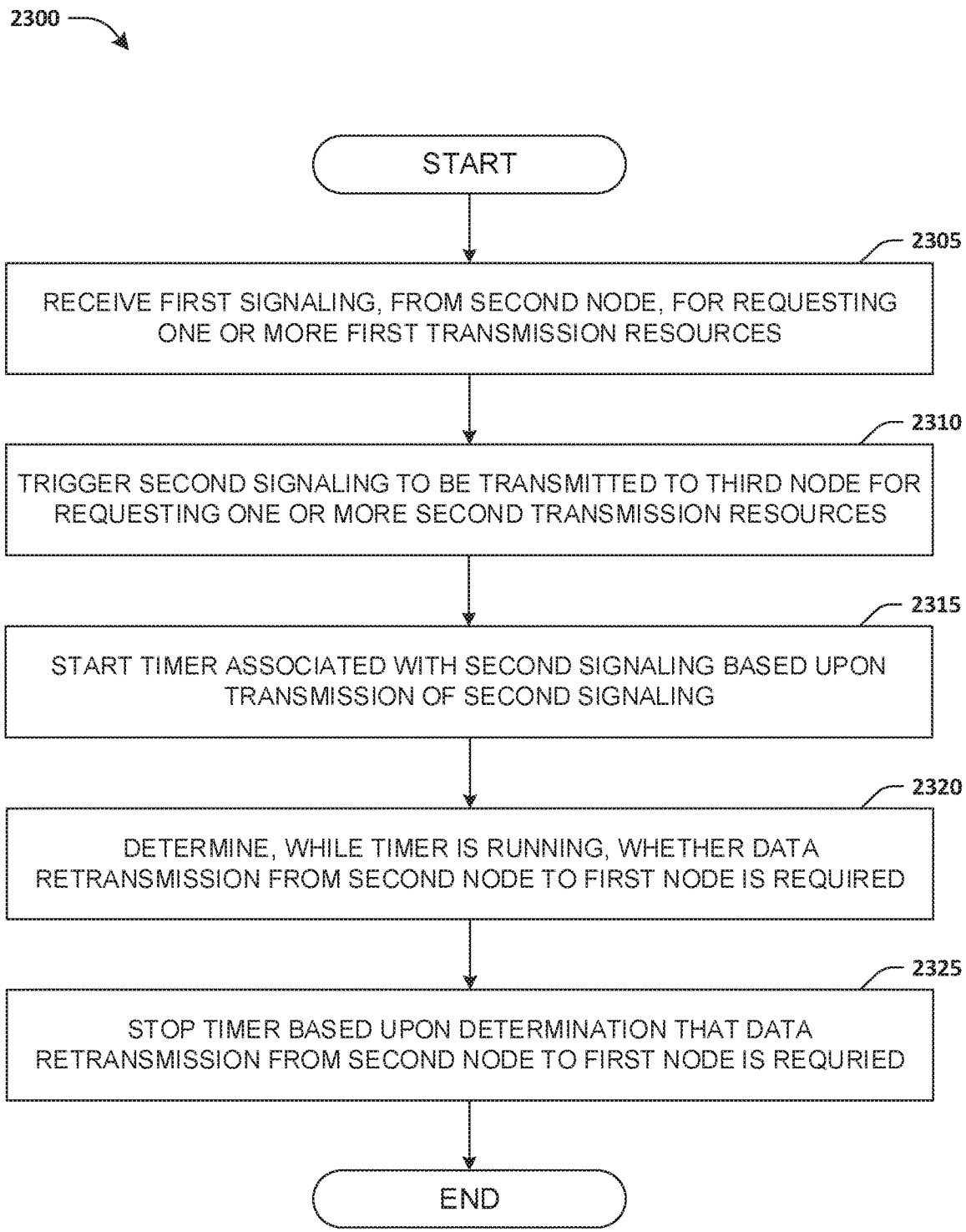
FIG. 23 is a flow chart according to one exemplary embodiment.

FIG. 23 is a flow chart 2300 according to one exemplary embodiment from the perspective of a first node. In step 2305, a first signaling may be received, from a second node, for requesting one or more first transmission resources (e.g., the first signaling may be a request for the one or more first transmission resources). In step 2310, a second signaling may be triggered to be transmitted to a third node for requesting one or more second transmission resources. In step 2315, a timer associated with the second signaling may be started based upon a transmission of the second signaling (and/or the timer may be started responsive to the transmission of the second signaling). In step 2320, the first node may determine, while the timer is running, whether data retransmission from the second node to the first node is required. In step 2325, the timer may be stopped based upon a determination that the data retransmission from the second node to the first node is required.

In the context of the embodiment illustrated in FIG. 23 and discussed above, the first node may transmit UL data to the third node after triggering the second signaling. Alternatively and/or additionally, the first node may cancel the second signaling based upon transmission of the UL data if the UL data comprises second UL data (received) from the second node. Alternatively and/or additionally, the first node may cancel the second signaling based upon transmission of the UL data if the UL data comprises a BSR indicative of a buffer status of the second node.

Alternatively and/or additionally, the first node may not cancel the second signaling based upon the determination that the data retransmission from the second node to the first node is required. Alternatively and/or additionally, the determination that the data retransmission is required may be based upon a transmission of third UL data from the second node.

Alternatively and/or additionally, the first node may cancel the second signaling based upon a determination that the data retransmission from the second node to the first node is not required.

Alternatively and/or additionally, the first node may trigger the second signaling responsive to receiving the first signaling.

Alternatively and/or additionally, the timer may be an SR prohibit timer. Alternatively and/or additionally, the SR prohibit timer may be used to prohibit transmission of the second signaling.

In the context of one or more of the embodiment illustrated in FIG. 22 and/or the embodiment illustrated in FIG. 23, and discussed above, the first node may transmit the second signaling to the third node after triggering the second signaling and/or before canceling the second signaling.

In the context of one or more of the embodiment illustrated in FIG. 18, the embodiment illustrated in FIG. 19, the embodiment illustrated in FIG. 20, the embodiment illustrated in FIG. 21, the embodiment illustrated in FIG. 22 and/or the embodiment illustrated in FIG. 23, and discussed above, the one or more first transmission resources and/or the one or more second transmission resources may be associated with UL data transmission on a PUSCH.

Alternatively and/or additionally, the first signaling may be an SR received via a PUCCH. Alternatively and/or additionally, the first signaling may be an RA preamble received via a PRACH. Alternatively and/or additionally, the first signaling may be a BSR received via a PUSCH. Alternatively and/or additionally, the first signaling may be a MAC CE received via a PUSCH. Alternatively and/or additionally, the first signaling may be an RRC messages received via a PUSCH.

Alternatively and/or additionally, the second signaling may be an RA preamble transmitted via a PRACH. Alternatively and/or additionally, the second signaling may be a BSR transmitted via a PUSCH. Alternatively and/or additionally, the second signaling may be a MAC CE transmitted via a PUSCH. Alternatively and/or additionally, the second signaling may be an RRC message transmitted via a PUSCH.

Alternatively and/or additionally, the second signaling may be may be an SR transmitted via a PUCCH. Alternatively and/or additionally, the SR may be triggered when data associated with the first node and/or data originating from the first node is not available for transmission. Alternatively and/or additionally, the SR may be triggered when a BSR associated with the first node and/or originating from the first node is not triggered (and/or when no BSR associated with the first node and/or originating from the first node is triggered).

Alternatively and/or additionally, the first SR may be triggered when data associated with the first node and/or data originating from the first node is not available for transmission. Alternatively and/or additionally, the first SR may be triggered when a BSR associated with the first node and/or originating from the first node is not triggered (and/or when no BSR associated with the first node and/or originating from the first node is triggered).

Alternatively and/or additionally, the first node may be an IAB-node. Alternatively and/or additionally, the first node may be a relay node. Alternatively and/or additionally, the first node may be a network node. Alternatively and/or additionally, the first node may be an access node.

Alternatively and/or additionally, the second node may be a UE. Alternatively and/or additionally, the second node may be an IAB-node. Alternatively and/or additionally, the second node may be a relay node. Alternatively and/or additionally, the second node may be a network node.

Alternatively and/or additionally, the third node may be an IAB-node. Alternatively and/or additionally, the third node may be a relay node. Alternatively and/or additionally, the third node may be a network node. Alternatively and/or additionally, the third node may be an IAB-donor.

Alternatively and/or additionally, the third node may be a parent node of the first node. Alternatively and/or additionally, the second node may be a child node of the first node.

Alternatively and/or additionally, the first node may be an access node (and/or a parent node) of the second node.

Figure 24:
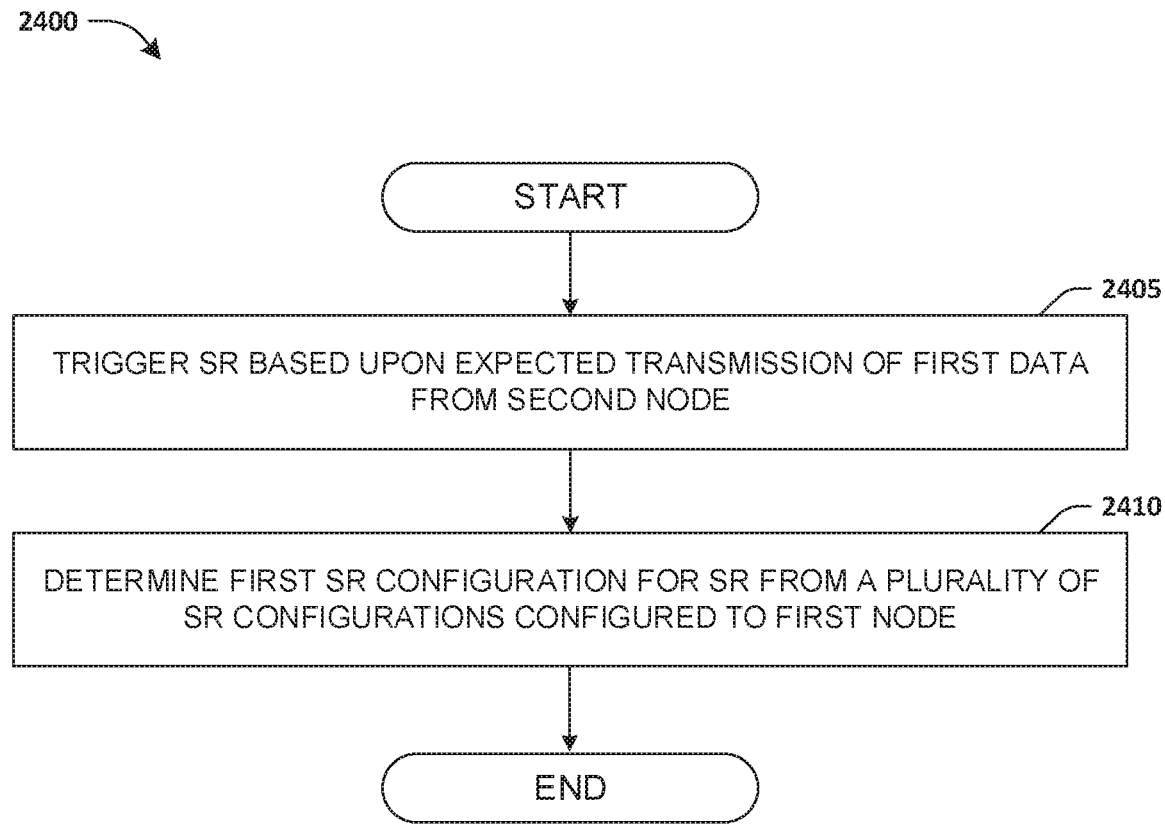
FIG. 24 is a flow chart according to one exemplary embodiment.

FIG. 24 is a flow chart 2400 according to one exemplary embodiment from the perspective of a first node. In step 2405, the first node may trigger an SR based upon an expected transmission from a second node. The second node may be a child node of the first node. In step 2410, the first node may determine a first SR configuration for the SR from a plurality of SR configurations of the first node (e.g., the plurality of SR configurations may be configured to the first node).

Referring back to FIGS. 3 and 4, in one exemplary embodiment of a first node, the device 300 includes a program code 312 stored in the memory 310. The CPU 308 may execute program code 312 (i), to trigger an SR based upon an expected transmission from a second node, wherein the second node is a child node of the first node, and (ii) to determine a first SR configuration for the SR from a plurality of SR configurations configured to the first node. Furthermore, the CPU 308 can execute the program code 312 to perform some and/or all of the above-described actions and steps and/or others described herein.

In the context of the embodiment illustrated in FIG. 24 and discussed above, the SR may be triggered when data for transmission is not available in the first node (and/or when no data is available for transmission in the first node). Alternatively and/or additionally, a second SR may be received from the second node. The second SR may be associated with a second SR configuration of the second node (e.g., the second SR configuration may be configured to the second node). Alternatively and/or additionally, the SR may be triggered responsive to receiving the second SR from the second node (and/or the SR may be triggered based upon reception of the second SR from the second node).

Alternatively and/or additionally, the first node determines the first SR configuration based upon the second SR configuration.

Alternatively and/or additionally, the first SR configuration may be determined based upon a mapping (e.g., an implicit mapping) of the second SR configuration to the first SR configuration. The mapping may be based upon a first index of the first SR configuration and/or a second index of the second SR configuration. For example, the first SR configuration may be determined by mapping the second SR configuration to the first SR configuration based upon the first index of the first SR configuration and/or the second index of the second SR configuration.

Alternatively and/or additionally, the determination may be associated with a mapping (e.g., an explicit mapping) of the second SR configuration to the first SR configuration. The mapping may be based upon a mapping table that maps a second plurality of SR configurations of the second node comprising the second SR configuration to the plurality of SR configurations of the first node comprising the first SR configuration. For example, the first SR configuration may be determined by mapping the second SR configuration to the first SR configuration based upon the mapping table configured to the first node.

Alternatively and/or additionally, the determination may be associated with using a specific SR configuration (e.g., a defined SR configuration), of the plurality of SR configurations, for the SR.

Alternatively and/or additionally, the SR may be transmitted to a third node using the first SR configuration. The third node may be a parent node of the first node.

Figure 25:
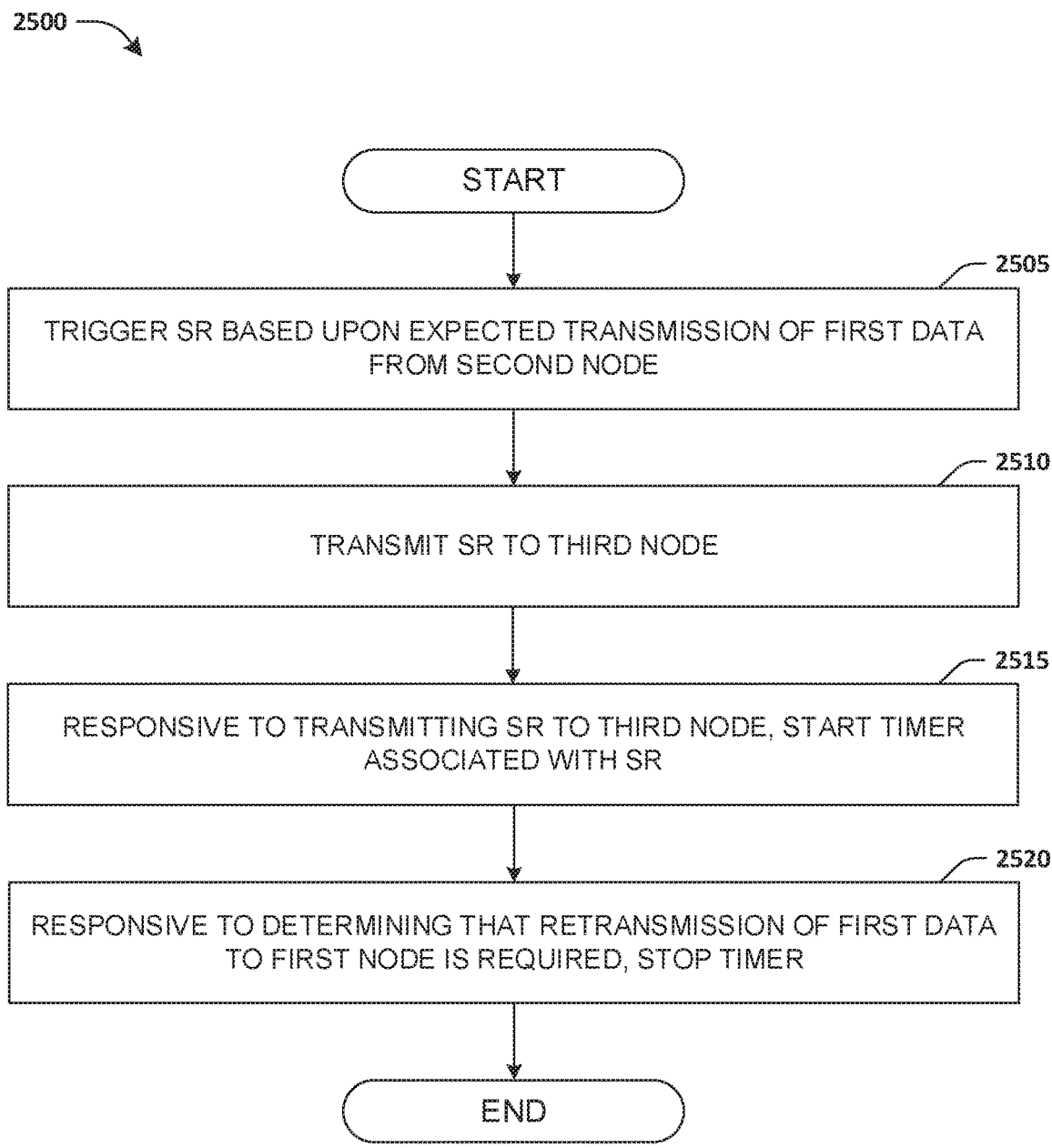
FIG. 25 is a flow chart according to one exemplary embodiment.

FIG. 25 is a flow chart 2500 according to one exemplary embodiment from the perspective of a first node. In step 2505, the first node may trigger an SR based upon an expected transmission of first data from a second node. In step 2510, the SR may be transmitted to a third node. In step 2515, responsive to transmitting the SR to the third node, the first node may start a timer associated with the SR. In step 2520, responsive to determining that a retransmission of the first data to the first node is required, the timer may be stopped.

Referring back to FIGS. 3 and 4, in one exemplary embodiment of a first node, the device 300 includes a program code 312 stored in the memory 310. The CPU 308 may execute program code 312 (i), to trigger an SR based upon an expected transmission of first data from a second node, (ii) to transmit the SR to a third node, (iii) to start a timer associated with the SR responsive to transmitting the SR to the third node, and (iv) to stop the timer responsive to determining that a retransmission of the first data to the first node is required. Furthermore, the CPU 308 can execute the program code 312 to perform some and/or all of the above-described actions and steps and/or others described herein.

In the context of the embodiment illustrated in FIG. 25 and discussed above, the timer may be an SR prohibit timer. Alternatively and/or additionally, second data may be transmitted to the third node after triggering the SR. Alternatively and/or additionally, the second data may be transmitted to the third node responsive to receiving one or more transmission resources from the third node. Alternatively and/or additionally, the one or more transmission resources may be associated with the SR. Alternatively and/or additionally, the second data may not comprise the first data. Alternatively and/or additionally, the SR may be cancelled responsive to transmitting the first data to the third node. Alternatively and/or additionally, the SR may be cancelled responsive to transmitting a BSR to the third node, wherein the BSR is indicative of a buffer status of the second node.

It may be appreciated that applying one or more of the techniques presented herein may result in one or more benefits including, but not limited to, a decrease in a UL delay of a UE when the UE is connected to an IAB system having multiple hops, and/or a decrease in a UL delay of a UE when the UE is connected to an IAB system having multiple hops, where UL transmission between nodes of the IAB system fails one or more times.

A communication device (e.g., a UE, a base station, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIG. 18, FIG. 19, FIG. 20, FIG. 21, FIG. 22, FIG. 23, FIG. 24 and/or FIG. 25. Furthermore, the processor may execute the program code to perform some and/or all of the above-described actions and steps and/or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method for a first node, comprising:
   triggering a first scheduling request (SR) based upon an expected transmission from a second node, wherein the second node is a child node of the first node;
   not cancelling the first SR in response to the first node having an uplink (UL) grant which can accommodate pending data available for transmission in the first node;
   triggering a second SR based upon a second buffer status report (BSR) that is triggered based upon UL data arriving at a buffer of the first node; and
   canceling the second SR in response to the first node having a second UL grant which can accommodate pending data available for transmission in the first node.

2. The method of claim 1, wherein the UL grant is for a transmission from the first node to a third node different than the second node.

3. The method of claim 1, wherein the first SR is triggered based upon a first BSR triggered prior to the first node receiving UL data from the second node.

4. The method of claim 1, wherein a configuration for the first SR is one of a plurality of SR configurations of the first node.

5. The method of claim 1, further comprising cancelling the second BSR at least one of:
   when the first node receives one or more UL grants which can accommodate pending data available for transmission; or when the one or more UL grants are not sufficient to accommodate a BSR Medium Access Control (MAC) control element (CE) with a subheader.

6. The method of claim 2, wherein the third node is a parent node of the first node.

7. The method of claim 1, wherein the first node is an Integrated Access and Backhaul (IAB)-node.

8. The method of claim 1, wherein the second node is an Integrated Access and Backhaul (IAB)-node.

9. The method of claim 1, wherein the second node is a User Equipment (UE).

10. A communication device, comprising:
a processor; and
memory comprising processor-executable instructions that when executed by the processor cause performance of operations, the operations comprising:
triggering a first scheduling request (SR) based upon an expected transmission from a second node, wherein the second node is a child node of the communication device;
not cancelling the first SR in response to the communication device having an uplink (UL) grant which can accommodate pending data available for transmission in the communication device;
triggering a second SR based upon a second buffer status report (BSR) that is triggered based upon UL data arriving at a buffer of the communication device; and
canceling the second SR in response to the communication device having a second UL grant which can accommodate pending data available for transmission in the communication device.

11. The communication device of claim 10, wherein the UL grant is for a transmission from the communication device to a third node different than the second node.

12. The communication device of claim 10, wherein the first SR is triggered based upon a first BSR triggered prior to the communication device receiving UL data from the second node.

13. The communication device of claim 10, wherein a configuration for the first SR is one of a plurality of SR configurations of the communication device.

14. The communication device of claim 10, the operations further comprising cancelling the second BSR at least one of:
when the communication device receives one or more UL grants which can accommodate pending data available for transmission; or
when the one or more UL grants are not sufficient to accommodate a BSR Medium Access Control (MAC) control element (CE) with a subheader.

15. The communication device of claim 11, wherein the third node is a parent node of the communication device.

16. The communication device of claim 10, wherein the communication device is an Integrated Access and Backhaul (IAB)-node.

17. The communication device of claim 10, wherein the second node is an Integrated Access and Backhaul (IAB)-node.

18. The communication device of claim 10, wherein the second node is a User Equipment (UE).

* * * * *